(12) United States Patent
Kang et al.

(10) Patent No.: US 11,443,744 B2
(45) Date of Patent: Sep. 13, 2022

(54) ELECTRONIC DEVICE AND VOICE RECOGNITION CONTROL METHOD OF ELECTRONIC DEVICE

(71) Applicant: Samsung Electronics Co., Ltd., Suwon-si (KR)

(72) Inventors: Doosuk Kang, Suwon-si (KR); Sunkey Lee, Suwon-si (KR); Bokun Choi, Suwon-si (KR); Jaeyung Yeo, Suwon-si (KR); Seongmin Je, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 16/982,939

(22) PCT Filed: Mar. 19, 2019

(86) PCT No.: PCT/KR2019/003181
§ 371 (c)(1),
(2) Date: Sep. 21, 2020

(87) PCT Pub. No.: WO2019/182325
PCT Pub. Date: Sep. 26, 2019

(65) Prior Publication Data
US 2021/0012775 A1    Jan. 14, 2021

(30) Foreign Application Priority Data
Mar. 23, 2018  (KR) .......................... 10-2018-0034002

(51) Int. Cl.
*G10L 15/22*     (2006.01)
*G10L 15/05*     (2013.01)
*G10L 15/08*     (2006.01)

(52) U.S. Cl.
CPC .............. *G10L 15/22* (2013.01); *G10L 15/05* (2013.01); *G10L 15/083* (2013.01); *G10L 2015/088* (2013.01); *G10L 2015/223* (2013.01)

(58) Field of Classification Search
CPC ....... G10L 15/22; G10L 15/05; G10L 15/083; G10L 25/48; G10L 2015/088; G10L 2015/223
(Continued)

(56) References Cited

U.S. PATENT DOCUMENTS 10,446,166 B2 * 10/2019 Dickins ................... G10L 25/48
2007/0265844 A1   11/2007 Koyama
(Continued)

FOREIGN PATENT DOCUMENTS

| EP | 3079372 A1 | 10/2016 |
| JP | 4533845 B2 | 9/2010 |

(Continued)

OTHER PUBLICATIONS

International Search Report dated Jul. 1, 2019 in connection with International Patent Application No. PCT/KR2019/003181, 2 pages.
(Continued)

*Primary Examiner* — Susan I McFadden

(57) ABSTRACT

According to one embodiment of the present invention, a server comprises at least one communication interface, at least one processor operatively connected to the communication interface, and at least one memory operatively connected to the processor, wherein the memory store instructions configured to, when executed, cause the processor: receives, from a first electronic device, first input voice data including a first request for conducting a first task by using a second electronic device by user's utterance; determines or receives a state of the first electronic device; and provides a first external electronic device with a first response related to
(Continued)

control of the state of the first electronic device. Various other embodiments are possible.

8 Claims, 22 Drawing Sheets

(58) Field of Classification Search
USPC .......................................................... 704/275
See application file for complete search history.

(56) References Cited

U.S. PATENT DOCUMENTS

2014/0167931 A1  6/2014  Lee et al.
2015/0243287 A1  8/2015  Nakano et al.
2017/0053666 A1  2/2017  Konjeti et al.

FOREIGN PATENT DOCUMENTS

| KR | 10-2014-0079328 A | 6/2014 |
| KR | 10-1678606 B1 | 11/2016 |
| KR | 10-2017-0004497 A | 1/2017 |
| KR | 10-2017-0006958 A | 1/2017 |

OTHER PUBLICATIONS

Written Opinion of the International Searching Authority dated Jul. 1, 2019 in connection with International Patent Application No. PCT/KR2019/003181, 5 pages.

\* cited by examiner

ELECTRONIC DEVICE AND VOICE RECOGNITION CONTROL METHOD OF ELECTRONIC DEVICE

CROSS-REFERENCE TO RELATED APPLICATIONS

This application is a 371 of International Application No. PCT/KR2019/003181 filed on Mar. 19, 2019, which claims priority to Korean Patent Application No. 10-2018-0034002 filed on Mar. 23, 2018 in the Korean Intellectual Property Office, the disclosures of which are herein incorporated by reference in their entirety.

BACKGROUND

1. Field

Various embodiments of the present invention relate to an electronic device for recognizing a surrounding situation to provide intelligent speech recognition control, and a speech recognition control method of the electronic device.

2. Description of the Related Art

Various types of intelligent services are recently being offered for an electronic device and, among such intelligent services, a speech recognition service may control an electronic device via speech recognition to provide various services to a user.

For example, a control technology which uses speech recognition may analyze a speech (command) inputted through user's utterance and provide a service most consistent with the user's request (or command). Such technology allows for easier control of an electronic device as compared with the user's manipulation using physical or mechanical buttons on the electronic device or using an additional input device, e.g., a mouse or keyboard, or a user interface displayed on a touch-recognizable display and is thus coming in wide use.

Such a speech recognition control technology may be implemented by registering an instruction to be used for speech control, and defining a speech recognition result and an action or operation thereof by an application or a service developer in advance.

SUMMARY

The speech recognition control technology may control to perform a user request (or command) which corresponds to a speech (or voice) inputted to an electronic device by a user utterance via the electronic device or an external electronic device.

If an operation (e.g., a first task performing operation) to be performed in the corresponding external electronic device by a user's speech request affects an operation (e.g., a first function performing operation) already being performed in the electronic device or an operation (e.g., a first task performing operation) to be performed in the electronic device by a user's speech request affects an operation (e.g., a first function performing operation) already being performed in the external electronic device, there may be a need for the user to additionally control an operation of the electronic device or the corresponding external electronic device.

According to various embodiments, when an electronic device is controlled by using speech recognition, if there is a need for an additional control operation (a speech outputting operation related to adjustment of a state of the electronic device or a state of an external electronic device, or an operation of performing a second task) for an operation (e.g., a first task performing operation) of the electronic device or the external electronic device which is performed according to a user's speech request by recognizing a situation around the electronic device (e.g., a state of the external electronic device around the electronic device controlled by the electronic device), the electronic device which may automatically provide the user with this, and a speech recognition control method of the electronic device may be provided.

An electronic device according to various embodiments includes at least one communication interface; at least one processor operatively connected to the communication interface; and at least one memory operatively connected to the processor, and the memory may be configured to store instructions, when executed, cause the processor to: receive, from a first external electronic device, first input speech data including a first request for performing a first task by using a second external electronic device by user utterance; determine or receive a state of the first external electronic device; and provide the first external electronic device with a first response related to adjustment of the state of the first external electronic device.

According to various embodiments, an electronic device includes at least one communication interface, at least one processor operatively connected to the communication interface, and at least one memory operatively connected to the processor, and the memory may be configured to store instructions, when executed, cause the processor to: obtain, via the electronic device, first input speech data including a first request for performing a first task by using a first external electronic device by user utterance, transmit the obtained first input speech data to a second external electronic device, and receive, from the second external electronic device, a first response related to adjustment of a state of the electronic device.

According to various embodiments, an electronic device includes at least one communication interface, at least one processor operatively connected to the communication interface, and at least one memory operatively connected to the processor, and the memory may be configured to store instructions, when executed, cause the processor to: receive, from a first external electronic device, first input speech data including a first request for performing a first task by using the first external electronic device by user utterance, determine or receive a state of a second external electronic device, and provide the first external electronic device with an indication related to adjustment of the state of the second external electronic device.

According to various embodiments, an electronic device or a device controlled by the electronic device may be controlled based on a user's request (or command) inputted by the user's utterance by using speech recognition control.

According to various embodiments, when the electronic device or an external electronic device is controlled via the speech recognition control, a speech or information related to an additional control operation for the user's request may be provided to the user based on a surrounding situation.

DETAILED DESCRIPTION

Figure 1:
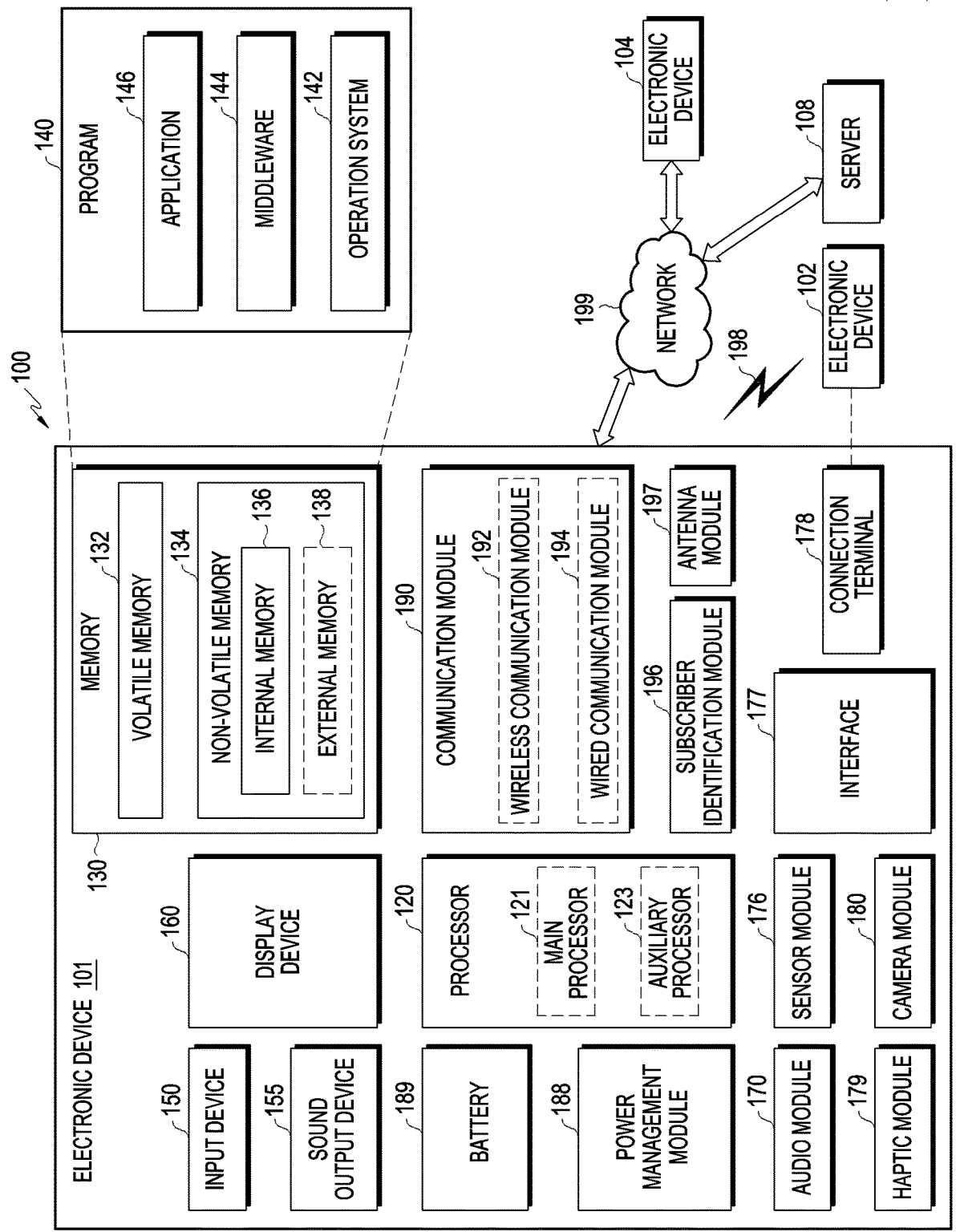
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, so at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, at least one of a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technology set forth herein to a particular implementation form and include various changes, equivalents, and/or replacements for a corresponding embodiment. With regard to the description of the drawings, similar reference numerals may be used to refer to similar elements. It is to be understood that a singular form may include a plural form, unless the relevant context clearly indicates otherwise. As used herein, each of such phrases as "A or B," "at least one of A and/or B," "A, B, or C," and "at least one of A, B, and/or C," may include all possible combinations of the items enumerated together. As used herein, expressions such as "1st" and "2nd," "first" or "second" may modify corresponding components regardless of their order or importance, may be used only to distinguish a corresponding component from another, and does not limit the corresponding components. If a component (e.g., a first component) is referred to, as "(operatively or communicatively) connected to" or "coupled to" another component (e.g., a second component), the component may be directly connected to the other component or may be connected to the other component via still another component (e.g., a third component).

As used herein, the term "module" includes a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented in an application-specific integrated circuit (ASIC).

Various embodiments as set forth herein may be implemented as software (e.g., the program 140) including an instruction that is stored in storage media (e.g., internal memory 136 or external memory 138) readable by a machine (e.g., a computer). The machine is a device capable of invoking the instruction stored in the storage medium and operating according to the invoked instruction, and may include an electronic device (e.g., an electronic device 101) according to the disclosed embodiments. If the instructions is executed by a processor (e.g., a processor 120), the processor may perform a function which corresponds to the instruction directly or by using other components under the control of the processor. The instruction may include a code generated or executed by a complier or an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., PlayStore™). If distributed online, at least part of the computer program product may be temporarily generated or at least temporarily stored in the storage medium, such as memory of the manufacturer's server, a server of the application store, or a relay server.

Each component (e.g., a module or a program) according to various embodiments may be implemented with a single entity or multiple entities, and some of the above-described sub-components may be omitted, or another sub-component may be further included in various embodiments. Alternatively or additionally, some components (e.g., modules or programs) may be integrated into one entity, and the integrated entity may still perform a function in the same or similar manner as it is performed by each component before the integration. According to various embodiments, operations performed by the module, the program, or another component may be carried out sequentially, in parallel, repeatedly, or heuristically, or at least some of the operations may be executed in a different order or omitted, or another operation may be added.

Figure 2:
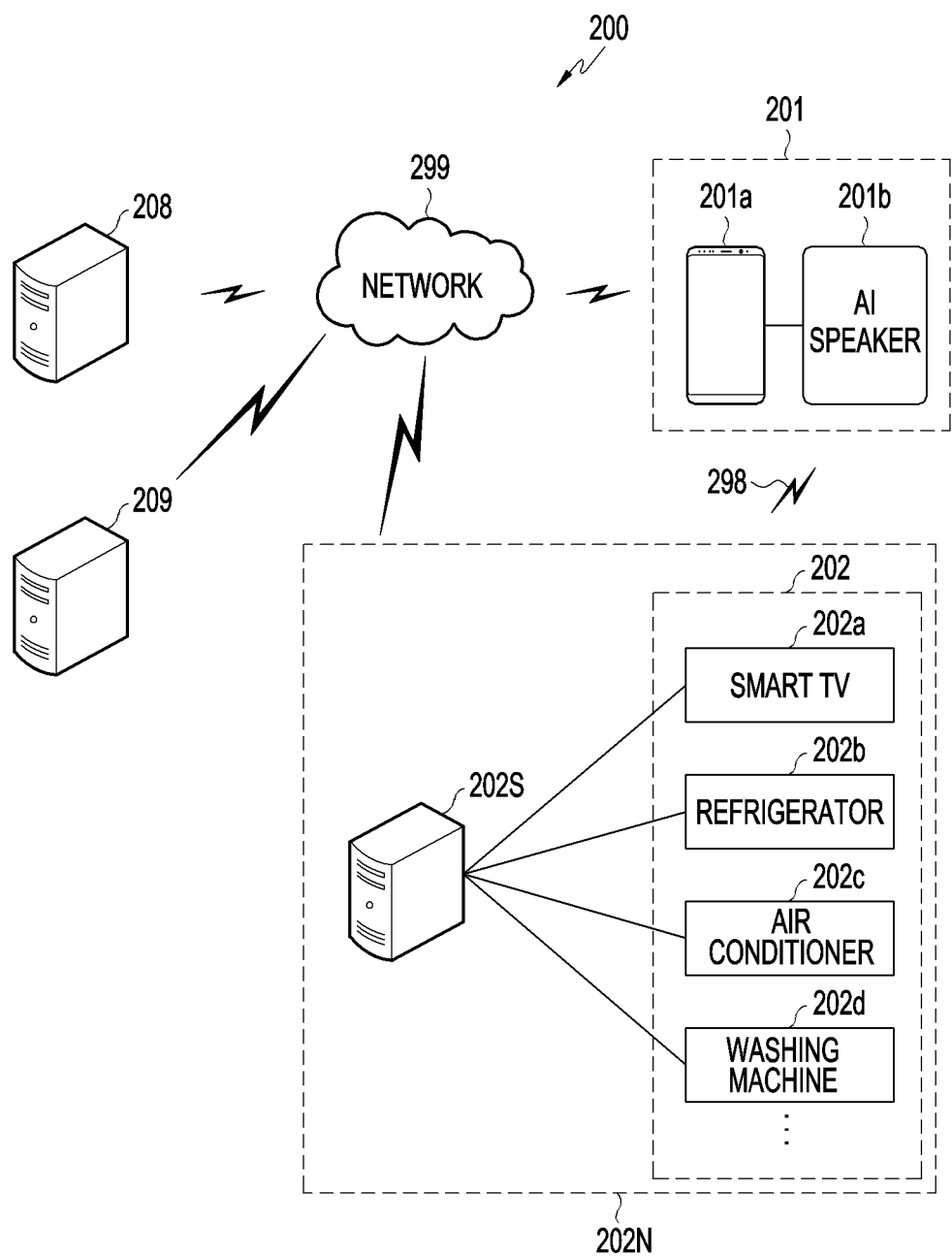
FIG. 2 is a diagram illustrating a speech recognition control system according to various embodiments.

FIG. 2 is a diagram illustrating a speech recognition control system according to various embodiments.

Referring to FIG. 2, a speech recognition control system 200 according to various embodiments may include at least one of a first electronic device 201, at least one second electronic device 202 (202a~202d), an intelligent server 208, or an IoT server 209. The speech recognition control system 200 according to various embodiments may further include a home network server 202S (e.g., an access point (AP) or a router) for forming a home network 202N capable of controlling electronic devices (e.g., an IoT device) having a communication function such as the at least one second electronic device 202 (202a~202d).

According to an embodiment, the first electronic device 201 (e.g., an electronic device 101) and the at least one second electronic device 202 (202a~202d) (e.g., an electronic device 102) may communicate with each other via a first network 298 (e.g., a first network 198) (e.g., a short-range wireless communication). According to an embodiment, the first network 298 may include a short-range wireless communication of a connection scheme or a non-connection scheme. For example, the short-range wireless communication of the non-connection scheme may include a neighbor awareness networking (NAN).

According to an embodiment, the first electronic device 201 and the intelligent server 208 (e.g., a server 108) may communicate with each other via a second network 299 (e.g., a second network 199) (e.g., a long-range wireless communication).

The first electronic device 201 (e.g., a user equipment) may provide a service necessary for a user via an app (or an application program) (e.g., an alarm app, a message app, or a picture (gallery) app) stored in the first electronic device 201. For example, the first electronic device 201 may execute and operate another app via an intelligent app (e.g., a speech recognition app) (e.g., Samsung Electronics' Bixby™) stored in the first electronic device 201. The first electronic device 201 may receive a user input for executing and operating the other app via the intelligent app (e.g., the speech recognition app) of the first electronic device 201. The user input may be received, for example, via a physical or mechanical button, a touch pad, a speech input, or a remote input. According to an embodiment, the first electronic device 201 may be various terminal devices (or electronic devices) having a communication function such as a portable phone, a smartphone 201a, a personal digital assistant (PDA), a laptop computer, an AI speaker 201b, or a remote controller.

According to an embodiment, the first electronic device 201 may receive a user speech by a user's utterance as the user input. The first electronic device 201 may receive the user speech including a user request by the user's utterance, and generate a command to operate an app based on the user request. Accordingly, the first electronic device 201 may operate at least one app by using the command.

According to an embodiment, the first electronic device 201 may receive a speech inputted by user's utterance from the user via the intelligent app (e.g., the speech recognition app) as the user input, and perform a role as a controller device capable of controlling the first electronic device 201 or the at least one second electronic device 202 (202a~202d) capable of communicating with the first electronic device 201 according to a command generated based on a user request included in the speech. According to various embodiments, the first electronic device 201 may receive the speech inputted by the user's utterance from the user via the intelligent app (e.g., the speech recognition app) as the user input, and control the at least one second electronic device 202 (202a~202d) capable of communicating with the first electronic device 201 by the home network server 202S according to the command generated based on the user request included in the speech. For example, the home network server 202S may turn on/off a light or open/close a door according to the command generated based on the user request included in the speech.

According to an embodiment, the at least one second electronic device 202 (202a~202d) may communicate with the first electronic device 201 via the first network 298 (e.g., the short-range wireless communication), and for example, may transmit and receive state information of each other to and from the first electronic device 201 periodically or aperiodically via the first network 298.

Each of second electronic devices 202 (202a~202d) may receive a user input for executing and operating an app stored in each of the second electronic devices 202 (202a~202d). The user input may be received, for example, via a physical or mechanical button, a touch pad, a speech input, or a remote input. According to an embodiment, the second electronic devices 202 (202a~202d) may be various home appliances having a communication function such as a smart TV 202a, a refrigerator 202b, an air conditioner (202c), or a washing machine (202d).

According to an embodiment, the second electronic devices 202 (202a~202d) may perform a role as a controlled device which may be controlled under the control of the first electronic device 201. For example, the second electronic devices 202 (202a~202d) may receive the command generated by the user utterance inputted via the intelligent app (e.g., the speech recognition app) of the first electronic device 201, and execute and operate at least one app stored in the second electronic devices 202 (202a~202d) based on the received command. According to an embodiment, in order to control the second electronic devices 202 (202a~202d) by the user utterance inputted via the intelligent app (e.g., the speech recognition app) of the first electronic device 201, the first electronic device 201 may register a controlled device, e.g., the second electronic devices 202 (202a~202d), which the first electronic device 201 intends to control via a communication connection app (e.g., Samsung Connect™) of the first electronic device 201. Upon receiving the speech by the user utterance as the user input via the intelligent app (e.g., the speech recognition app), the first electronic device 201 may search for the at least one second electronic device 202 (202a~202d) registered at the first electronic device 201 based on a target for a user request included in the speech.

The intelligent server 208 is an intelligent server capable of providing speech recognition control, and may be, for example, a speech recognition server (e.g., Samsung Electronics' Bixby™ server). The intelligent server 208 may communicate with the first electronic device 201 via, for example, the second network 299 (e.g., the second network 199) (e.g., the long-range wireless communication). For example, the intelligent server 208 may receive a user speech input (or a user voice input) from the first electronic device 201 and convert the user speech input into text data. All or at least some of functions performed at the intelligent server 208 may be performed at the first electronic device 201 (e.g., the electronic device 101 in FIG. 1) or the second electronic device 202 (e.g., the electronic device 101 in FIG. 1). A detailed example of the intelligent server 208 will be described later in FIGS. 3A and 3B.

According to an embodiment, the first electronic device 201 may execute the operation and display a screen which corresponds to a state of the first electronic device 201 which executes the operation on a display (e.g., a display device 160 in FIG. 1). According to another embodiment, the first electronic device 201 may execute the operation and may not display a result of executing the operation on the display. The first electronic device 201 may, for example, execute a plurality of operations, and display only some results for the plurality of operations on the display. For example, the first electronic device 201 may display only a result of executing the last operation in order on the display. As another example, the first electronic device 201 may receive a user input and display a result of executing the operation on the display.

According to an embodiment, the first electronic device 201 and the second electronic devices 202 (202a~202d) may communicate via the IoT server 209 connected to the second network 299 (e.g., the long-range wireless communication). The IoT server 209 may communicate with the intelligent server 208 as well as the first electronic device 201 via the second network 299. The first electronic device 201 and the home network server 202S may also communicate via the first network 298 (e.g., the short-range wireless communication).

According to an embodiment, the IoT server 209 (e.g., a cloud) and the at least one second electronic device 202 (202a~202d) may be connected via the home network 202N for providing the smart home service. For example, the at least one second electronic device 202 (202a~202d) may perform a registration request and registration request approval process with the IoT server 209, and then may be registered and managed at the IoT server 209. All or at least some of functions performed at the IoT server 209 may be performed at the first electronic device 201 (e.g., the electronic device 101 in FIG. 1) or the second electronic device 202 (e.g., the electronic devices 101 and 102).

According to an embodiment, if the at least one second electronic device 202 (202a~202d) is controlled via the IoT server 209 (e.g., the cloud), the first electronic device 201 may be interworked with the IoT server 209 (e.g., the cloud) via the first network 298 or the second network 299, and search for the at least one second electronic device 202 (202a~202d) registered at the interworked IoT server 209 (e.g., the cloud) based on a target (e.g., a target device or application) for performing the user request included in the user speech by the user utterance. According to an embodiment, the second electronic devices 202 (202a~202d) may receive a control command from the IoT server 209 via the home network server 202S.

In FIG. 2, the intelligent server 208 (e.g., the speech recognition server) and the IoT server 209 (e.g., the cloud) are illustrated as being configured separately, but not limited thereto, and the intelligent server 208 (e.g., the speech recognition server) and the IoT server 209 (e.g., the cloud) may be incorporated into one server or configured with a plurality of servers which are configured separately.

Figure 3A:
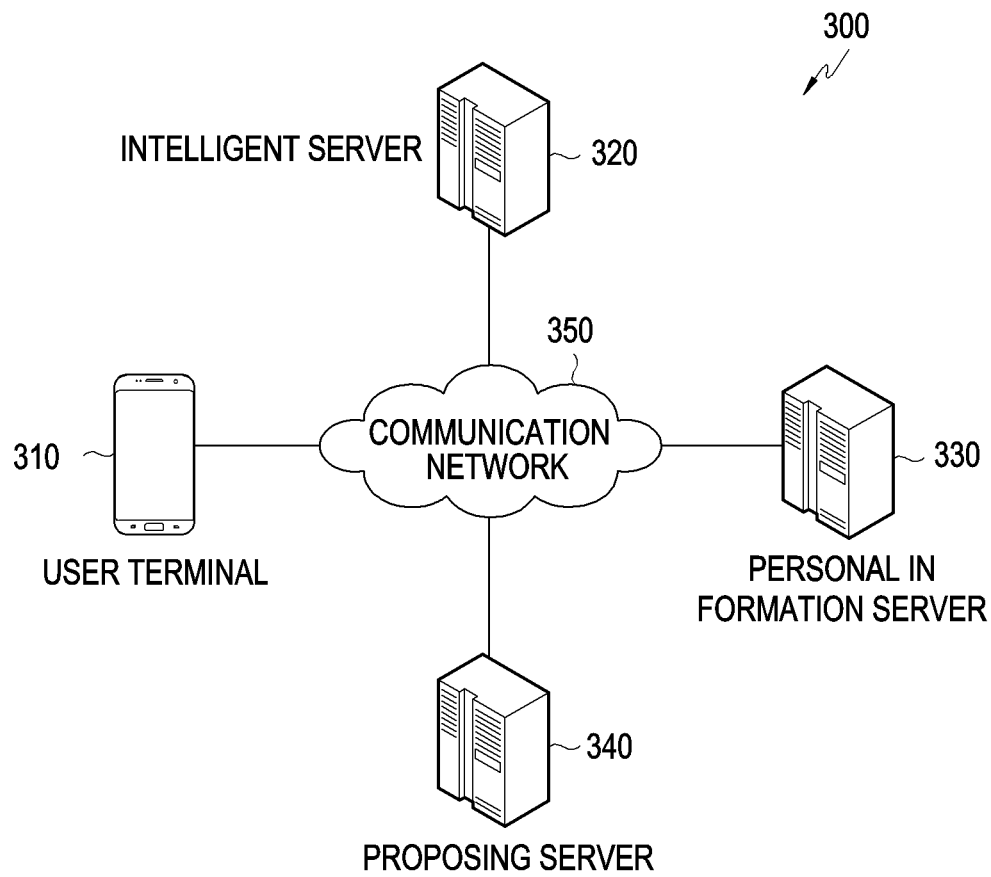
FIG. 3a is a diagram illustrating an integrated intelligence system according to various embodiments of the present invention.

FIG. 3a is a diagram illustrating an integrated intelligence system according to various embodiments of the present invention.

Referring to FIG. 3a, an integrated intelligence system 300 may include a user terminal 310, an intelligent server 320, a personal information server 330, or a proposing server 340.

The user terminal 310 (e.g., electronic devices 101, 102, and 104 in FIG. 1, or electronic devices 201 and 202 in FIG. 2) may provide a service necessary for a user via an app (or an application program) (e.g., an alarm app, a message app, or a photo (gallery) app) stored in the user terminal 310. For example, the user terminal 300 may execute and operate another app via an intelligent app (or a speech recognition app) stored in the user terminal 310. A user input to execute and operate the other app may be received via the intelligent app of the user terminal 310. The user input may be received via, e.g., a physical button, a touchpad, a speech input, and a remote input. According to an embodiment, the user terminal 310 may be various terminal devices (or electronic devices) connectable to an internet, such as a cellular phone, a smartphone, a personal digital assistant (PDA), or a laptop computer.

According to an embodiment, the user terminal 310 may receive user's utterance as a user input. The user terminal 310 may receive the user's utterance and generate a command to operate an app based on the user's utterance. Accordingly, the user terminal 310 may operate the app by using the command.

The intelligent server 320 may receive a user speech input (or a user voice input) from the user terminal 310 via a communication network and convert the user speech input into text data. In another embodiment, the intelligent server 320 may generate (or select) a path rule based on the text data. The path rule may include information about an action (or an operation) to perform a function of the app or information about a parameter necessary to execute the operation. The rule may include an order of the operation of the app. The user terminal 310 may receive the path rule, select an app according to the path rule, and execute an operation included in the path rule on the selected app.

As used herein, the term "path rule" may generally mean a sequence of states for an electronic device to perform a task requested by a user, but not limited thereto. In other words, the path rule may contain information about a sequence of states. The task may be a certain action that, e.g., an intelligent app may provide. The task may include producing a schedule, transmitting a photo to a desired party, or providing weather information. The user terminal 310 may perform the task by sequentially having at least one state (e.g., an operation state of the user terminal 310).

According to an embodiment, the path rule may be provided or generated by an artificial intelligence (AI) system. The artificial intelligence system may be a rule-based system or a neural network-based system (e.g., a feedforward neural network (FNN)) or a recurrent neutral network (RNN)). Or, the artificial intelligence system may be a combination thereof or an artificial intelligence system different therefrom. According to an embodiment, the path rule may be selected from a set of pre-defined path rules or generated in real-time in response to a user request. For example, the artificial intelligence system may select at least one among a plurality of pre-defined path rules or may dynamically (or real-time) generate a path rule. The user terminal 310 may use a hybrid system to provide the path rule.

According to an embodiment, the user terminal 310 may execute the operation and display, on the display, the screen which corresponds to a state of the user terminal 310 having performed the operation. According to another embodiment, the user terminal 310 may execute the operation and may not display a result of executing the operation on the display. The user terminal 310 may execute, e.g., a plurality of operations and display, on the display, only some results of the plurality of operations. For example, the user terminal 310 may display, on the display, e.g., only a result of executing the last operation in order. As another example, the user terminal 310 may receive a user input and display the result of executing the operation on the display.

The personal information server 330 may include a database storing user information. For example, the personal information server 330 may receive the user information (e.g., context information or app execution) from the user terminal 310 and store the user information in the database. The intelligent server 320 may receive the user information from the personal information server 330 via the communication network and use the user information in generating a path rule for a user input. According to an embodiment, the user terminal 310 may receive the user information from the personal information server 330 via the communication network and use the user information as information for managing the database.

The proposing server 340 may include a database that stores information about a function to be provided or introductions of an application or a function within the terminal. For example, the proposing server 340 may receive user information of the user terminal 310 from the personal information server 330 and include a database for a function that the user may use. The user terminal 310 may receive the information about the function to be provided from the proposing server 340 via the communication network and provide the user with the information.

Figure 3B:
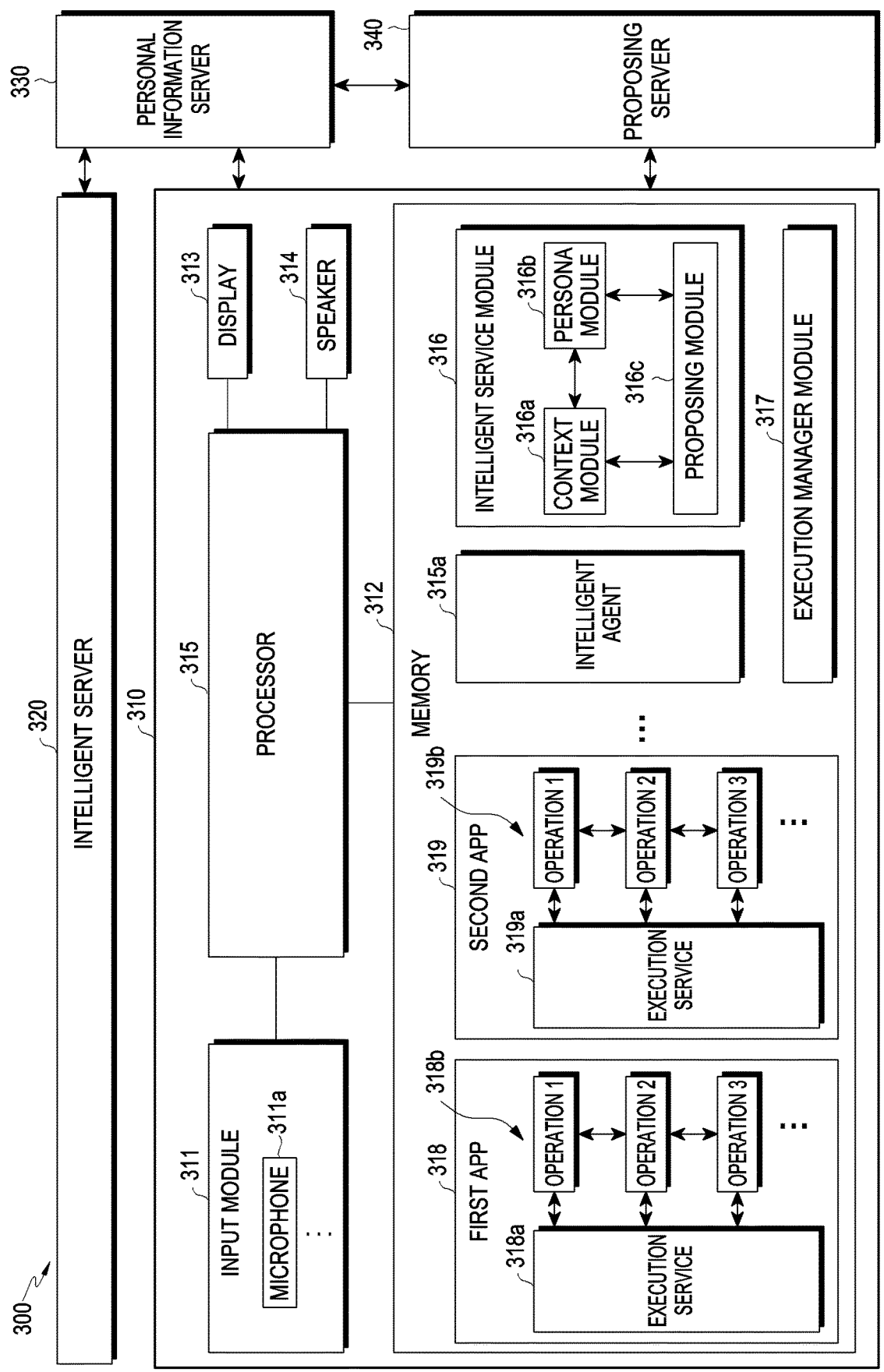
FIG. 3b is a block diagram illustrating a user terminal in an integrated intelligence system according to an embodiment of the present invention.

FIG. 3b is a block diagram 300 illustrating a user terminal in an integrated intelligence system according to an embodiment of the present invention.

Referring to FIG. 3b, a user terminal 310 (e.g., a first electronic device 201 in FIG. 2) may include an input module 311, a display 313, a speaker 314, a memory 312, or a processor 315. The user terminal 310 may further include a housing. Components of the user terminal 310 may be positioned in or on the housing.

According to an embodiment, the input module 311 may receive a user input from a user. For example, the input module 311 may receive a user input from an external device (e.g., a keyboard and a headset) connected thereto. As another example, the input module 311 may include a touch screen combined with the display 313 (e.g., a touch screen display). As another example, the input module 311 may include a hardware key (or a physical key) positioned in the user terminal 310 (or the housing of the user terminal 310).

According to an embodiment, the input module 311 may include a microphone 311a capable of receiving user's utterance as a speech signal. For example, the input module 311 may include a speech input system and receive the user's utterance as the speech signal via the speech input system.

According to an embodiment, the display 313 may display an image, a video, and/or an application execution screen. For example, the display 313 may display a graphic user interface (GUI) of an app.

According to an embodiment, the speaker 314 may output a speech signal. For example, the speaker 314 may output a speech signal generated from the inside the user terminal 310 to the outside.

According to an embodiment, the memory 312 may store a plurality of apps (or application programs) 318 and 319. The plurality of apps 318 and 319 stored at the memory 312 may be selected, executed, and operated according to the user input.

According to an embodiment, the memory 312 may include a database which may store information necessary to recognize a user input. For example, the memory 312 may include a log database capable of storing log information. As another example, the memory 312 may include a persona database capable of storing user information.

According to an embodiment, the memory 312 may store the plurality of apps 318 and 319, and the plurality of apps 318 and 319 may be loaded and operated. For example, the plurality of apps 318 and 319 stored in the memory 312 may be loaded and operated by an execution manager module 317. The plurality of apps 318 and 319 may include execution service modules 318a and 319a to perform functions. In an embodiment, the plurality of apps 318 and 319 may execute a plurality of operations (e.g., a sequence of states) 318b and 319b via the execution service modules 318a and 319a to perform the functions. In other words, the execution service modules 318a and 319a may be activated by the execution manager module 317 and execute the plurality of operations 318b and 319b.

According to an embodiment, when the operations 318b and 319b of the apps 318 and 319 are executed, an execution state screen as per the execution of the operations 318b and 319b may be displayed on the display 313. The execution state screen may be a screen, e.g., in a state of the operations 318b and 319b having been completed. The execution state screen may be a screen, e.g., in a state of the execution of the operations 318b and 319b having been stopped (partial landing) (e.g., if a parameter required for the operations 318b and 319b are not inputted).

According to an embodiment, the execution service modules 318a and 319a may execute the operations 318b and 319b as per a path rule. For example, the execution service modules 318a and 319a may be activated by the execution manager module 317, receive an execution request as per the path rule from the execution manager module 317, and execute the operations 318b and 319b according to the execution request, thereby executing the functions of the apps 318 and 319. The execution service modules 318a and 319a, when the execution of the operations 318b and 319b is complete, may transmit completion information to the execution manager module 317.

According to an embodiment, if the plurality of operations 318b and 319b are executed on the apps 318 and 319, the plurality of operations 318b and 319b may sequentially be executed. When the execution of one operation (e.g., operation 1 of a first app 318 or operation 1 of a second app 319) is complete, the execution service modules 318a and 319a may open the next operation (e.g., operation 2 of the first app 318 or operation 2 of the second app 319) and send completion information to the execution manager module 317. Here, 'open an operation' may be appreciated as transitioning a state of the operation into an executable state or preparing for execution of the operation. In other words, unless the operation is open, the operation may not be executed. Upon receiving the completion information, the execution manager module 317 may transmit an execution request for the next operation (e.g., the operation 2 of the first app 318 or the operation 2 of the second app 319) to the execution service modules 318a and 319a. According to an embodiment, if the plurality of apps 318 and 319 are executed, the plurality of apps 318 and 319 may sequentially be executed. For example, when the execution of the last operation of the first app 318 (e.g., operation 3 of the first app 318) is completed, and completion information is thus received, the execution manager module 317 may transmit an execution request for the first operation of the second app 319 (e.g., the operation 1 of the second app 319) to the execution service module 319a.

According to an embodiment, if the plurality of operations 318b and 319b are executed on the apps 318 and 319, resultant screens of execution of the plurality of operations 318b and 319b may be displayed on the display 313. According to an embodiment, only some of the plurality of resultant screens of execution of the plurality of operations 318b and 319b may be displayed on the display 313.

According to an embodiment, the memory 312 may store an intelligent app (e.g., a speech recognition app) interworking with the intelligent agent 315. The app interworking with the intelligent agent 315 may receive a user's utterance as a speech signal and process the user's utterance. According to an embodiment, the app interworking with the intelligent agent 315 may be operated by a particular input entered via the input module 311 (e.g., an input via a hardware key, an input via a touch screen, or a particular speech input).

According to an embodiment, the processor 315 may control the overall operation of the user terminal 310. For example, the processor 315 may control the input module 311 to receive a user input. The processor 315 may control the display 313 to display an image. According to an embodiment, the processor 315 may control the speaker 314 to output a speech signal. The processor 315 may control the memory 312 to fetch or store necessary information.

According to an embodiment, the processor 315 may include an intelligent agent 315a, the execution manager module 317, or an intelligent service module 316. In an embodiment, the processor 315 may execute instructions stored in the memory 312 to drive the intelligent agent 315a, the execution manager module 317, or the intelligent service module 316. Various modules described in various embodiments of the present invention may be implemented with hardware, or software. In various embodiments of the present invention, an operation performed by the intelligent agent 315a, the execution manager module 317, or the intelligent service module 316 may be understood as an operation performed by the processor 315.

According to an embodiment, the intelligent agent 315a may generate a command to operate an app based on the speech signal received as the user input. According to an embodiment, the execution manager module 317 may receive the generated command from the intelligent agent 315a, and select, execute, and operate the apps 318 and 319 stored in the memory 312. According to an embodiment, the intelligent service module 316 may manage the user information and use the user information for processing the user input.

The intelligent agent 315a may process the user input through the intelligent server 320 by transmitting the user input received via the input module 311 to the intelligent server 320.

According to an embodiment, the intelligent agent 315a may pre-process the user input before transmitting the user input to the intelligent server 320. According to an embodiment, the intelligent agent 315a may include an adaptive echo canceller (AEC) module, a noise suppression (NS) module, an end-point detection (EPD) module, or an automatic gain control (AGC) module to pre-process the user input. The adaptive echo canceller module may remove an echo mixed in the user input. The noise suppression module may suppress background noise mixed in the user input. The end-point detection module may detect an end point of a user speech included in the user input to find where the user speech is present. The automatic gain control module may recognize the user input and adjust the volume of the user input for a proper processing of the recognized user input. According to an embodiment, although able to include all of pre-processing components described above to provide a better performance, the intelligent agent 315a may include some of the pre-processing components to be operated at reduced power in another embodiment.

According to an embodiment, the intelligent agent 315a may include a wake-up recognition module to recognize the user's invocation. The wake-up recognition module may recognize the user's wake-up command via the speech recognition module, and upon receiving the wake-up command, the wake-up recognition module may activate the intelligent agent 315a to receive a user input. According to an embodiment, the wake-up recognition module of the intelligent agent 315a may be implemented in a low-power processor (e.g., a processor included in an audio codec). According to an embodiment, the intelligent agent 315a may be activated according to a user input via a hardware key. If the intelligent agent 315a is activated, an intelligent app (e.g., a speech recognition app) interworking with the intelligent agent 315a may be executed.

According to an embodiment, the intelligent agent 315a may include a speech recognition module to execute a user input. The speech recognition module may recognize the user input for executing an operation on an app. For example, the speech recognition module may recognize a limited user (speech) input (e.g., a "Click" sound for executing a capturing operation when a camera app is executed) for executing an operation, such as the wake-up command on the apps 318 and 319. The speech recognition module which assists the intelligent server 320 may quickly process, for example, a user command which may be processed in the user terminal 310. According to an embodiment, the speech recognition module of the intelligent agent 315a to execute the user input may be implemented in an app processor.

According to an embodiment, the speech recognition module (including the speech recognition module of the wake-up recognition module) of the intelligent agent 315a may recognize a user input by using an algorithm for recognizing a speech. The algorithm used to recognize the speech may be at least one of, e.g., a hidden markov model (HMM) algorithm, an artificial neural network (ANN) algorithm, or a dynamic time warping (DTW) algorithm.

According to an embodiment, the intelligent agent 315a may convert the user's speech input into text data. According to an embodiment, the intelligent agent 315a may transfer the user's speech to the intelligent server 320 and receive converted text data. Thus, the intelligent agent 315a may display the text data on the display 313.

According to an embodiment, the intelligent agent 315a may receive a path rule transmitted from the intelligent server 320. According to an embodiment, the intelligent agent 315a may transmit the path rule to the execution manager module 317.

According to an embodiment, the intelligent agent 315a may transmit, to an intelligence service module 316, an execution result log as per the path rule received from the intelligent server 320, and the transmitted execution result log may be accrued and managed in user preference information of a persona module (persona manager) 316b.

According to an embodiment, the execution manager module 317 may receive the path rule from the intelligent agent 315a, execute the apps 318 and 319, and allow the apps 318 and 319 to execute the operations 318b and 319b included in the path rule. For example, the execution manager module 317 may transmit command information (e.g., path rule information) to execute the operations 318b and 319b to the apps 318 and 319 and receive completion information about the operations 318b and 319b from the apps 318 and 319.

According to an embodiment, the execution manager module 317 may transmit and receive command information (e.g., path rule information) to execute the operations 318b and 319b of the apps 318 and 319 between the intelligent agent 315a and the apps 318 and 319. The execution manager module 317 may bind the apps 318 and 319 to be executed as per the path rule and transmit the command information (e.g., the path rule information) for the operations 318b and 319b included in the path rule to the apps 318 and 319. For example, the execution manager module 317 may sequentially transmit the operations 318b and 319b included in the path rule to the apps 318 and 319, and sequentially execute the operations 318b and 319b of the apps 318 and 319 as per the path rule.

According to an embodiment, the execution manager module 317 may manage execution states of the operations 318b and 319b of the apps 318 and 319. For example, the execution manager module 317 may receive information about the execution states of the operations 318b and 319b from the apps 318 and 319. If the execution states of the operations 318b and 319b are, e.g., partial landing states (e.g., if no parameter required for the operations 318b and 319b is inputted), the execution manager module 317 may transmit information about the partial landing states to the intelligent agent 315a. The intelligent agent 315a may request the user to input necessary information (e.g., parameter information) by using the received information. If the execution states of the operations 318b and 319b are other states, e.g., operation states, utterance from the user may be received, and the execution manager module 317 may transmit information about the apps 318 and 319 being executed and the execution states of the apps 318 and 319 to the intelligent agent 315a. The intelligent agent 315a may receive parameter information for the user utterance via the intelligent server 320, and may transmit the received parameter information to the execution manager module 317. The execution manager module 317 may change the parameter for the operations 318b and 319b into a new parameter by using the received parameter information.

According to an embodiment, the execution manager module 317 may transfer the parameter information included in the path rule to the apps 318 and 319. If the plurality of apps 318 and 319 are sequentially executed as per the path rule, the execution manager module 317 may transfer the parameter information included in the path rule from one app to the other.

According to an embodiment, the execution manager module 317 may receive a plurality of path rules. The execution manager module 317 may select a plurality of path rules based on the user utterance. For example, if user utterance specifies a certain app 318 to execute some operation 318a but does not specify another app 319 to execute the other operation 319b, the execution manager module 317 may receive a plurality of different path rules by which the same app 318 (e.g., a gallery app) to execute the operation 318a is executed and a different app 319 (e.g., a message app, and a telegram app) capable of executing the other operation 319b is executed. The execution manager module 317 may execute, for example, the same operations 318b and 319b (e.g., the same continuous operations 318b and 319b) of the plurality of path rules. If the same operations are executed, the execution manager module 317 may display, on the display 320, a state screen where the different apps 318 and 319 each included in a respective one of the plurality of path rules may be selected.

According to an embodiment, the intelligent service module 316 may include a context module 316a, a persona module 316b, or a proposing module 316c.

The context module 316a may collect current states of the apps 318 and 319 from the apps 318 and 319. For example, the context module 316a may receive context information indicating the current states of the apps 318 and 319 to collect the current states of the apps 318 and 319.

The persona module 316b may manage personal information of a user which uses the user terminal 310. For example, the persona module 316b may collect usage information and a performing result of the user terminal 310 to manage the personal information of the user.

The proposing module 316c may predict the user's intent and recommend a command to the user. For example, the proposing module 316c may recommend the command to the user in consideration of the user's current state (e.g., time, a place, a situation, and an app).

According to various embodiments, the processor 315 may obtain a user speech via the input module 311. For example, the processor 315 may obtain first input speech data including a first request by user utterance.

According to an embodiment, the processor 315 may obtain the first input speech data including the first request via the input module 311 (e.g., the microphone 311a) of the user terminal 310. For example, after detecting an input of a designated hardware key (e.g., 1954a in FIG. 19) formed at the user terminal 310 or an any location on the housing of the user terminal 310 for speech recognition control, or on a state in which the processor 315 is transitioned into a mode for proving a speech recognition control service, the processor 315 may obtain the first input speech data including the first request via the input module 311 (e.g., the microphone).

According to an embodiment, the processor 315 may obtain first input speech data including a first request for performing a first task by using one of a second electronic devices 202 (202a~202d) (e.g., a smart TV 202a) based on the user utterance via the input module 311.

According to an embodiment, the processor 315 may obtain first input speech data including a first request for performing a first task by using a first electronic device 201 based on the user utterance via the input module 311.

According to various embodiments, the processor 315 may transmit the first input speech data to an intelligent server 208 via a communication interface (e.g., a communication module 190 in FIG. 1). After transmitting the first input speech data, the processor 315 may receive, from the intelligent server 208 via a communication module (e.g., the communication module 190 in FIG. 1), first task performing information for performing the first task which corresponds to the first request included in the first input speech data.

According to an embodiment, the first task performing information may include first operation information (e.g., a first pass rule) for performing the first task by using one (e.g., a smart TV 202a) of the second electronic devices 202 (202a~202d). The first operation information may include information about an operation of performing (e.g., user intent) and a performing target (e.g., a domain) for the first task, parameter information required to execute the operation of performing the first task, or a first operation sequence for the operation of performing the first task. The first task performing information may further include user interface (UI) information related to the first task or the first operation information.

According to an embodiment, the first task performing information may include first operation information (e.g., a first pass rule) for performing the first task by using the first electronic device 201. The first operation information may include information about an operation of performing (e.g., user intent) and a performing target (e.g., a domain) of the first task, the parameter information required to execute the operation of performing the first task, or the first operation sequence for the operation of performing the first task. The first task performing information may further include user interface (UI) information related to the first task or the first operation information.

According to various embodiments, the processor 315 may determine a state of the first electronic device 201. For example, the processor 315 may determine whether there is a relation between the state of the first electronic device 201 and the operation of performing the first task to be performed corresponding to the first request included in the first input speech data. For example, the state of the first electronic device 201 may be an operation for a function (e.g., a first function such as a music playback or a video playback)) being performed at the first electronic device 201, and the first task may be an operation to be performed in response to user's intent extracted as an analysis result for the first input speech data. For example, the processor 315 may determine whether there is the relation between the state (e.g., a first function performing operation) of the first electronic device 201 and the operation of performing the first task.

According to an embodiment, the processor 315 may determine whether there is the relation according to whether the state (e.g., the first function performing operation) of the first electronic device 201 and the operation of performing the first task interfere with each other. For example, if the state e.g., the first function performing operation) of the first electronic device 201 and the operation of performing the first task include at least one same attribute (e.g., an auditory element or a visual element), the processor 315 may determine that the state of the first electronic device 201 and the operation of performing the first task interfere with each other and then determine that there is the relation.

For example, if the first electronic device 201 is performing a first function, such as music playback, and the first task is an "operation to turn on a TV", the processor 315 may determine that the state of the first electronic device 201 includes an attribute including an auditory element, and then determine that an operation of performing the first task has an attribute including an auditory element or a visual element. The state of the first electronic device 201 and the operation of performing the first task include the auditory element as the same attribute, so the processor 315 may determine that the state of the first electronic device 201 and the operation of performing the first task interfere with each other and then determine that there is the relation.

For example, if the first electronic device 201 performs a first function, such as video playback, and the first task is an "operation to turn on a TV", the processor 315 may determine that the state of the first electronic device 201 includes an attribute including an auditory element or a visual element, and then determine that an operation of performing the first task has an attribute including an auditory element or a visual element. The state of the first electronic device 201 and the operation of performing the first task include the auditory element or the visual element as the same attribute, so the processor 315 may determine that the state of the first electronic device 201 and the operation of performing the first task interfere with each other and then determine that there is the relation.

According to an embodiment, in a case of determining that the state of the first electronic device 201 and the operation of performing the first task interfere with each other, the processor 315 may determine the relation according to whether the first electronic device 201 and a target device (e.g., the second electronic device (e.g., the smart TV 202a)) which performs the first task are close to each other. For example, if it is determined that the state of the first electronic device 201 and the operation of performing the first task interfere with each other, the first electronic device 201 may determine whether a distance between the first electronic device 201 and the second electronic device (e.g., the smart TV 202a) as the target device which performs the first task is shorter than a threshold value. If the distance between the first electronic device 201 and the second electronic device (e.g., the smart TV 202a) as the target device which performs the first task is shorter than the threshold value, the processor 315 may determine that there is the relation between that the state of the first electronic device 201 and the operation of performing the first task. According to an embodiment, the threshold value may be set to a minimum distance at which at least one of an audio outputting operation or a visual outputting operation of the first electronic device 201 and the operation of performing the first task interfere with each other. For example, the threshold value may be varied according to operation state information (e.g., a volume level or a screen size) of the first electronic device 201 or the second electronic devices 202 (202a~202d).

According to an embodiment, the processor 315 may previously store capability information including at least one function (or operation), attribute information which is previously designated for determining relation for each function (or operation), or a relation determination condition for each of the first electronic device 201 and the second electronic devices 202 (202a~202d) in the memory 312. For example, the processor 315 may store capability information, attribute information, or a relation determination condition as shown in Table 1 in the memory 312 in a form of a table.

According to an embodiment, the processor 315 may store capability information including at least one function (or operation), attribute information designated for determining a relation for each function (or operation), or a relation determination condition for each of the first electronic device 201 and the second electronic devices 202 (202a~202d) in the memory 312. For example, the processor 315 may store the capability information, the attribute information, or the relation determination condition as shown in Table 1 in the memory 312 in a form of a table.

TABLE 1

| Electronic Device (Ex: User Terminal or AI Speaker) | | TV (Attribute:Auditory Element or Visual Element) | | | | Air conditioner (Attribute:Auditory Element) | |
|---|---|---|---|---|---|---|---|
| | | | | Volume | Volume | | |
| | | TV On | TV Off | Up | Down | ON | OFF |
| Function Being Operated | Music Playback (Attribute:Auditory Element) | o | o | o | o | o | o |
| | Standby Mode | o | o | x | x | x | x |

TABLE 1-continued

| | | TV (Attribute:Auditory Element or Visual Element) | | | | Air conditioner (Attribute:Auditory Element) | |
|---|---|---|---|---|---|---|---|
| Electronic Device (Ex: User Terminal or AI Speaker) | | TV On | TV Off | Volume Up | Volume Down | ON | OFF |
| Component Being Operated | Microphone (Attribute:Auditory Element) | ○ | ○ | ○ | ○ | x | x |
| | Display (Attribute:Visual Element) | x | x | x | x | x | x |
| | Sensors (Attribute:Auditory Element or Visual Element) | ○ | ○ | x | x | ○ | ○ |

According to an embodiment, the processor 315 may determine whether there is the relation according to whether the state of the first electronic device 201 and the operation of performing the first task satisfy the relation determination condition which is previously designated in Table 1 based at least in part on the relation determination condition. For example, if the relation determination condition is satisfied, the processor 315 may determine that there is the relation between the state of the first electronic device 201 and the operation of performing the first task. If the relation determination condition is not satisfied, the processor 315 may determine that there is no relation between the state of the first electronic device 201 and the operation of performing the first task.

According to an embodiment, the relation determination condition which is previously designated in Table 1 may be updated periodically or aperiodically.

According to various embodiments, the processor 315 may transmit a first response related to adjustment of the state of the first electronic device 201 to the first electronic device 201 based at least in part on a result of determining the relation.

The operation of the processor 315 will be described in detail with reference to FIGS. 5 to 18.

Figure 4:
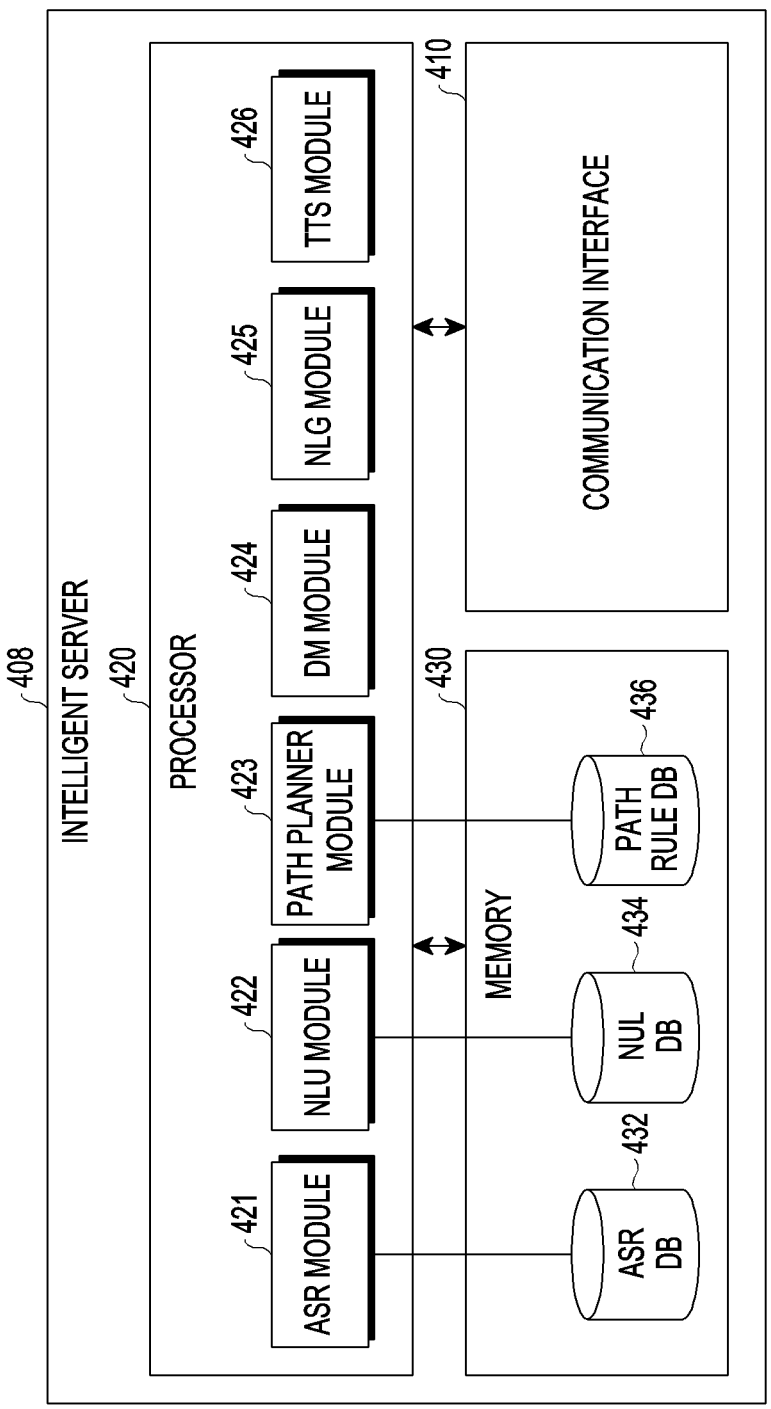
FIG. 4 is a block diagram illustrating an intelligent server for providing a speech recognition control service according to various embodiments.

FIG. 4 is a block diagram illustrating an intelligent server for providing a speech recognition control service according to various embodiments. An intelligent server 408 illustrated in FIG. 4 may include a part or all of a server 108 illustrated in FIG. 1 or an intelligent server 208 illustrated in FIG. 2.

Referring to FIG. 4, the intelligent server 408 is an intelligent server (e.g., Samsung Electronics' Bixby™) which provides a speech recognition control service, and may include, for example, at least one of a communication interface 410, a processor 420, or a memory 430.

The communication interface 410 according to various embodiments may receive input speech data including a request (or a command) by user utterance from a first electronic device (e.g., a first electronic device 201) via a network (e.g., a network 199 in FIG. 1 or a second network 299 in FIG. 2), or transmit, to the first electronic device 201, task performing information including at least part of UI information related to operation information (e.g., a path rule) or the operation information for performing at least one application based on a task which corresponds to output speech data which corresponds to the received input speech data, the request (or the command) by the user utterance included in the received input speech data, or the request (or the command).

According to an embodiment, the communication interface 410 may include a plurality of communication circuits, for example, a part or all of a communication module 190 illustrated in FIG. 1. The communication interface 410 may be referred to as a communication unit or a communication module, may include the communication unit or the communication module as part thereof, or may constitute the communication unit or communication module.

The processor 420 according to various embodiments may overall control the intelligent server 408. The processor 420 may include a part or all of a processor 120 illustrated in FIG. 1. For example, the processor 420 may analyze the user utterance included in the input speech data received from the first electronic device 201 to generate output speech data which corresponds to the input speech data, or to generate information about at least one operation (e.g., a task) for performing at least one application which corresponds to a request (or a command) by the analyzed user utterance, parameter information for performing the operation (e.g., the task), or operation information (e.g., a pass rule) including an operation sequence. For example, the processor 420 may include an automatic speech recognition (ASR) module 421, a natural language understanding (NLU) module 422, a path planner module 423, a dialogue manager (DM) module 424, a natural language generator (NLG) module 425, or a text to speech (TTS) module 426.

Various modules of the intelligent server 408 mentioned in various embodiments of the present invention may be implemented in hardware or in software. In various embodiments, an operation performed by each module of the intelligent server 408 may be understood as an operation performed by the processor 420.

According to an embodiment, the automatic speech recognition (ASR) module 421 may convert input speech data (e.g., first input speech data) as a user input received from the first electronic device 201 into text data. For example, the automatic speech recognition (ASR) module 421 may include a utterance recognition module. The utterance recognition module may include an acoustic model and a language model. For example, the acoustic modem may include vocalization-related information, and the language model may include unit phonemic information and combinations of pieces of unit phonemic information. The utterance recognition module may convert user utterance included in the input speech data into text data by using the vocalization-related information and unit phonemic information. Information about the acoustic model and the language model may be stored in the memory 430 (e.g., an automatic speech recognition database (ASR DB) 432).

The natural language understanding (NLU) module 422 or the pass planner module 423 of the processor 420 may generate the operation information (e.g., the pass rule) including the at least one operation sequence for performing the at least one application based on the user utterance included in the input speech data (e.g., the first input speech data).

According to an embodiment, the input speech data (e.g., the first input speech data) may include a command or a request (e.g., a first request) for execution of an operation (e.g., a first task performing operation) of the first electronic device 201 (e.g., a user terminal 310 in FIG. 3).

According to an embodiment, the input speech data (e.g., the first input speech data) may include a command or a request (e.g., a first request) for execution of an operation (e.g., a first task performing operation) of the second electronic devices (e.g., the second electronic device 202) (e.g., an IoT device).

According to an embodiment, the natural language understanding (NLU) module 422 may perform syntactic analysis or semantic analysis to grasp the user intent. As per the syntactic analysis, the user input may be divided into syntactic units (e.g., words, phrases, or morphemes) and what syntactic elements the syntactic units have may be grasped. The semantic analysis may be performed by using, e.g., semantic matching, rule matching, or formula matching. Thus, the natural language understanding (NLU) module 422 may obtain a domain (e.g., a target device or a target app for execution of an operation), intent (e.g., an operation (e.g., task) to be executed), or a parameter (or a slot) (e.g., a keyword) necessary to represent the intent which corresponds to the user (speech) input.

According to an embodiment, the natural language understanding (NLU) module 422 may determine the user's intent and parameter by using the matching rule which has been divided into the domain, intent, and parameter (or slot) necessary to grasp the intent. For example, one domain (e.g., an alarm service or an alarm device) may include a plurality of intents (e.g., alarm settings or releasing alarm), and one intent may include a plurality of parameters (e.g., time, a repetition count, or an alarm sound). The plurality of rules may include, e.g., one or more essential element parameters. The matching rule may be stored in a natural language understanding database (NLU DB) 434.

According to an embodiment, the natural language understanding (NLU) module 422 may grasp the meaning of a word extracted from the user input by using linguistic features (e.g., syntactic elements) such as morphemes or phrases, match the grasped meaning of the word to the domain and intent, and determine the user's intent. For example, the natural language understanding (NLU) module 422 may calculate how many words extracted from the user input are included in each domain and intent, thereby determining the user's intent. According to an embodiment, the natural language understanding (NLU) module 422 may determine the parameter of the user input by using the word (e.g., the slot (e.g., the keyword)) which is a basis for grasping the intent. According to an embodiment, the natural language understanding (NLU) module 422 may determine the user's intent by using the natural language understanding database (NLU DB) 434 storing the linguistic features for grasping the intent of the user input. According to another embodiment, the natural language understanding (NLU) module 422 may determine the user's intent by using a personal language model (PLM). For example, the natural language understanding (NLU) module 422 may determine the user's intent by using personal information (e.g., contacts list or music list). The personal language model may be stored in, e.g., the natural language understanding database (NLU DB) 434. According to an embodiment, the automatic speech recognition (ASR) module 421, but not the natural language understanding (NLU) module 422 alone, may recognize the user's speech by referring to the personal language model stored in the natural language understanding database (NLU DB) 434.

According to an embodiment, the natural language understanding (NLU) module 422 may generate a path rule based on the intent of the user input and a parameter. For example, the natural language understanding (NLU) module 422 may select an app to be executed based on the intent of the user input and determine an operation to be performed on the selected app. The natural language understanding (NLU) module 422 may determine a parameter which corresponds to the determined operation to generate a path rule. According to an embodiment, the path rule generated by the natural language understanding (NLU) module 422 may include information about the app to be executed, the operation (e.g., at least one or more states) to be executed on the app, and the parameter necessary to execute the operation.

According to an embodiment, the natural language understanding (NLU) module 422 may generate one or more path rules based on the parameter and intent of the user input. For example, the natural language understanding (NLU) module 422 may receive a path rule set which corresponds to the user request (or command) (e.g., the first request) included in the user (speech) input from the path planner module 423, map the parameter and intent of the user input to the received path rule set, and determine the path rule.

According to another embodiment, the natural language understanding (NLU) module 422 may determine the app to be executed, the operation to be executed on the app, and the parameter necessary to execute the operation based on the parameter and intent of the user input, thereby generating the one or more path rules. For example, the natural language understanding (NLU) module 422 may generate a path rule by arranging the app to be executed and the operation to be executed on the app in the form of ontology or a graph model according to the user input by using information of the first electronic device 201 or the second electronic devices 202 (202*a*~202*d*) which corresponds to the domain included in the user request (or command) (e.g., the first request). The generated path rule may be stored via, e.g., the path planner module 423 in a path rule database (path rule DB) 436. The generated path rule may be added to a path rule set of the path rule DB 436.

According to an embodiment, the natural language understanding (NLU) module 422 may select at least one of a plurality of path rules generated. For example, the natural language understanding (NLU) module 422 may select the optimal one of the plurality of path rules. As another example, the natural language understanding (NLU) module 422 may select a plurality of path rules if only some operations are specified based on the user utterance. The natural language understanding (NLU) module 422 may determine one of the plurality of path rules by the user's additional input (e.g., second input speech data).

According to an embodiment, the natural language understanding (NLU) module 422 may transmit the path rule to a target (e.g., the first electronic device 201 or the second electronic devices 202 (202*a*~202*d*)) which corresponds to the domain at a request (or a command) for the user input obtained by the first electronic device 201. For example, the natural language understanding (NLU) module 422 may transmit one path rule which corresponds to the user input to the first electronic device 201 (e.g., the user terminal 310 in FIG. 3). As another example, the natural language understanding (NLU) module 422 may transmit, to the target (e.g., the first electronic device 201 or the second electronic devices 202 (202a~202d)) which corresponds to the domain, a plurality of path rules which correspond to the user input inputted by the first electronic device 201 (e.g., the user terminal). For example, if only some operations are specified based on the user utterance, the plurality of path rules may be generated by the natural language understanding (NLU) module 422.

According to an embodiment, the path planner module 423 may select at least one of the plurality of path rules.

According to an embodiment, the path planner module 423 may transfer a path rule set including the plurality of path rules to the natural language understanding (NLU) module 422. The plurality of path rules in the path rule set may be stored in the form of a table in the path rule database (DB) 436 connected with the path planner module 423. For example, the path planner module 423 may transfer, to the natural language understanding (NLU) module 422, a path rule set which corresponds to information (e.g., OS information and app information) of the first electronic device 201 (e.g., the user terminal) which is received from the intelligent agent (e.g., the intelligent agent 322). The table stored in the path rule database 436 may be stored, e.g., per domain or per domain version.

According to an embodiment, the path planner module 423 may select one or more path rules from the path rule set and transfer the one or more path rules to the natural language understanding (NLU) module 422. For example, the path planner module 423 may match the user's intent and parameter to the path rule set which corresponds to the first electronic device 201 to select one or more path rules and transfer the one or more path rules to the natural language understanding (NLU) module 422.

According to an embodiment, the path planner module 423 may generate one or more path rules by using the user's intent and parameter. For example, the path planner module 423 may determine an app to be executed and an operation to be executed on the app based on the user's intent and parameter to generate one or more path rules. According to an embodiment, the path planner module 423 may store the generated path rule in the path rule database 436.

According to an embodiment, the path planner module 423 may store the path rule generated by the natural language understanding (NLU) module 422 in the path rule database 436. The generated path rule may be added to the path rule set stored in the path rule database 436.

According to an embodiment, the table stored in the path rule database (DB) 436 may include a plurality of path rules or a plurality of path rule sets. The plurality of path rules or the plurality of path rule sets may reflect a kind, a version, a type, or nature of a device performing each path rule.

According to an embodiment, if the first request included in the first input speech data includes performing the first task (e.g., an audio outputting operation or a visual data outputting operation) in the first electronic device 201, the natural language understanding (NLU) module 422 may determine that the domain is the first electronic device 201 based at least in part on the user intent or the domain according to a detected slot as a result of analyzing the first input speech data, determine that the user intent is the performing the first task (e.g., the audio outputting operation or the visual data outputting operation), and then receive at least one pass rule which corresponds to a parameter required to execute the first task performing operation in the first electronic device 201 from the pass planner module 423.

According to an embodiment, if the first request included in the first input speech data includes performing the first task (e.g., an audio outputting operation or a visual output operation) in a specific second electronic device (e.g., a smart TV 202a) of the second electronic devices 202 (202a~202d), the natural language understanding (NLU) module 422 may determine that the domain is the second electronic device (e.g., the smart TV 202a) based at least in part on the user intent or the domain according to a detected slot as a result of analyzing the first input speech data, determine that the user intent is the performing the first task (e.g., the audio outputting operation or the visual data outputting operation), and then receive at least one pass rule which corresponds to a parameter required to execute the first task performing operation in the second electronic device (e.g., the smart TV 202a) from the pass planner module 423.

According to an embodiment, the dialogue manager (DM) module 424 may determine whether the user's intent grasped by the natural language understanding (NLU) module 422 is clear. For example, the dialogue manager (DM) module 424 may determine whether the user's intent is clear based on whether information about a parameter is sufficient. The dialogue manager (DM) module 424 may determine whether the parameter grasped by the natural language understanding (NLU) module 422 is sufficient to perform a task or an operation. According to an embodiment, if the user's intent is unclear, dialogue manager (DM) module 424 may perform feedback to request necessary information to the user. For example, the dialogue manager (DM) module 424 may perform feedback to request information about a parameter to grasp the user's intent.

According to an embodiment, the dialogue manager (DM) module 424 may include a content provider module. If the content provider module is capable of performing an operation based on intent and a parameter grasped by the natural language understanding (NLU) module 422, the content provider module may generate a results of performing the task which corresponds to the user input. According to an embodiment, the dialogue manager (DM) module 424 may transmit the result generated by the content provider module to the first electronic device 201 (e.g., the user terminal) in response to the user input.

According to an embodiment, the natural language generator (NLG) module 425 may convert designated information into a text form. The information converted into the text form may be in a form of natural language utterance. The designated information may be, e.g., information about an additional input, information indicating that the operation which corresponds to the user input is completed, or information indicating the user's additional input (e.g., feedback information for the user input). The information converted into the text form may be transmitted to the first electronic device 201 (e.g., the user terminal) and displayed on a display device (e.g., a display 313), or the information converted into the text form may be transmitted to the text to speech (TTS) module 426 and converted into a speech form.

According to an embodiment, the text to speech (TTS) module 426 may convert the information in the text form into information in a speech form. The text to speech (TTS) module 426 may receive the information in the text form from the natural language generator (NLG) module 425, convert the information in the text form into the information in the speech form, and transmit the information in the speech form to the first electronic device 201 (e.g., the user terminal). The first electronic device 201 (e.g., the user terminal) may output information in the speech form via an acoustic output device (e.g., a speaker 314) or a functional connection device (e.g., an AI speaker 201b) which is functionally connected to the first electronic device 201 (e.g., the user terminal).

According to an embodiment, the natural language understanding (NLU) module 422, the path planner module 423, and the dialogue manager (DM) module 424 may be implemented in a single module. For example, the natural language understanding (NLU) module 422, the path planner module 423, or the dialogue manager (DM) module 424 may be implemented in a single module to determine the user's intent and a parameter and to generate a response (e.g., a path rule or output speech data) which corresponds to the user's intent and the parameter determined. Accordingly, the generated response may be transmitted to the first electronic device 201 (e.g., the user terminal).

According to an embodiment, the processor 420 may receive a user speech from the first electronic device 201 via the communication interface 410. For example, the processor 420 may receive, from the first electronic device 201, first input speech data including a first request for performing a first task by using one (e.g., the smart TV 202a) of the second electronic devices 202 (202a~202d) by user utterance.

According to an embodiment, the first task performing operation may include an audio outputting operation or a visual outputting operation performed by the first electronic device 201. For example, the first task performing operation may be an operation of outputting audio data via an acoustic output device (e.g., the speaker 314) of the first electronic device 201. The first task performing operation may be an operation of outputting audio data via the first electronic device 201 or a functional connection device (e.g., an AI speaker (e.g., 201b)) which is functionally connected to the first electronic device 201. The first task performing operation may be an operation of outputting visual data via the display 313 of the first electronic device 201. The first task performing operation may be an operation of outputting visual data via an external display device (e.g., a TV, a monitor, and a display) (not shown) controlled by the first electronic device 201.

According to an embodiment, the first task performing operation may include an audio outputting operation or a visual outputting operation performed by the second electronic devices 202 (202a~202d). For example, the first task performing operation may be an operation of outputting audio data via an acoustic output device (e.g., the speaker 314) of the second electronic devices 202 (202a~202d). The first task performing operation may be an operation of outputting visual data via a display device (e.g., a display) of the second electronic devices 202 (202a~202d).

According to an embodiment, the processor 420 may receive device information or state information of the first electronic device 201 or the second electronic devices 202 (202a~202d) from the first electronic device 201 via the communication interface 410 (e.g., a long-range wireless communication). For example, the processor 420 may periodically receive, or receive in response to a request of the processor 420, the device information or the state information of the first electronic device 201 or the second electronic devices 202 (202a~202d).

According to an embodiment, the processor 420 may transmit and receive data or information (e.g., respective device information or state information) of the second electronic devices 202 (202a~202d) to and from an IoT server 209 (e.g., a cloud) at which one of the second electronic devices 202 (202a~202d) is registered via the communication interface 410 (e.g., the long-range wireless communication).

According to various embodiments, the processor 420 may transmit, to the first electronic device 201, the first task performing information related to performing the first task which corresponds to the first request included in the received first input speech data.

For example, the processor 420 may transmit the first task performing information to the first electronic device 201 via the communication interface 410 (e.g., the long-range wireless communication).

According to an embodiment, the first task performing information may include first operation information (e.g., a first pass rule) for performing the first task by using one (e.g., the smart TV 202a) of the second electronic devices 202 (202a~202d). The first operation information may include information about an operation of performing (e.g., user intent) and a performing target (e.g., a domain) for the first task, parameter information required to execute the operation of performing the first task, or a first operation sequence for the operation of performing the first task. The first task performing information may further include user interface (UI) information related to the first task or the first operation information.

According to an embodiment, the processor 420 may analyze the first input speech data to generate the first task performing information including domain information, intent or a pass rule for the first request, and transmit the first task performing information to the first electronic device 201. For example, the domain information for the first request is a target device or a target app (or a function (an operation)) for performing the first request, and the processor 420 may determine the domain information as one (e.g., the smart TV 202a) of the second electronic devices 202 (202a~202d). The intent is an action or an operation to be performed in response to the first request, and the processor 420 may determine the intent as the first task performing operation to be performed in the second electronic device (e.g., the smart TV 202a). The pass rule is an operation sequence for the domain to perform the intent, and the processor 420 may receive a first operation sequence which corresponds to the first task performing operation of the second electronic device (e.g., the smart TV 202a) selected from a plurality of pass rule sets from the pass planner module 423.

If the first task performing information is received, the first electronic device 201 may transmit a first command including the first task performing information to the second electronic device (e.g., the smart TV 202a), and the second electronic device (e.g., the smart TV 202a) may perform the first task based on the first task performing information included in the first command. The second electronic device (e.g., the smart TV 202a) may transmit feedback information including a result of performing the first task to the first electronic device 201. The second electronic device (e.g., the smart TV 202a) may transmit the feedback information including the result of performing the first task to the intelligent server 408 via the IoT server 209 (e.g., the cloud) at which the second electronic device (e.g., the smart TV 202a) is registered.

According to various embodiments, the processor 420 may receive state information of the first electronic device 201 or the second electronic devices 202 (202a~202d).

According to an embodiment, the processor 420 may receive state information of the first electronic device 201 or state information of a device (e.g., the second electronic device (e.g., the smart TV 202a)) which is performing the first task from the first electronic device 201 via the communication interface 410 (e.g., the long-range wireless communication).

According to an embodiment, the processor 420 may receive the feedback information including the result of performing the first task of the second electronic device (e.g., the smart TV 202a) from the IoT server 209 (e.g., the cloud) connected to the network 299 (e.g., the second network 199) (e.g., the long-range wireless communication). The feedback information may further include state information of the second electronic device (e.g., the smart TV 202a).

The processor 420 may periodically receive or may receive in response to a request of the intelligent server 408, state information of the first electronic device 201 or the second electronic devices 202 (202a~202d).

According to various embodiments, the processor 420 may determine relation between the state of the first electronic device 201 and the first task. For example, the state of the first electronic device 201 may be an operation for a function (e.g., a first function such as music playback or video playback) which is being performed at the first electronic device 201, and the first task may be an operation which will be performed in response to user intent extracted from an analysis result of the first input speech data. For example, the processor 420 may determine whether there is the relation between the state (e.g., a first function performing operation) of the first electronic device 201 and the operation of performing the first task.

According to an embodiment, the processor 420 may determine whether there is the relation according to whether the state of the first electronic device 201 (e.g., the first function performing operation) and the operation of performing the first task interfere with each other. For example, if the state of the first electronic device 201 (e.g., the first function performing operation) and the operation of performing the first task include at least one same attribute (an auditory element or a visual element), the processor 420 may determine that the state of the first electronic device 201 and the operation of performing the first task interfere with each other and then determine that there is the relation.

For example, if the first electronic device 201 performs a first function, such as music playback, and the first task is an "operation to turn on a TV", the processor 420 may determine that the state of the first electronic device 201 includes an attribute including an auditory element, and then determine that the operation of performing the first task has an attribute including an auditory element or a visual element. The state of the first electronic device 201 and the operation of performing the first task include the auditory element as the same attribute, so the processor 420 may determine that the state of the first electronic device 201 and the operation of performing the first task interfere with each other and then determine that there is the relation.

For example, if the first electronic device 201 performs a first function, such as video playback, and the first task is an "operation to turn on a TV", the processor 420 may determine that the state of the first electronic device 201 includes an attribute including an auditory element or a visual element, and then determine that the operation of performing the first task has an attribute including an auditory element or a visual element. The state of the first electronic device 201 and the operation of performing the first task include the auditory element or the visual element as the same attribute, so the processor 420 may determine that the state of the first electronic device 201 and the operation of performing the first task interfere with each other and then determine that there is the relation.

According to an embodiment, the processor 420 may determine whether there is the relation according to whether the first electronic device 201 and a target device (e.g., the second electronic device (e.g., the smart TV 202a)) which performs the first task are close to each other such that the state of the first electronic device 201 and the operation of performing the first task interfere with each other. For example, if it is determined that the state of the first electronic device 201 and the operation of performing the first task interfere with each other, the processor 420 may determine whether a distance between the first electronic device 201 and the second electronic device (e.g., the smart TV 202a) as the target device which performs the first task is shorter than a threshold value. If the distance between the first electronic device 201 and the second electronic device (e.g., the smart TV 202a) as the target device which performs the first task is shorter than the threshold value, the first electronic device 201 may determine that there is the relation between that the state of the first electronic device 201 and the operation of performing the first task. According to an embodiment, the threshold value may be set to a minimum distance at which at least one of an audio outputting operation or a visual outputting operation of the first electronic device 201 and the operation of performing the first task interfere with each other.

According to an embodiment, the processor 420 may previously store capability information including at least one function (or operation), attribute information which is previously for determining whether there is a relation for each function (or operation), or a relation determination condition for each of the first electronic device 201 and the second electronic devices 202 (202a~202d) in the memory 430. For example, the processor 420 may store capability information, attribute information, or a relation determination condition as shown in Table 1 in the memory 430 in a form of a table.

According to an embodiment, the processor 420 may determine whether there is the relation according to whether the state of the first electronic device 201 and the operation of performing the first task satisfy the relation determination condition which is designated in Table 1 based at least in part on the relation determination condition. For example, if the relation determination condition is satisfied, the processor 420 may determine that there is the relation between the state of the first electronic device 201 and the operation of performing the first task. If the relation determination condition is not satisfied, the processor 420 may determine that there is no relation between the state of the first electronic device 201 and the operation of performing the first task.

According to an embodiment, the relation determination condition which is designated in Table 1 may be periodically or aperiodically updated.

According to various embodiments, the processor 420 may transmit a first response related to adjustment of the state of the first electronic device 201 to the first electronic device 201 based at least in part on a result of determining whether there is the relation.

The operation of the processor 420 will be described in detail with reference to FIGS. 9 to 18.

A server (e.g., a server 108 in FIG. 1 or an intelligent server 208 in FIG. 2) according to one of various embodiments of the present invention includes at least one communication interface; at least one processor operatively connected to the communication interface; and at least one memory operatively connected to the processor, and the memory may be configured to store instructions, when executed, causes the processor to: receive, from a first electronic device, first input speech data including a first request for performing a first task by using a second electronic device by user utterance; determine or receive a state of the first electronic device; and provide the first electronic device with a first response related to adjustment of the state of the first electronic device.

According to various embodiments, the instructions may cause the processor to: analyze the first request included in the first input speech data; based at least in part on the analysis result, determine whether there is relation between the state of the first electronic device and an operation of performing the first task to be performed based on the first request, or receive a determination result of the relation from the first electronic device; if it is determined that there is the relation between the state of the first electronic device and the operation of performing the first task, generate first output speech data related to the adjustment of the state of the first electronic device; and transmit the first response including the first output speech data to the first electronic device.

According to various embodiments, the instructions may cause the processor to: upon determining that there is the relation, determine whether at least one of an audio output or a visual output of the first electronic interferes with at least one of an audio output or a visual output of the second electronic device.

According to various embodiments, the instructions may cause the processor to: upon determining that there is the relation, determine whether the at least one of the audio output or the visual output of the first electronic device and the at least one of the audio output or the visual output of the second electronic device include the same attribute.

According to various embodiments, the instructions may cause the processor to: determine whether the first electronic device and the second first electronic device are close to each other such that the at least one of the audio output or the visual output of the first electronic device interferes with the at least one of the audio output or the visual output of the second electronic device.

According to various embodiments, the first output speech data may include a follow-up question about performing a second task related to the adjustment of the state of the first electronic device.

According to various embodiments, the instructions may cause the processor to: analyze the first request included in the first input speech data; based at least in part on the analysis result, determine whether there is relation between the state of the first electronic device and an operation of performing the first task to be performed based on the first request, or receive a determination result of the relation from the first electronic device; if it is determined that there is the relation between the state of the first electronic device and the operation of performing the first task, generate information including at least part of auditory information or visual information related to the adjustment of the state of the first electronic device; and transmit the first response including the information to the first electronic device.

According to various embodiments, the instructions may cause the processor to: analyze the first request included in the first input speech data; based at least in part on the analysis result, generate first task performing information for performing the first task which corresponds to the first request; and transmit the first task performing information to the second electronic device, and the first task performing information may include first operation information related to an operation of performing the first task.

According to various embodiments, the first operation information may include information about an operation of performing and a performing target for the first task, parameter information for the operation of performing the first task, or a first operation sequence for the operation of performing the first task.

According to various embodiments, the instructions may cause the processor to: analyze the first request included in the first input speech data; based at least in part on the analysis result, determine whether there is relation between the state of the first electronic device and an operation of performing the first task to be performed based on the first request, or receive a determination result of the relation from the first electronic device; if it is determined that there is the relation between the state of the first electronic device and the operation of performing the first task, generate second task performing information for performing a second task related to the adjustment of the state of the first electronic device; and transmit the second task performing information to the first electronic device.

An electronic device (e.g., electronic devices 101, 102, and 104 in FIG. 1, or electronic devices 201 and 202 in FIG. 2) according to one of various embodiments of the present invention includes at least one communication interface, at least one processor operatively connected to the communication interface, and at least one memory operatively connected to the processor, and the memory may be configured to store instructions, when executed, cause the processor to: obtain, via the electronic device, first input speech data including a first request for performing a first task by using a first external electronic device by user utterance, transmit the obtained first input speech data to a second external electronic device, and receive, from the second external electronic device, a first response related to adjustment of a state of the electronic device.

According to various embodiments, the memory may be configured to store instructions, when executed, cause the processor to: receive, from the second external electronic device, first task performing information for performing the first task which corresponds to the first request included in the first input speech data; identify an operation of performing the first task to be performed based on the first request from the first task performing information; determine whether there is relation between the state of the electronic device and the operation of performing the first task; if it is determined that there is the relation between the state of the electronic device and the operation of performing the first task, transmit, to the second external electronic device, a request for first output speech data related to the adjustment of the state of the electronic device; and receive, from the second external electronic device, the first response including the first output speech data.

According to various embodiments, the memory may be configured to store instructions, when executed, cause the processor to: upon determining that there is the relation, determine whether at least one of an audio output or a visual output of the electronic device interferes with at least one of an audio output or a visual output of the first external electronic device.

According to various embodiments, the memory may be configured to store instructions, when executed, cause the processor to: upon determining that there is the relation, determine whether a distance between the electronic device and the first external electronic device at which the first task will be performed is shorter than a threshold value, and the threshold value may be set to a minimum distance at which the at least one of the audio output or the visual output of the electronic device may interfere with the at least one of the audio output or the visual output of the first external electronic device.

According to various embodiments, the memory may be configured to store instructions, when executed, cause the processor to: based on the first task performing information, generate a first command which causes the first external electronic device to perform the first task; and transmit the first command to the first external electronic device.

According to various embodiments, the memory may be configured to store instructions, when executed, cause the processor to: transmit state information of the electronic device to the second external electronic device; and receive, from the second external electronic device, the first response including first output speech data related to the adjustment of the state of the electronic device.

According to various embodiments, the first output speech data may include a follow-up question for performing a second task related to the adjustment of the state of the electronic device, and the memory may be configured to store instructions, when executed, cause the processor to: output the first output speech data via an acoustic output device of the electronic device or a device which is functionally connected to the electronic device.

According to various embodiments, the memory may be configured to store instructions, when executed, cause the processor to: receive a user input for the follow-up question; in response to reception of the user input, transmit, to the second external electronic device, a request for second task performing information for performing the second task related to the adjustment of the electronic device; receive the second task performing information from the second external electronic device; and based on the second task performing information, perform the second task to adjust the state of the electronic device.

According to various embodiments, the memory may be configured to store instructions, when executed, cause the processor to: transmit state information of the electronic device to the second external electronic device; receive, from the second external electronic device, information including at least part of auditory information or visual information related to the adjustment of the state of the electronic device.

An electronic device (e.g., electronic devices 101, 102, and 104 in FIG. 1, or electronic devices 201 and 202 in FIG. 2) according to one of various embodiments of the present invention includes at least one communication interface, at least one processor operatively connected to the communication interface, and at least one memory operatively connected to the processor, and the memory may be configured to store instructions, when executed, cause the processor to: receive, from a first external electronic device, first input speech data including a first request for performing a first task by using the first external electronic device by user utterance, determine or receive a state of a second external electronic device, and provide the first external electronic device with an indication related to adjustment of the state of the second external electronic device.

Figure 5:
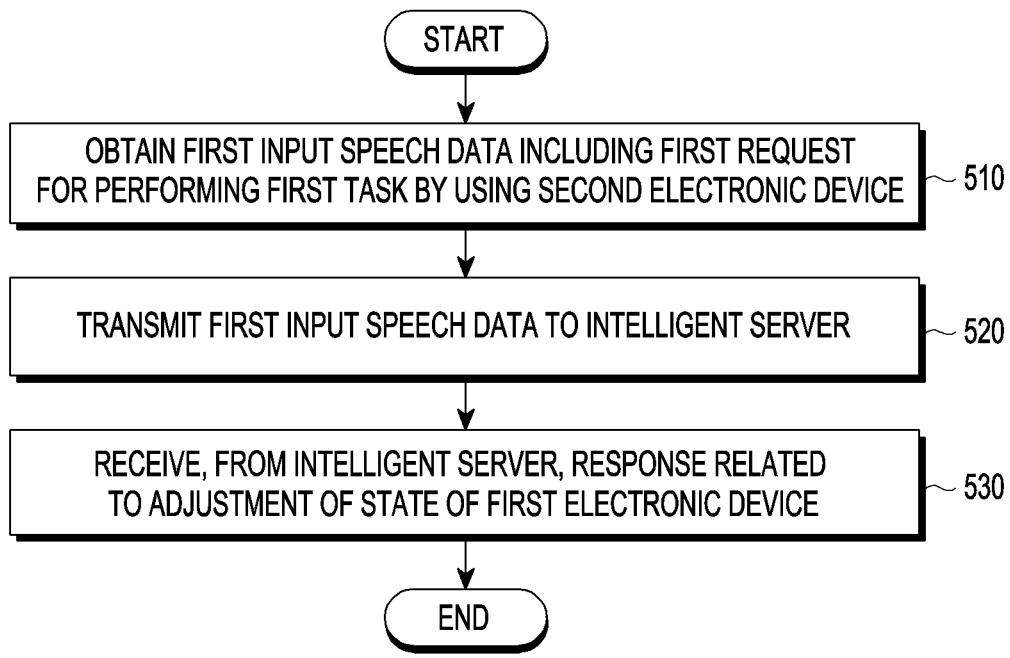
FIG. 5 is a flowchart illustrating a speech recognition control method by a first electronic device according to various embodiments.

FIG. 5 is a flowchart illustrating a speech recognition control method by a first electronic device according to various embodiments. The method may be performed by at least one of the first electronic device (e.g., a first electronic device 201) or a processor (e.g., a processor 315) of the first electronic device.

Referring to FIG. 5, in operation 510, for example, the first electronic device 201 may obtain first input speech data including a first request for performing a first task by using a second electronic device (e.g., second electronic devices 202 (202a~202d)). For example, the first electronic device 201 may obtain the first input speech data including the first request according to user utterance.

According to an embodiment, the first electronic device 201 may obtain the first input speech data including the first request via a speech input device (e.g., an input module 311) (e.g., a microphone 311a) of the first electronic device 201.

According to an embodiment, a smart phone 201a may obtain first input speech data including a first request via a functional connection device (e.g., an AI speaker 201b) which is functionally connected to the smart phone 201a.

According to an embodiment, the first request may be a request which causes to perform the first task by using one (e.g., a smart TV 202a) of at least one second electronic device (e.g., the second electronic devices 202 (202a~202d)).

According to an embodiment, an operation of performing the first task according to the first request may be an operation of performing at least one of an audio output or a visual output, and the second electronic device (e.g., the smart TV 202a) as a device which performs the first task according to the first request may provide a function capable of performing at least one of the audio output or the visual output.

In operation 520, for example, the first electronic device 201 may transmit the first input speech data to an intelligent server (e.g., an intelligent server 408) (e.g., a speech recognition server) (e.g., Samsung Electronics' Bixby™ server) via a second network (e.g., a second network 299) (e.g., a long-range wireless communication). For example, the first electronic device 201 may transmit the first input speech data to the intelligent server 408 via the second network 299 by using a communication interface (e.g., a communication module 190) (e.g., a long-range wireless communication interface) of the first electronic device 201.

In operation 530, for example, the first electronic device 201 may receive a first response related to adjustment of a state of the first electronic device 201 from the intelligent server 408.

According to one embodiment, the first electronic device 201 may receive, from the intelligent server 408, first task performing information for performing the first task which corresponds to the first request included in the first input speech data. According to various embodiments, the first electronic device 201 may identify an operation of performing the first task to be performed based on the first request from the first task performing information, and determine whether there is a relation between the state of the first electronic device 201 and the operation of performing the first task. If it is determined that there is the relation between the state of the first electronic device 201 and the operation of performing the first task, the first electronic device 201 may transmit, to the intelligent server 208, a request for first output speech data related to the adjustment of the state of the first electronic device 201. The first electronic device may receive the first response including the first output speech data from the intelligent server. According to various embodiments, the first electronic device 201 may receive a result of determining the relation from the intelligent server 408.

According to an embodiment, the first output speech data may include a follow-up question about performing a second task related to the adjustment of the state of the first electronic device 201. For example, if the state of the first electronic device 201 is a state in which a first function (e.g., music playback) is being performed, the first electronic device 201 may receive, from the intelligent server 208, the first response including the first output speech data (e.g., "Do you want to reduce the sound of music?", "Do you want to increase the sound of music?", or "Do you want to stop playing music?") related to the adjustment of the state (e.g., a state for music playback) of the first electronic device 201.

After operation 530, the first electronic device 201 may further perform at least one follow-up operation, and the at least one follow-up operation will be described in more detail with reference to FIGS. 17 and 18.

Figure 6:
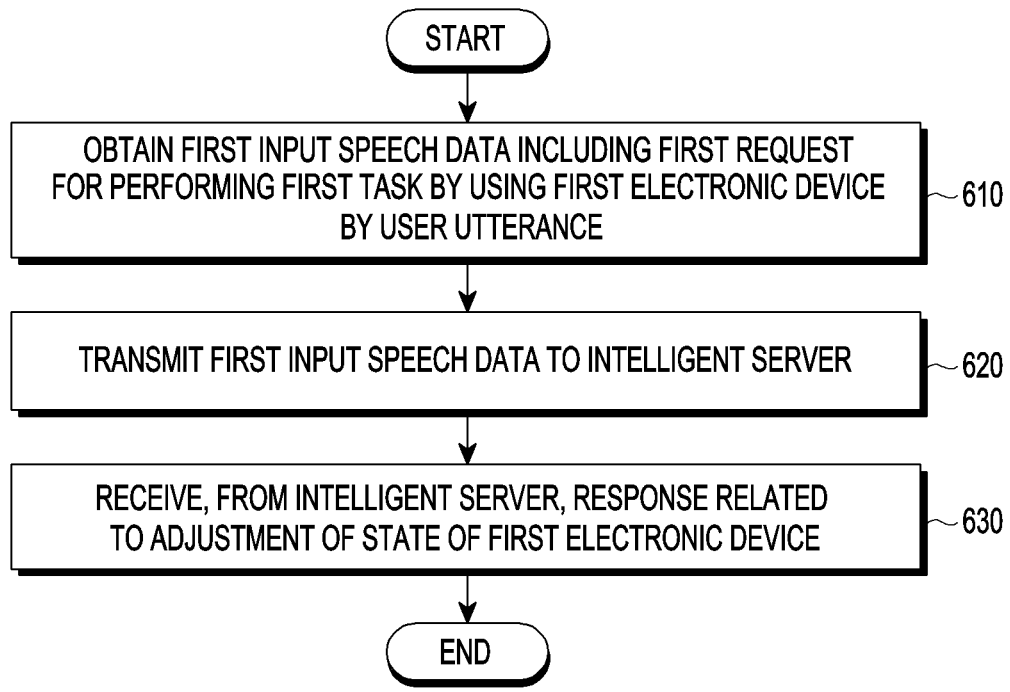
FIG. 6 is a flowchart illustrating a speech recognition control method by a first electronic device according to various embodiments.

FIG. 6 is a flowchart illustrating a speech recognition control method by a first electronic device according to various embodiments. The method may be performed by at least one of the first electronic device (e.g., an electronic device 201 in FIG. 2) or a processor (e.g., a processor 315 in FIG. 3b) of the first electronic device.

Referring to FIG. 6, in operation 610, for example, a first electronic device 201 may obtain user speech. For example, the first electronic device 201 may obtain first input speech data including a first request by user utterance.

According to an embodiment, the first electronic device 201 may obtain the first input speech data including the first request via a speech input device (e.g., an input module 311 or a microphone 311a in FIG. 3b) of the first electronic device 201.

According to an embodiment, a smart phone (e.g., a smart phone 201a in FIG. 2) may obtain the first input speech data including the first request via a functional connection device (e.g., an AI speaker 201b) which is functionally connected to the smart phone 201a.

According to an embodiment, the first request may be a request (e.g., "Play music") which causes to perform a first task by using the first electronic device 201.

According to an embodiment, an operation of performing the first task according to the first request may be an operation of performing at least one of an audio output or a visual output, and the first electronic device 201 as a device which performs the first task according to the first request may provide a function capable of performing at least one of the audio output or the visual output.

In operation 620, for example, the first electronic device 201 may transmit the first input speech data to an intelligent server (e.g., an intelligent server 408) (e.g., a speech recognition server) (e.g., Samsung Electronics' Bixby™ server) via a second network (e.g., a second network 299) (e.g., a long-range wireless communication). For example, the first electronic device 201 may transmit the first input speech data to the intelligent server (e.g., the intelligent server 408 in FIG. 4) via the second network 299 by using a communication interface (e.g., a communication module 190) (e.g., a long-range wireless communication interface) of the first electronic device.

In operation 630, for example, the first electronic device may receive an indication related to adjustment of the state of the second electronic device (e.g., second electronic devices 202 (202a~202d)) (e.g., a smart TV 202a) from the intelligent server 408.

According to one embodiment, the first electronic device 201 may receive, from the intelligent server 408, first task performing information for performing the first task which corresponds to the first request included in the first input speech data. According to various embodiments, the first electronic device 201 may identify an operation of performing the first task to be performed based on the first request from the first task performing information, and determine whether there is relation between an operation of performing the first task to be performed in the first electronic device 201 and a state of at least one second electronic device 202 around the first electronic device 201. According to various embodiments, the first electronic device 201 may receive a result of determining the relation from the intelligent server 408.

According to various embodiments, based on the result of determining the relation, the first electronic device 201 may generate an indication related to the adjustment of the state of the second electronic device 202 to control to adjust the state of the second electronic device 202. According to various embodiments, based on the result of determining the relation, the first electronic device 201 may receive, from the intelligent server 408, an indication related to the adjustment of the state of the second electronic device 202, and control to adjust the state of the second electronic device 202 according to the received indication. According to various embodiments, based on the result of determining the relation, the intelligent server 408 may generate an indication related to the adjustment of the state of the second electronic device 202 to control to adjust the state of the second electronic device 202.

According to various embodiments, based on the result of determining the relation, the second electronic device 202 may receive, from the intelligent server 408, an indication related to the adjustment of the state of the second electronic device 202, and control to adjust the state of the second electronic device 202 according to the received indication. According to various embodiments, based on the result of determining the relation, the intelligent server 408 may generate an indication related to the adjustment of the state of the second electronic device 202 to control to adjust the state of the second electronic device 202.

According to an embodiment, the indication may include at least part of auditory information or visual information related to the adjustment of the state of the at least one second electronic device 202. For example, the auditory information may include a notification sound notifying the adjustment of the state of the at least one second electronic device 202 or first output speech data (e.g., "Do you want to reduce a volume of a TV?" or "Do you want to increase a volume of a TV?") including a follow-up question related to the adjustment of the state of the at least one second electronic device 202. The first electronic device 201 may output the auditory information via an acoustic output device (e.g., a speaker 314) or a functional connection device (e.g., an AI speaker 201b) which is functionally connected to the first electronic device 201. For example, the visual information may include a text, a character, a picture, a photo or an emoticon related to the adjustment of the state of the at least one second electronic device 202. The visual information may include a user interface (UI) such as a conversational application. The visual information may be a user interface (UI) including at least one input button (icon) for receiving the follow-up question included in the first output speech data related to the adjustment of the state of the at least one second electronic device 202 and a user input for the follow-up question. The visual information is not limited to this, and may include all various visual representations. The first electronic device 201 may output the visual information via a display device (e.g., a display 313). The first electronic device 201 may simultaneously output the auditory information and the visual information via the acoustic output device and the display device.

After operation 630, the first electronic device 201 may further perform at least one follow-up operation, and the at least one follow-up operation will be described in more detail with reference to FIGS. 17 and 18.

Figure 7:
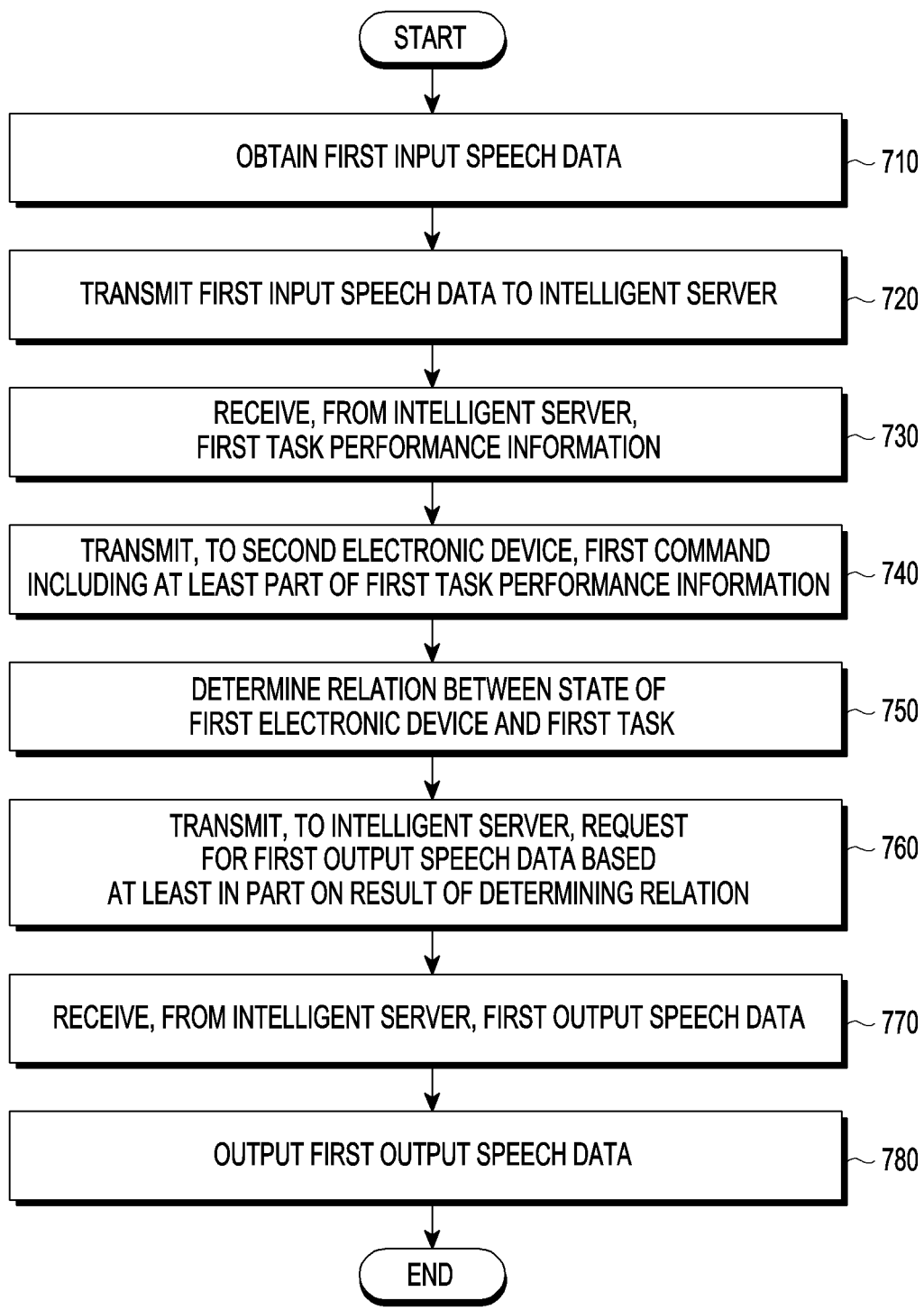
FIG. 7 is a flowchart illustrating a speech recognition control method by a first electronic device according to various embodiments.

FIG. 7 is a flowchart illustrating a speech recognition control method by an electronic device according to various embodiments. The method may be performed by at least one of a first electronic device (e.g., a first electronic device 201 in FIG. 2) or a processor (e.g., a processor 315 in FIG. 3b) of the first electronic device. Referring to FIG. 7, upon receiving a speech input for controlling a second electronic device (e.g., a second electronic device 202 in FIG. 2), the first electronic device 201 may control the first electronic device 201 or output information (e.g., speech data) by determining relation between a task which corresponds to the received speech input for controlling the second electronic device 202 and a state of the first electronic device 201.

Referring to FIG. 7, in operation 710, the first electronic device 201 may obtain first input speech data. For example, the first electronic device 201 may obtain a user's speech by using a microphone (e.g., a microphone 311a in FIG. 3b) included in the first electronic device 201. For example, the first electronic device 201 may obtain first input speech data including a first request by the user's utterance.

According to an embodiment, the first request may be a request for performing a first task by using one (e.g., a smart TV 202a) of at least one second electronic device (e.g., second electronic devices 202 (202a~202d)) registered at a communication connection app (e.g., Samsung Connect™) of the first electronic device 201. For example, the first request may be a request to cause one (e.g., the smart TV 202a) of the at least one second electronic device registered at the communication connection app of the first electronic device 201 to perform at least one of an audio output or a visual output as the first task. For example, the first input speech data may include a first request such as "Turn on the TV".

According to an embodiment, the first electronic device 201 may obtain the first input speech data including the first request via a speech input device (e.g., the microphone 311a) of the first electronic device 201. The first electronic device 201 may obtain the first input speech data including the first request via a speech input device (e.g., a microphone) of a functional connection device (e.g., an AI speaker 201b) which is functionally connected (e.g., a BT connection) to the first electronic device 201.

In operation 720, for example, the first electronic device 201 may transmit the first input speech data to an intelligent server (e.g., an intelligent server 408) (e.g., a speech recognition server) (e.g., Samsung Electronics' Bixby™ server).

According to an embodiment, the first electronic device 201 may transmit the first input speech data along with state information of the first electronic device 201 to the intelligent server 408. According to various embodiments, the intelligent server 408 may receive the state information of the first electronic device 201 from an IoT server 209 instead of receiving the state information from the first electronic device 201.

In operation 730, for example, the first electronic device 201 may receive first task performing information for performing the first task from the intelligent server 408 in response to the transmission of the first input speech data.

According to an embodiment, the first task performing information may include first operation information (e.g., a first pass rule) related to an operation for performing the first task. For example, the first operation information may include information about an operation and a performing target for the first task, parameter information for the operation of performing the first task, or a first operation sequence for the operation of performing the first task. The first task performing information may further include user interface (UI) information related to the first task or the first operation information.

In operation 740, for example, the first electronic device 201 may transmit a first command including at least part of the first task performing information to the second electronic device (e.g., the smart TV 202a).

According to an embodiment, the first electronic device 201 may identify a domain as a target device which will perform the first task from the first operation information included in the first task performing information based at least in part on the first task performing information received from the intelligent server 408, and search for the target device which corresponds to the identified domain. For example, the first electronic device 201 may search for a device which corresponds to the identified domain among the at least one second electronic device 202 registered at the communication connection app (e.g., Samsung Connect™) of the first electronic device. For example, if the identified domain is a "TV", the first electronic device 201 may detect a second electronic device (e.g., the smart TV 202a) which corresponds to the "TV" as a target device which corresponds to the identified domain among the at least one second electronic device 202. According to an embodiment, if there are a plurality of second electronic devices 202 which correspond to the "TV", the second electronic device 202 having a higher priority may be selected according to a designated priority. The first electronic device 201 may generate a first command based at least in part on the first task performing information for performing the first task, and transmit the first command to the detected second electronic device (e.g., the smart TV 202a) as the target device which corresponds to the identified domain.

In operation 750, the first electronic device 201 may determine relation between the state of the first electronic device 201 and the first task. For example, the first electronic device 201 may determine relation between the state of the first electronic device 201 and the operation of performing the first task to be performed by the first request included in the first input speech data.

According to an embodiment, the first electronic device 201 may determine the relation according to whether the state of the first electronic device 201 and the operation of performing the first task interfere with each other. For example, if the state of the first electronic device 201 and the operation of performing the first task include the same attribute (e.g., at least one of an auditory element or a visual element), the first electronic device 201 may determine that the state of the first electronic device and the operation of performing the first task interfere with each other. For example, the first electronic device 201 may perform a first function, such as music playback, and the operation of performing the first task may be "an operation of turning on a TV". In this case, the state of the first electronic device 201 is the first function (e.g., the music playback) performing operation state, so the state of the first electronic device 201 may have an attribute of an auditory element, and the operation of performing the first task is "an operation of turning on a TV", so the operation of performing may have an auditory element and a visual element. The two operations have the same attribute of the auditory element, so the first electronic device 201 may determine that there is relation between the state of the first electronic device 201 and the operation of performing the first task.

According to an embodiment, the first electronic device 201 may determine the relation according to whether the first electronic device 201 and a target device (e.g., the second electronic device (e.g., the smart TV 202a)) which performs the first task are close to each other such that the state of the first electronic device 201 and the operation of performing the first task interfere with each other. For example, if it is determined that the state of the first electronic device 201 and the operation of performing the first task interfere with each other, the first electronic device 201 may determine whether a distance between the first electronic device 201 and the second electronic device 202 as the target device which performs the first task is shorter than a threshold value. If the distance between the first electronic device 201 and the second electronic device 202 as the target device which performs the first task is shorter than the threshold value, the first electronic device 201 may determine that there is the relation between that the state of the first electronic device 201 and the operation of performing the first task.

In operation 760, the first electronic device 201 may transmit a request for a first output speech data for controlling the first electronic device 201 to the intelligent server 408 based at least in part on the result of determining the relation.

According to an embodiment, If it is determined that there is the relation between the state of the first electronic device 201 and the operation of performing the first task, the first electronic device 201 may transmit, to the intelligent server 408, a request for first output speech data related to adjustment of the state of the first electronic device 201. For example, if the state of the first electronic device 201 is a state in which the first function (e.g., the music playback) is being performed, a request for first output speech data related to adjustment of a performing state for the first function (e.g., the music playback) may be transmitted to the intelligent server 408.

In operation 770, for example, the first electronic device 201 may receive the first output speech data (e.g., a first response) for controlling the first electronic device 201 from the intelligent server 408. For example, in response to the transmission of the request for the first output speech data, the first electronic device 201 may receive the first output speech data related to the adjustment of the state of the first electronic device 201 from the intelligent server 408.

In operation 780, for example, the first electronic device 201 may output the received first output speech data via an acoustic output device (e.g., a speaker 314) or a functional connection device which is functionally connected to the first electronic device 201.

According to an embodiment, the first output speech data may include a follow-up question (e.g., "Do you want to reduce the sound of music?", "Do you want to increase the sound of music?", or "Do you want to stop playing music?") related to the adjustment of the state (e.g., the first function (e.g., the music playback) performing operation) of the first electronic device 201.

After operation 780, the first electronic device 201 may further perform at least one follow-up operation, and the at least one follow-up operation will be described in more detail with reference to FIGS. 17 and 18.

Figure 8:
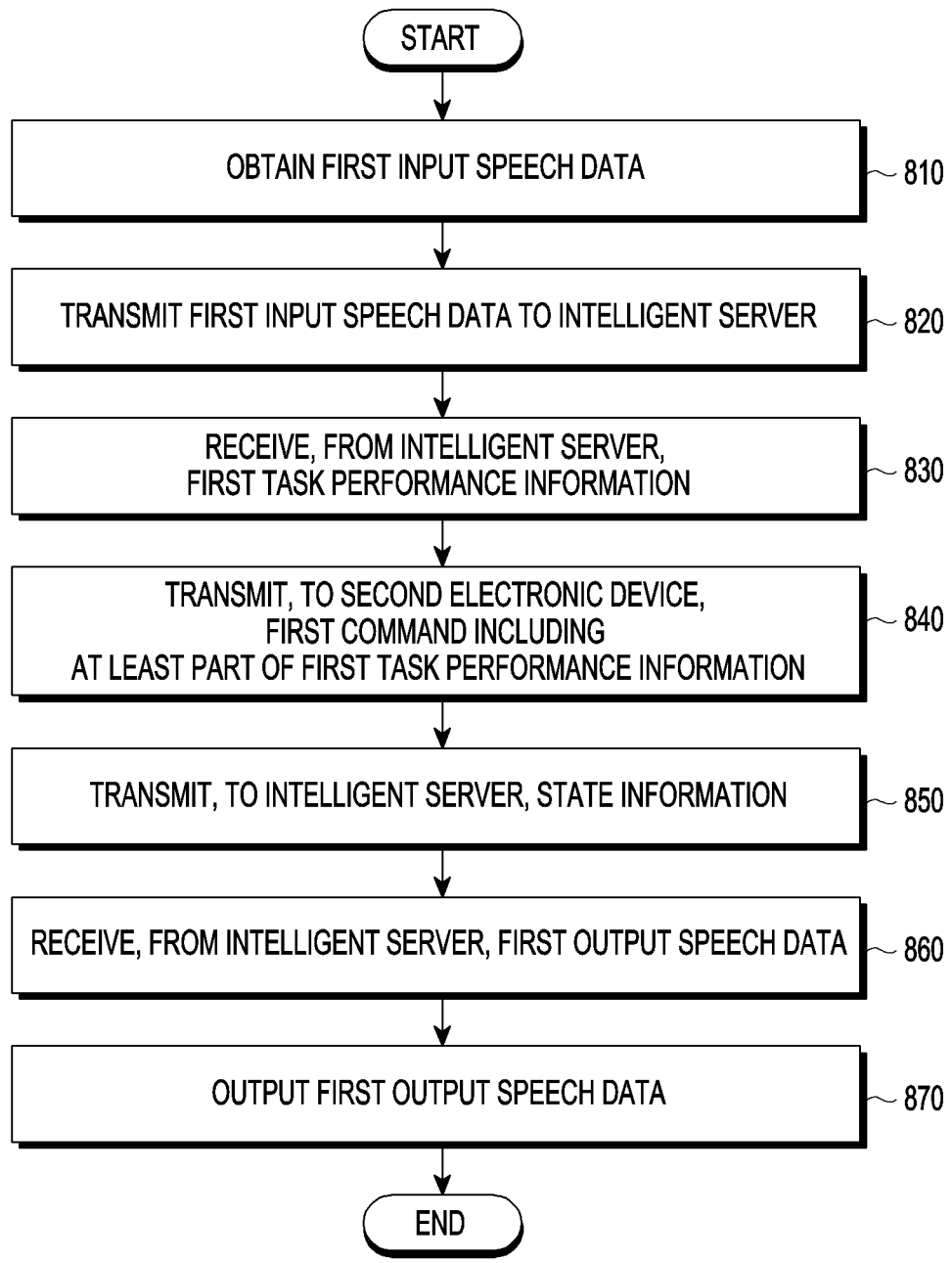
FIG. 8 is a flowchart illustrating a speech recognition control method by a first electronic device according to various embodiments.

FIG. 8 is a flowchart illustrating a speech recognition control method by an electronic device according to various embodiments. The method may be performed by a first electronic device (e.g., a first electronic device 201 in FIG. 2 or a processor 315 of an electronic device 310 in FIG. 3b). Referring to FIG. 8, if the first electronic device 201 receives a speech input for controlling the second electronic device 202, the intelligent server 408 may control the first electronic device 201 or output information (e.g., speech data) by determining relation between a task which corresponds to the received speech input for controlling the second electronic device 202 and a state of the first electronic device 201.

Referring to FIG. 8, for example, operations 810 to 840 are the same as operations 710 to 740 in FIG. 7, a detailed description thereof will be omitted.

In operation 850, for example, the first electronic device 201 may transmit state information of the first electronic device 201 to an intelligent server (e.g., the intelligent server 408 in FIG. 4). According to various embodiments, the intelligent server 408 may obtain the state information of the first electronic device 201 in various methods. For example, if the intelligent server 408 obtains the state information of the first electronic device 201 via an IoT server 209, the operation 850 may be omitted.

According to an embodiment, the first electronic device 201 may perform operation 850 periodically or aperiodically. For example, the first electronic device 201 may transmit the state information of the first electronic device 201 to the intelligent server 408 at a designated period, or transmit the state information of the first electronic device 201 to the intelligent server 408 in response to a request from the intelligent server 408. In FIG. 8, operation 850 is illustrated as being performed after operation 840, however not limited thereto, and may be performed in any operation. According to an embodiment, if the first electronic device 201 transmits the state information of the first electronic device 201 along with first input speech data to the intelligent server 408 in operation 820, operation 850 may be omitted.

In operation 860, the first electronic device 201 may receive first output speech data for controlling the first electronic device 201 based at least in part on a result of determining relation from the intelligent server 408. As a subject for determining the relation is different, the first output speech data is received from the intelligent server 408 in operation 770 by the request of the first electronic device 201 in operation 760, however, the first output speech data may be received from the intelligent server 408 without the request of the first electronic device 201 in operation 860.

For example, the intelligent server 408 may determine whether there is relation between the state of the first electronic device 201 and an operation of performing a first task to be performed according to the first request included in the first input speech data. If it is determined that there is the relation based on a result of determining the relation, the intelligent server 408 may generate first output speech data related to adjustment of the state of the first electronic device 201 and transmit the first output speech data to the first electronic device 201. Accordingly, the first electronic device 201 may receive the first output speech data from the intelligent server 408.

According to various embodiments, when the intelligent server 408 receives the first input speech data from the first electronic device 201 in operation 820, if the intelligent server 408 already knows the state information of the first electronic device 201, the operation 850 may be omitted. In this case, reception of the first task performing information in operation 830 and reception of the first output speech data in operation 860 may be performed simultaneously or sequentially.

Operation 870 is the same as operation 780 in FIG. 7, so a detailed description thereof will be omitted.

After operation 870, the first electronic device may further perform at least one follow-up operation, and the at least one follow-up operation will be described in more detail with reference to FIGS. 17 and 18.

Figure 9:
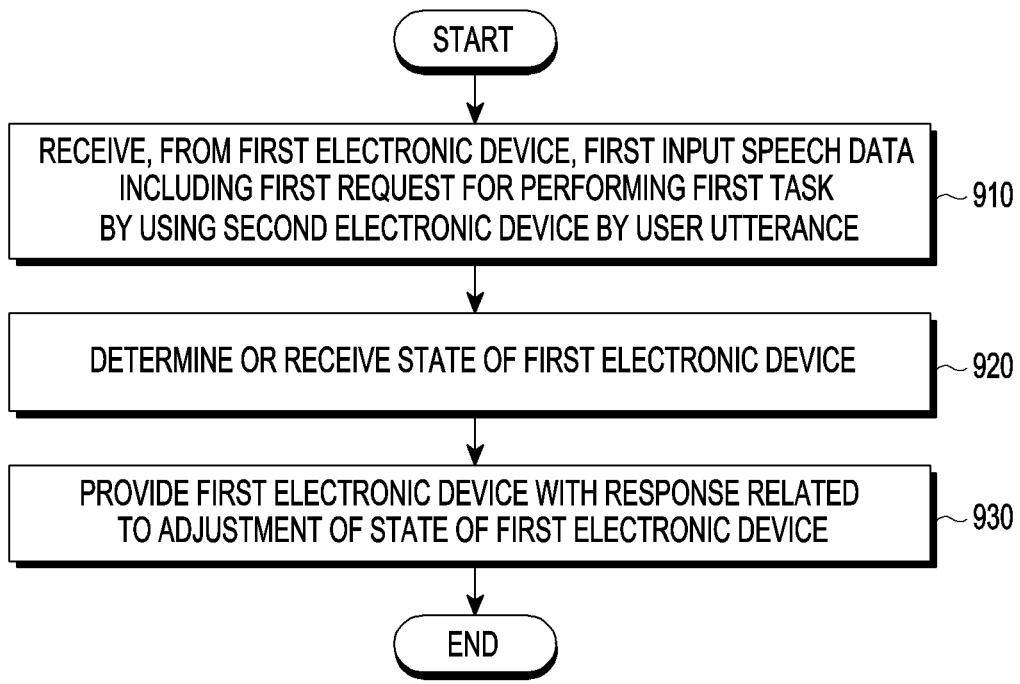
FIG. 9 is a flowchart illustrating a speech recognition control method by an intelligent server according to various embodiments.

FIG. 9 is a flowchart illustrating a speech recognition control method by an intelligent server according to various embodiments. The method may be performed by at least one of an intelligent server (e.g., an intelligent server 408 in FIG. 4) or a processor (e.g., a processor 420 in FIG. 4) of the intelligent server.

Referring to FIG. 9, in operation 910, for example, the intelligent server 408 may receive speech data from a first electronic device (e.g., a first electronic device 201). For example, the intelligent server 408 may receive first input speech data including a first request by user's utterance which is obtained via a speech input device (e.g., a microphone 311*a*) of the first electronic device 201.

According to an embodiment, the first request may be a request (e.g., "Turn on the TV") which causes to perform the first task by using one (e.g., the smart TV 202*a*) of at least one second electronic device (e.g., second electronic devices 202 (202*a*~202*d*)).

According to an embodiment, an operation for the first task according to the first request may be an operation of performing at least one of an audio output or a visual output, and the second electronic device (e.g., the smart TV 202*a*) as a device which performs the first task according to the first request may provide a function capable of performing at least one of the audio output or the visual output.

According to an embodiment, the intelligent server 408 may identify the operation of performing the first task to be performed at the second electronic device (e.g., the smart TV 202*a*) based at least in part on a result of analyzing the first input speech data. For example, the intelligent server 408 may analyze the first input speech data to detect a user's intent (e.g., the operation of performing the first task) or a domain (e.g., a target device for the first task) according to the first request. For example, if a device which corresponds to the domain is the second electronic device (e.g., the smart TV 202*a*), the intelligent server may identify the operation of performing the first task based on the detected user's intent.

In operation 920, the intelligent server 408 may determine or receive a state of the first electronic device 201. For example, the intelligent server 408 may receive state information of the first electronic device 201 from the first electronic device 201. The intelligent server 408 may determine the state of the first electronic device 201 based at least in part on the state information of the first electronic device 201. According to various embodiments, the intelligent server 408 may receive the state information of the first electronic device 201 from another server (e.g., an IoT server 209).

According to an embodiment, the state information of the first electronic device 201 may include at least part of capability information, and state information or setting information of an app (or a function (or an operation)) being performed or each component. For example, if the first electronic device 201 performs a first function such as music playback, the state information may include volume information of an audio device (e.g., an audio module 370). For another example, if the first electronic device 201 performs a first function such as video playback, the state information may include volume information of the audio device (e.g., the audio module 370) or screen adjustment information of a display device (e.g., a display device 360).

According to an embodiment, the intelligent server 408 may determine whether there is relation between the state of the first electronic device and the operation of performing the first task.

In operation 930, the intelligent server 408 may transmit a first response related to adjustment of the state of the first electronic device 201 to the first electronic device 201. For example, the intelligent server 408 may generate the first response related to the adjustment of the state of the first electronic device 201 based at least in part on the result of determining the relation and transmit the first response to the first electronic device 210.

According to an embodiment, the first response may include first output speech data related to the adjustment of the state of the first electronic device 201. For example, if it is determined that there is the relation between the state (e.g., a first function performing operation) of the first electronic device 201 and the first task performing operation based on the result of determining the relation, the intelligent server 408 may generate the first output speech data related to the adjustment of the state of the first electronic device 201.

According to an embodiment, if the first electronic device 201 determines the relation, the intelligent server 408 may receive a request for the first output speech data related to the adjustment of the state of the first electronic device 201 from the first electronic device 201, and generate the first output speech data in response to the reception of the request.

According to an embodiment, the first output speech data may include a follow-up question related to the adjustment of the state of the first electronic device 201. For example, if the first electronic device 201 is performing the first function such as the music playback, the first output speech data may include a follow-up question related to the adjustment of the first function performing operation (e.g., "Do you want to reduce the sound of music?", "Do you want to increase the sound of music?", or "Do you want to stop playing music?"). The intelligent server 408 may transmit the first response including the generated first output speech data to the first electronic device 201.

After operation 930, the intelligent server 408 may further perform at least one follow-up operation, and the at least one follow-up operation will be described in more detail with reference to FIGS. 17 and 18.

Figure 10:
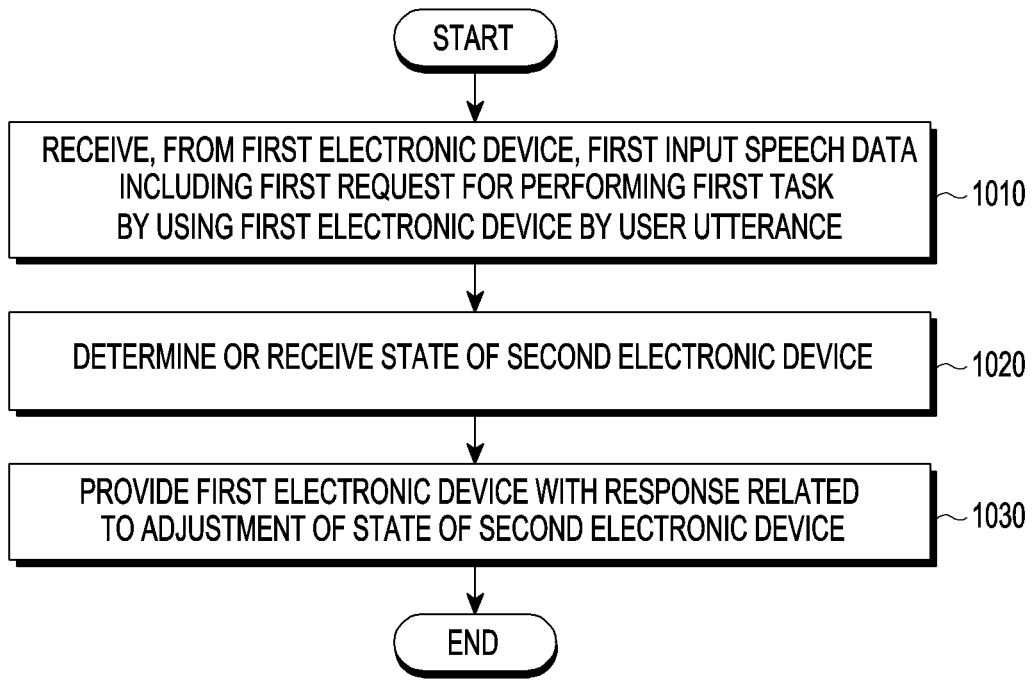
FIG. 10 is a flowchart illustrating a speech recognition control method by an intelligent server according to various embodiments.

FIG. 10 is a flowchart illustrating a speech recognition control method by an intelligent server according to various embodiments. The method may be performed by at least one of an intelligent server (an intelligent server 408) or a processor (e.g., a processor 420) of the intelligent server.

Referring to FIG. 10, in operation 1010, for example, the intelligent server 408 may receive speech data from a first electronic device (e.g., a first electronic device 201). For example, the intelligent server 408 may receive first input speech data including a first request by a user's utterance which is obtained via a speech input device (e.g., a microphone 311*a*) of the first electronic device 201.

According to an embodiment, the first request may be a request (e.g., "Play on the music") which causes to perform the first task by using the first electronic device 201.

According to an embodiment, the operation of performing the first task according to the first request may be an operation of performing at least one of an audio output or a visual output, and the first electronic device 201 as a device which performs the first task according to the first request may provide a function capable of performing at least one of the audio output or the visual output.

According to an embodiment, the intelligent server 408 may identify the operation of performing the first task to be performed at the first electronic device 201 based at least in part on a result of analyzing the first input speech data. For example, the intelligent server 408 may analyze the first input speech data to detect the user's intent (e.g., the operation of performing the first task) or a domain (e.g., a performing target for the first task) according to the first request. For example, if a device which corresponds to the domain is the first second electronic device 201, the intelligent server 408 may identify the operation of performing the first task which will be performed at the first electronic device 201 based on the detected user's intent.

In operation 1020, for example, the intelligent server may determine or receive a state of the second electronic device (e.g., the smart TV 202a). For example, the intelligent server 408 may receive state information of at least one second electronic device 202a~202d from the first electronic device. The intelligent server 408 may determine the state of the second electronic device (e.g., the smart TV 202a) based at least in part on the state information of the at least one second electronic device 202. According to various embodiments, the intelligent server 408 may receive the state information of the second electronic device 202 from another server (e.g., an IoT server 209).

According to an embodiment, the state information of the second electronic device (e.g., the smart TV 202a) may include at least part of capability information, and state information or setting information of an app (or a function (or an operation)) being performed or each component. For example, if the second electronic device (e.g., the smart TV 202a) performs a first function such as an output of TV broadcast content, the state information may include volume information of an audio device (not shown) of the second electronic device (e.g., the smart TV 202a) or screen adjustment information of a display device (not shown) of the second electronic device (e.g., the smart TV 202a).

According to an embodiment, the intelligent server 408 may determine whether there is relation between the operation of performing the first task and the state of the second electronic device (e.g., the smart TV 202a).

In operation 1030, the intelligent server 408 may transmit an indication related to the adjustment of the state of the second electronic device (e.g., the smart TV 202a) to the first electronic device 201. For example, the intelligent server 408 may generate the indication related to the adjustment of the state of the second electronic device (e.g., the smart TV 202a) based at least in part on the result of determining the relation and transmit the indication to the first electronic device 201.

According to an embodiment, if it is determined that there is the relation between the operation of performing the first task and the state of the second electronic device 202 based on the result of determining the relation, the intelligent server 408 may generate information including at least part of auditory information or visual information related to the adjustment of the state of the second electronic device 202. For example, the auditory information may include a notification sound notifying the adjustment of the state of the second electronic device 202 or first output speech data (e.g., "Do you want to reduce a volume of a TV?" or "Do you want to increase a volume of a TV?") including a follow-up question related to the adjustment of the state of the second electronic device 202. For example, the visual information may include a text, a character, a picture, a photo or an emoticon related to the adjustment of the state of the second electronic device 202. The visual information may include a user interface (UI) such as a conversational application. The visual information may be a user interface (UI) including at least one input button (icon) for receiving the follow-up question included in the first output speech data related to the adjustment of the state of the second electronic device 202 and a user input for the follow-up question. The visual information is not limited to this, and may include all various visual representations. The intelligent server may transmit the generated indication to the first electronic device 201. After operation 1030, the intelligent server 408 may further perform at least one follow-up operation, and the at least one follow-up operation will be described in more detail with reference to FIGS. 17 and 18.

Figure 11:
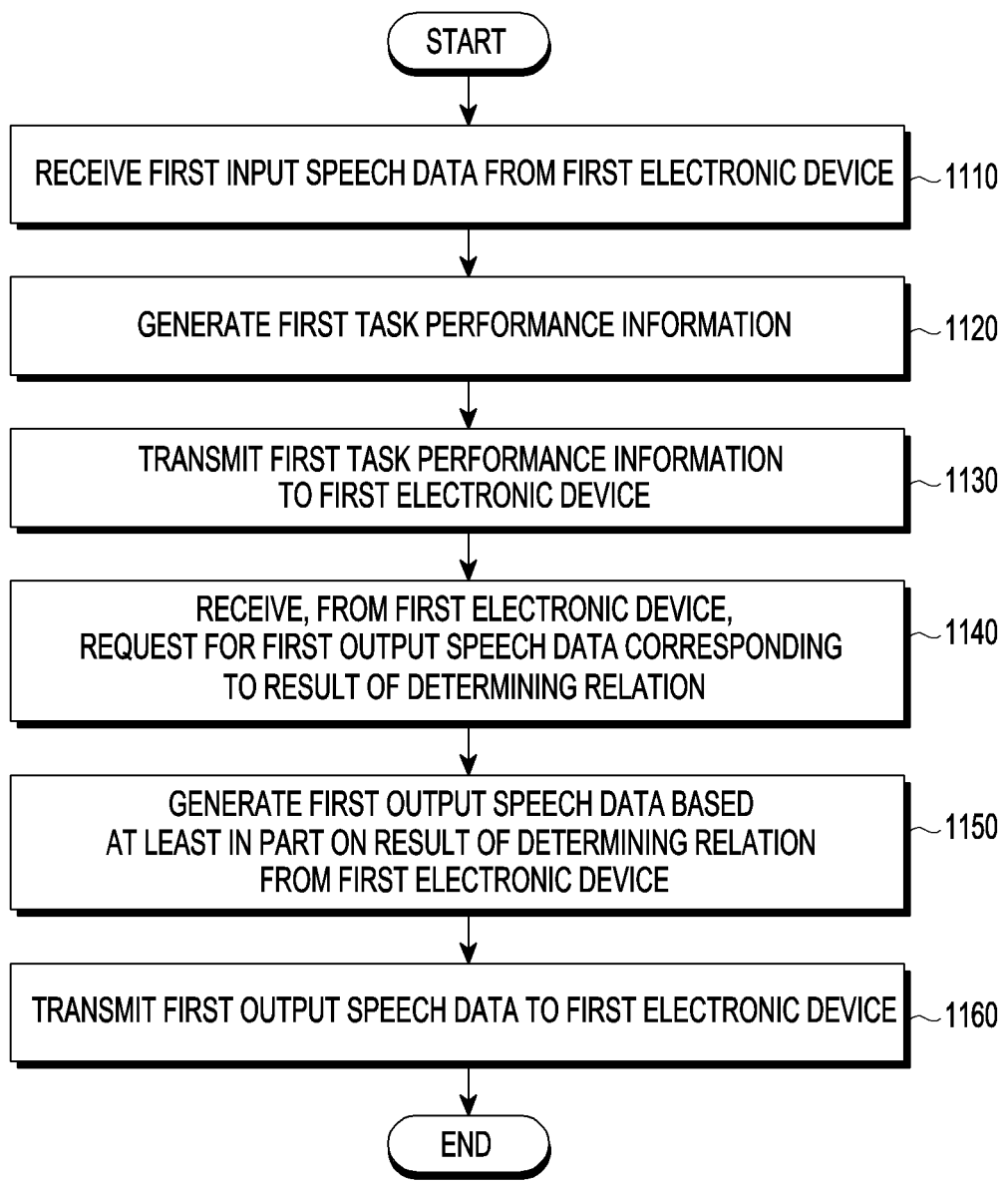
FIG. 11 is a flowchart illustrating a speech recognition control method by an intelligent server according to various embodiments.

FIG. 11 is a flowchart illustrating a speech recognition control method by an intelligent server according to various embodiments. The method may be performed by at least one of an intelligent server (e.g., an intelligent server 408) or a processor (e.g., a processor 420) of the intelligent server.

Referring to FIG. 11, in operation 1110, the intelligent server 408 may receive first input speech data from a first electronic device (e.g., a first electronic device 201). For example, the intelligent server 408 may receive the first input speech data including a first request by a user's utterance obtained via a speech input device (e.g., a microphone 311a) of the first electronic device 201. Operation 1110 may perform the same or similar operation to operation 910 in FIG. 9 and operation 1010 in FIG. 10, so a detailed description thereof will be omitted.

In operation 1120, for example, the intelligent server 408 may generate first task performing information for performing the first task, based at least in part on a result of analyzing the first input speech data.

According to an embodiment, the intelligent server 408 may analyze the first input speech data received from the first electronic device 201. For example, the intelligent server 408 may recognize the first input speech data via an automatic speech recognition module (e.g., an ASR module 421) to convert the first input speech data into text, and detect the user's intent (an operation to be performed (e.g., the first task)) or a domain (e.g., an execution target (e.g., a device which performs the first task) of the operation to be performed) which corresponds to the first request based on the converted text via a natural language understanding module (e.g., an NLU module 422). For example, if the first input speech data is "Turn on the TV", the intelligent server 408 may, based on a word (slot) (e.g., "TV" or "Turn on") extracted from the result of analyzing the first request included in the first input speech data, determine that that the user's intent (e.g., the first task) is a "Turn on" operation, and determine that the domain (e.g., the device which performs the first task) is a "TV", i.e., a "smart TV 202a" among at least one second electronic device (e.g., second electronic devices 202 (202a~202d)).

According to an embodiment, the intelligent server 408 may generate the first task performing information which corresponds to the first request based at least in part on the detected user's intent or the domain. For example, the intelligent server 408 may generate the first operation information (e.g., a first pass rule)) including a parameter or a first operation sequence required for the domain to perform the user's intent from a pass rule database (e.g., a pass rule DB 436) via a pass planner module (e.g., a pass planner module 423) based at least in part on a user's intent (e.g., an operation of performing a first task) or a domain (e.g., a performing target for the first task) according to a detected slot based on a result of analyzing the first input speech data.

According to an embodiment, the first operation information (e.g., the first pass rule) may include a first operation sequence including information about a target device or app to be executed in response to the first request, an operation (e.g., the first task or at least one state related to the first task) to be executed on the target device or app, and a parameter required to execute the operation. For example, if the first request included in the first input speech data is "Turn on the TV", the intelligent server 408 may generate first operation information, as the first operation sequence, including the smart TV 202a among the second electronic devices as the target device to be executed in response to the first request, including a "turn on" operation for the smart TV 202a as the operation (e.g., the first task) to be executed on the target device, and including information about a parameter or an operation order required for the smart TV 202a to be turned on.

According to an embodiment, the first task performing information may further include user interface (UI) information related to the first operation information.

In operation 1130, for example, the intelligent server 408 may transmit the first task performing information to the first electronic device 201.

In operation 1140, for example, the intelligent server 408 may receive a request for the first output speech data which corresponds to a result of determining relation from the first electronic device 201. For example, the intelligent server 408 may receive, from the first electronic device 201, a request related to the first output speech data related to adjustment of a state of the first electronic device 201 which corresponds to a result of determining relation between the state of the first electronic device 201 and the operation of performing the first task to be performed according to the first request included in the first input speech data. The request for the first output speech data may include the result of determining the relation.

In operation 1150, for example, the intelligent server 408 may generate the first output speech data for controlling the first electronic device 201 based at least in part on the result of determining the relation from the first electronic device 201. For example, if the request for the first output speech data is received, the intelligent server 408 may generate the first output speech data based at least in part on the result of determining the relation detected from the request.

According to an embodiment, upon receiving, from the first electronic device 201, the result of determining the relation indicating that it is determined that there is the relation between the state of the first electronic device 201 and the first task performing operation, the intelligent server 408 may determine the state of the first electronic device 201 based on state information of the first electronic device 201, and generate the first output speech data related to adjustment of the determined state of the electronic device 201 via a natural language generation module (e.g., an NLG module 425). For example, if the state of the first electronic device 201 is a first function performing (e.g., music playback) state based on a result of determining the state of the first electronic device 201, the intelligent server 408 may generate the first output speech data related to the adjustment of the first function performing operation (e.g., music playback) by using the natural language generation module.

According to an embodiment, the first output speech data may include a follow-up question (e.g., "Do you want to reduce the sound of music?", "Do you want to increase the sound of music?", or "Do you want to stop playing music?") related to the adjustment of the state (e.g., the first function performing operation (e.g., music playback)) of the first electronic device 201. According to various embodiments, the first output speech data may include a follow-up question (e.g., "Do you want to change the music output path to a Bluetooth headset?") for changing an audio output path related to the music playback.

In operation 1160, for example, the intelligent server 408 may transmit the first output speech data (e.g., a first response) to the first electronic device 201.

After operation 1160, the intelligent server 408 may further perform at least one follow-up operation, and the at least one follow-up operation will be described in more detail with reference to FIGS. 17 and 18.

Figure 12:
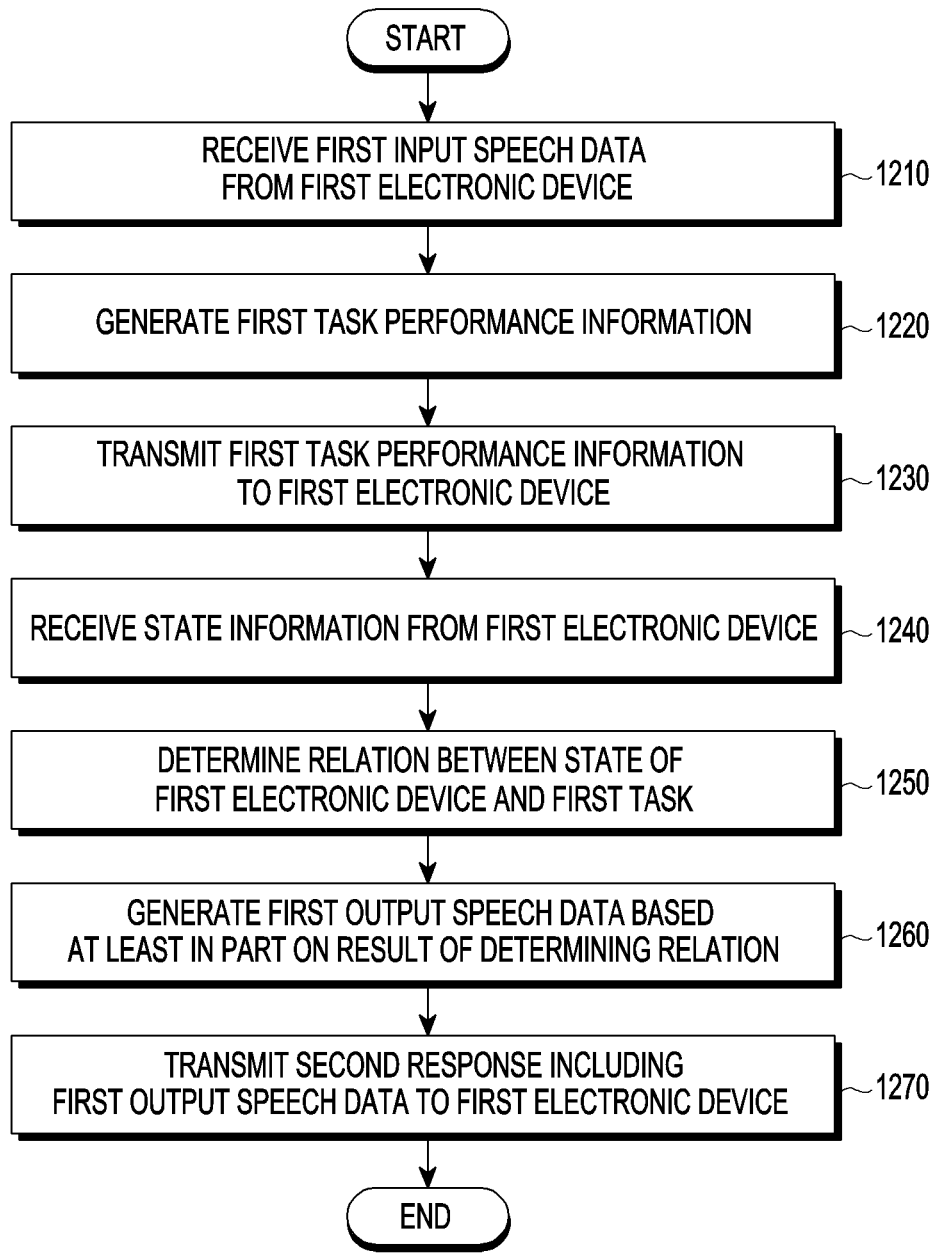
FIG. 12 is a flowchart illustrating a speech recognition control method by an intelligent server according to various embodiments.

FIG. 12 is a flowchart illustrating a speech recognition control method by an intelligent server according to various embodiments. The method may be performed by at least one of an intelligent server (e.g., an intelligent server 408) or a processor (e.g., a processor 420) of the intelligent server.

Referring to FIG. 12, for example, operations 1210 to 1230 are the same as operations 1110 to 1130 in FIG. 11, so a detailed description thereof will be omitted.

In operation 1240, for example, the intelligent server 408 may receive state information of a first electronic device (e.g., a first electronic device 201) from the first electronic device 201.

According to an embodiment, the intelligent server 408 may perform operation 1240 periodically or aperiodically. For example, the intelligent server 408 may receive state information of the first electronic device 201 from first electronic device 201 at a designated period, or receive the state information of the first electronic device 201 from first electronic device 201 in response to a request from the intelligent server 408. In FIG. 12, operation 1240 is illustrated as being performed after operation 1230, but not limited thereto, and operation 1240 may be performed at any operation according to various embodiments. According to an embodiment, if the intelligent server 408 receives first input speech data along with the state information of the first electronic device 201 from first electronic device 201 in operation 1210, operation 1240 may be omitted. According to various embodiments, the intelligent server 408 may receive a relation determination request as well as the state information of the first electronic device 201 from first electronic device 201 in operation 1240.

In operation 1250, for example, the intelligent server 408 may determine relation between a state of the first electronic device 201 and an operation of performing a first task. For example, the intelligent server 408 may determine the relation between the state of the first electronic device 201 and the operation of performing the first task to be performed according to the first request included in the first input speech data.

According to an embodiment, the intelligent server 408 may determine relation according to whether the determined state of the first electronic device 201 and the operation of performing the first task interfere with each other. For example, if the state information of the first electronic device 201 received from the first electronic device 201 or an IoT server 209 (e.g., a cloud) and the operation of performing the first task include the same attribute (e.g., an auditory element or a visual element), the intelligent server 408 may determine that the state of the first electronic device 201 and the operation of performing the first task interfere with each other. For example, if the first electronic device 201 is performing a first function, such as music playback, the determined state of the first electronic device 201 is a performing state for the first function, and the operation of performing the first task is an "operation to turn on a TV". In this case, the determined state of the first electronic device 201 is the first function performing operation (e.g., the music playback) state, so the determined state of the first electronic device 201 may have an attribute including an auditory element, and the operation of performing the first task is the "operation to turn on a TV", so the operation of performing the first task may have an attribute including an auditory element or a visual element. The two operations have the same attribute of the auditory element, so the intelligent server 408 may determine that there is relation between the state of the first electronic device 201 and the operation of performing the first task.

According to an embodiment, the intelligent server 408 may determine the relation according to whether the first electronic device 201 and a target device (e.g., the second electronic device (e.g., the smart TV 202a)) which performs the first task are close to each other such that the state of the first electronic device 201 and the operation of performing the first task interfere with each other. For example, if it is determined that the state of the first electronic device 201 and the operation of performing the first task interfere with each other, the intelligent server 408 may determine whether a distance between the first electronic device 201 and the second electronic device (e.g., the smart TV 202a) as the target device which performs the first task is shorter than a threshold value. If the distance between the first electronic device 201 and the second electronic device 202 as the target device which performs the first task is shorter than the threshold value, the intelligent server 408 may determine that there is the relation between that the state of the first electronic device 201 and the operation of performing the first task. According to an embodiment, the threshold value may be set to a minimum distance at which the state of the first electronic device 201 and the operation of performing the first task may interfere with each other. For example, the threshold value may be set to a minimum distance at which a function performing operation related to an audio output or a video output in the state of the first electronic device 201 and the first task performing operation related to an audio output or a video output in the first task performing operation may interfere with each other.

In operation 1260, the intelligent server 408 may generate first output speech data for controlling the first electronic device 201 based at least in part on the result of determining the relation. The operation 1260 is the same as operation 1150 in FIG. 11, except that a subject which determines the relation between the state of the first electronic device 201 and the operation of performing the first task is different from that in operation 1150 in FIG. 11, so a detailed description of operation 1260 will be omitted.

Operation 1270 is the same as operation 1160 in FIG. 11, a detailed description thereof will be omitted.

After operation 1270, the intelligent server 408 may further perform at least one follow-up operation, and the at least one follow-up operation will be described in more detail with reference to FIGS. 17 and 18.

Figure 13:
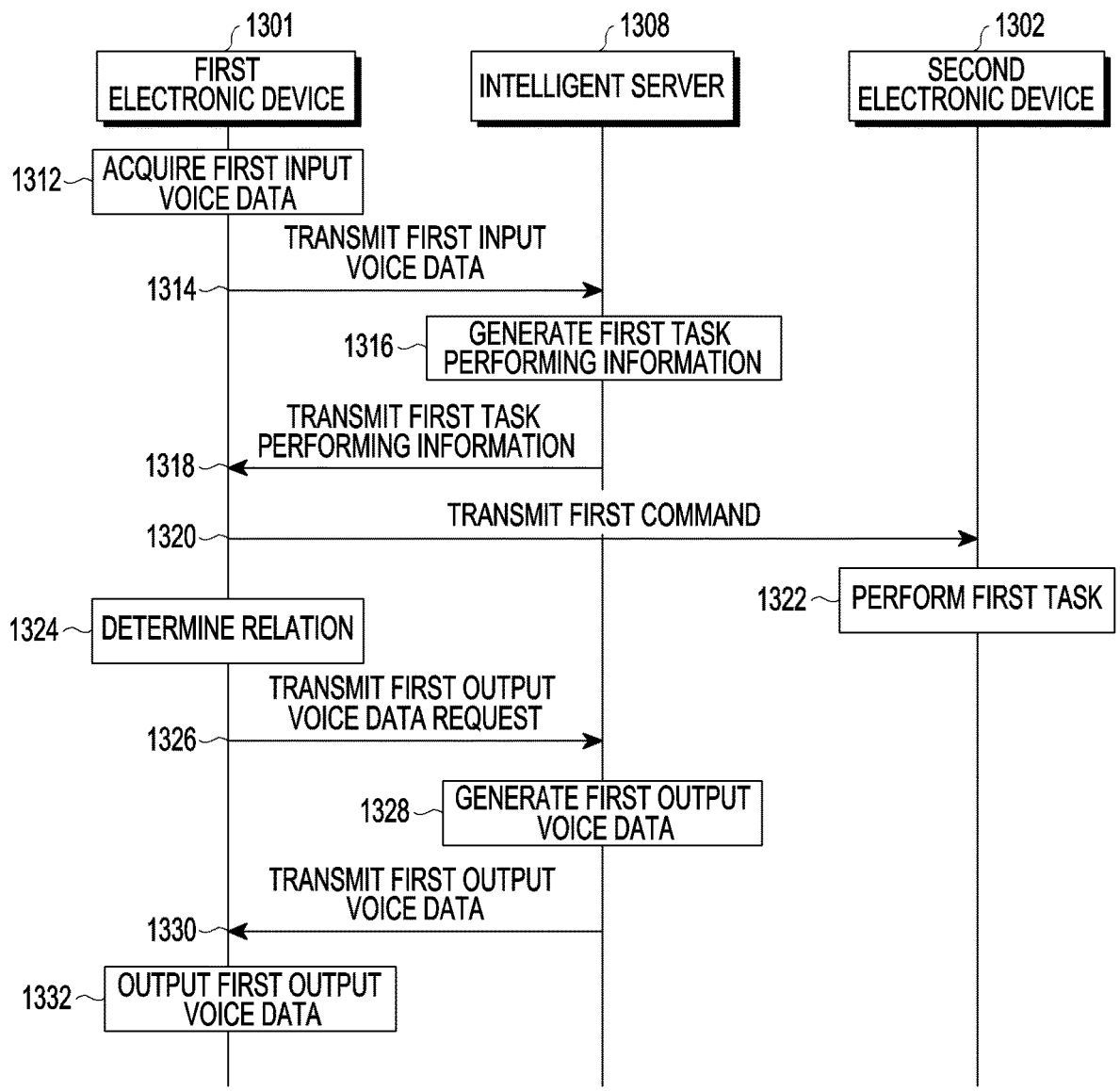
FIG. 13 is a flowchart illustrating a control method by a speech recognition control system according to various embodiments.

FIG. 13 is a flowchart illustrating a control method by a speech recognition control system according to various embodiments. In FIG. 13, a first electronic device 1301 (e.g., a first electronic device 201) and a second electronic device 1302 (e.g., second electronic devices 202 (202a~202d)) may communicate via a first network (e.g., a first network 298) (e.g., a short-range wireless communication), the first electronic device 1301 and an intelligent server 1308 (e.g., an intelligent server 408) may communicate via a second network (e.g., a second network 299) (e.g., a long-range wireless communication), and the second electronic device 1302 and the intelligent server 1308 may transmit and receive data or information via the first electronic device 1301.

Referring to FIG. 13, in operation 1312, for example, the first electronic device 1301 may obtain a first input speech from a user. For example, the first electronic device 1301 may obtain first input speech data including a first request by the user's utterance.

According to an embodiment, the first electronic device 1301 may obtain the first input speech data including the first request via a speech input device (e.g., a microphone 311a) of the first electronic device 1301. The first electronic device 1301 may obtain the first input speech data including the first request via a speech input device (e.g., a microphone 311a) of a functional connection device (e.g., an AI speaker 201b) which is functionally connected to the first electronic device 1301.

According to an embodiment, the first request may be a request for performing the first task which corresponds to the first request by using the second electronic device 1302 (e.g., the smart TV 202a). For example, the first request may be a request for the second electronic device 1302 capable of communicating with the first electronic device 1301 to perform at least one of an audio output or a visual output as the first task.

In operation 1314, for example, the first electronic device 1301 may transmit the first input speech data to the intelligent server 1308 via the second network 299 (e.g., the long-range wireless communication). For example, the first electronic device 1301 may transmit the first input speech data to the intelligent server 1308 by using a communication interface (e.g., a second communication interface 314) (e.g., a long-range wireless communication interface) of the electronic device 1301.

According to an embodiment, upon transmitting the first input speech data to the intelligent server 1308, the first electronic device 1301 may include state information of the first electronic device 1301 into the first input speech data.

In operation 1316, for example, the intelligent server 1308 may generate first task performing information for performing the first task, based at least in part on a result of analyzing the first input speech data received from the first electronic device 1301.

According to an embodiment, the intelligent server 1308 may analyze the first input speech data. For example, the intelligent server 1308 may recognize the first input speech data via an automatic speech recognition module (e.g., an ASR module 421) to convert the first input speech data into text, and detect a user's intent (an operation to be performed (e.g., a first task performing operation)) or a domain (e.g., an execution target (e.g., a device which performs the first task) for the operation to be performed) which corresponds to the first request based on the converted text via a natural language understanding module (e.g., an NLU module 422). For example, if the first input speech data is "Turn on the TV", the intelligent server 1308 may determine that that the user's intent (e.g., the first task) is a "Turn on" operation based on a word (slot) (e.g., "TV" or "Turn on") extracted based on the result of analyzing the first request included in the first input speech data, and that the domain (e.g., the device which performs the first task) is a "TV", i.e., the second electronic device 1302 (e.g., the smart TV 202*a*). The intelligent server 1308 may generate the first task performing information for performing the first task which corresponds to the first request based at least in part on the detected user's intent or the domain.

According to an embodiment, the first task performing information may include first operation information (e.g., a first pass rule) for performing the first task which corresponds to the first request. For example, the intelligent server 1308 may select or generate, based on the detected user's intent or the domain according to the result of analyzing the first input speech data, a first operation sequence which corresponds to a parameter or an operation sequence required for the domain to perform the user's intent from a pass rule database (e.g., a pass rule DB 436) via a pass planner module (e.g., a pass planner module 423).

According to an embodiment, the first operation information (e.g., the first pass rule) may include a first operation sequence including information about a target device or app to be executed in response to the first request, an operation (e.g., the first task or at least one state related to the first task) to be executed on the target device or app, and a parameter required to execute the operation. For example, if the first request included in the first input speech data is "Turn on the TV", the intelligent server 1308 may generate the first operation information including the second electronic device 1302 (e.g., the smart TV 202*a*) as the target device to be executed in response to the first request, including an "turn on" operation of the second electronic device 1302 (e.g., the smart TV 202*a*) as the operation (e.g., the first task) to be executed on the target device, and including information about a parameter or an operation order required to turn on the second electronic device 1302 (e.g., the smart TV 202*a*) as the first operation sequence.

According to an embodiment, the first task performing information may further include user interface (UI) information related to the first operation information.

In operation 1318, for example, the intelligent server 1308 may transmit the first task performing information to the first electronic device 1301 via the second network 299 (e.g., the long-range wireless communication). For example, the intelligent server 1308 may transmit the first task performing information to the first electronic device 1301 by using a communication interface (e.g., a communication interface 410) of the intelligent server 1308.

In operation 1320, for example, the first electronic device 1301 may transmit, to the second electronic device 1302 (e.g., the smart TV 202*a*), a first command which is generated based at least in part on the first task performing information received from the intelligent server 1308.

For example, upon receiving the first task performing information, the first electronic device 1301 may identify, from the first operation information included in the first task performing information, a domain as a target device which will perform the first task, and identify a target device which corresponds to the identified domain. For example, the first electronic device 1301 may identify a device which corresponds to the identified domain among at least one second electronic device 1302 (e.g., at least one second electronic device 202*a*~202*d*) registered at a communication connection app (e.g., Samsung Connect™) of the first electronic device 1301. For example, if the identified domain is a "TV", the first electronic device 1301 may identify the second electronic device 1302 (e.g., at least one second electronic device 202*a*~202*d*) which corresponds to the identified domain. According to various embodiments, if there are a plurality of second electronic devices which correspond to the "TV", a second electronic device having a higher priority may be selected according to a designated priority. The first electronic device 201 may transmit the first command to the detected second electronic device 1302 (e.g., the smart TV 202*a*) based on the first operation information.

According to an embodiment, the first electronic device 201 may transmit the first command to the second electronic device 1302 (e.g., the smart TV 202*a*) as the target device by using a communication interface (e.g., a communication module 190) (e.g., a short-range wireless communication interface) via the first network 298.

In operation 1322, for example, the second electronic device 1302 may perform the first task based on the first command received from the first electronic device 1301. The first command may include first task performing information related to performing the first task (e.g., an operation of "turning on" the second electronic device 1302 (e.g., the smart TV 202*a*)) which corresponds to the first request included in the first input speech data obtained by the first electronic device 1301. The second electronic device 1302 (e.g., the smart TV 202*a*) may perform the first task which corresponds to the first request based on the first operation information of the first task performing information included in the first command. The second electronic device 1302 (e.g., the smart TV 202*a*) may further display a user interface (UI) related to performing the first task based on UI information related to the first operation information included in the first task performing information on a display device (e.g., a display 313) of the second electronic device 1302 (e.g., the smart TV 202*a*).

In operation 1324, according to an embodiment, the first electronic device 1301 may determine the relation according to whether a state of the first electronic device 1301 and the operation of performing the first task interfere with each other. For example, if the state of the first electronic device 1301 and the operation of performing the first task include the same attribute (e.g., an auditory element or a visual element), the first electronic device 1301 may determine that the state of the first electronic device 1301 and the operation of performing the first task interfere with each other. For example, if the first electronic device 1301 performs a first function, such as music playback, the state of the first electronic device 1301 may be the first function performing operation state, and the operation of performing the first task may be "an operation of turning on a TV". In this case, the state of the first electronic device 1301 is the first function (e.g., music playback) performing operation state, so the state of the first electronic device 1301 may have an attribute of an auditory element, and the operation of performing the first task is "an operation of turning on the TV", so the operation of performing may have an attribute of an auditory element or a visual element. The state of the first electronic device 1301 (the first function performing operation) and the operation of performing the first task have the same attribute of the auditory element, so the first electronic device 201 may determine that there is the relation.

According to an embodiment, the first electronic device 1301 may determine the relation according to whether the first electronic device 1301 and a target device (e.g., the second electronic device 1302 (e.g., the smart TV 202*a*)) which performs the first task are close to each other such that the state of the first electronic device 1301 and the operation of performing the first task interfere with each other. For example, if it is determined that the state of the first electronic device 1301 and the operation of performing the first task interfere with each other, the first electronic device

1301 may determine whether a distance between the first electronic device 1301 and the second electronic device 1302 (e.g., the smart TV 202*a*) as the target device which performs the first task is shorter than a threshold value. If the distance between the first electronic device 1301 and the second electronic device 1302 (e.g., the smart TV 202*a*) as the target device which performs the first task is shorter than the threshold value, the first electronic device 1301 may determine that there is the relation between that the state of the first electronic device 1301 and the operation of performing the first task. According to an embodiment, the threshold value may be set to a minimum distance at which the state of the first electronic device 1301 and the operation of performing the first task may interfere with each other. For example, the threshold value may be set to a minimum distance at which a function performing operation related to an audio output or a video output in the state of the first electronic device 1301 and the first task performing operation related to an audio output or a video output in the first task performing operation may interfere with each other.

In operation 1326, for example, if it is determined that there is the relation between the state of the first electronic device 1301 and the operation of performing the first task, the first electronic device 1301 transmit, to the intelligent server 1308, a request for first output speech data related to adjustment of the state of the first electronic device 1301.

In operation 1328, for example, the intelligent server 1308 may generate first output speech data for controlling the first electronic device 1301 based at least in part on a result of determining the relation received from the first electronic device 1301. For example, if the request for the first output speech data is received, the intelligent server 1308 may generate the first output speech data related to the adjustment of the state of the first electronic device 1301 based at least in part on the result of determining the relation detected from the request.

According to an embodiment, upon receiving, from the first electronic device 1301, the result of determining the relation indicating that it is determined that there is the relation between the state of the first electronic device 1301 and the first task performing operation, the intelligent server 1308 may determine the state of the first electronic device 1301 based on state information of the first electronic device 1301, and generate the first output speech data related to adjustment of the determined state of the electronic device 1301 via a natural language generation module (e.g., an NLG module 425). For example, if the state of the first electronic device 1301 is a first function performing (e.g., music playback) state based on a result of determining the state of the first electronic device 1301, the intelligent server 1308 may generate the first output speech data related to the adjustment of the first function (e.g., the music playback) performing operation by using the natural language generation module 425.

According to an embodiment, the first output speech data may include a follow-up question (e.g., "Do you want to reduce the sound of music?", "Do you want to increase the sound of music?", or "Do you want to stop playing music?") related to the adjustment of the state (e.g., the first function (e.g., the music playback) performing operation) of the first electronic device 1301.

In operation 1330, for example, the intelligent server 1308 may transmit the first output speech data to the first electronic device 1301. For example, the intelligent server 1308 may transmit the first output speech data to the first electronic device 1301 by using the communication interface 410 via the second network 299.

In operation 1332, for example, the first electronic device 1301 may output first output speech data. For example, the first electronic device 1301 may output the first output speech data received via an acoustic output device (e.g., an acoustic output device 340) (e.g., a speaker).

After operation 1332, the first electronic device 1301, the intelligent server 1308, or the second electronic device 1302 may further perform at least one follow-up operation, and the at least one follow-up operation will be described in more detail with reference to FIGS. 17 and 18.

Figure 14:
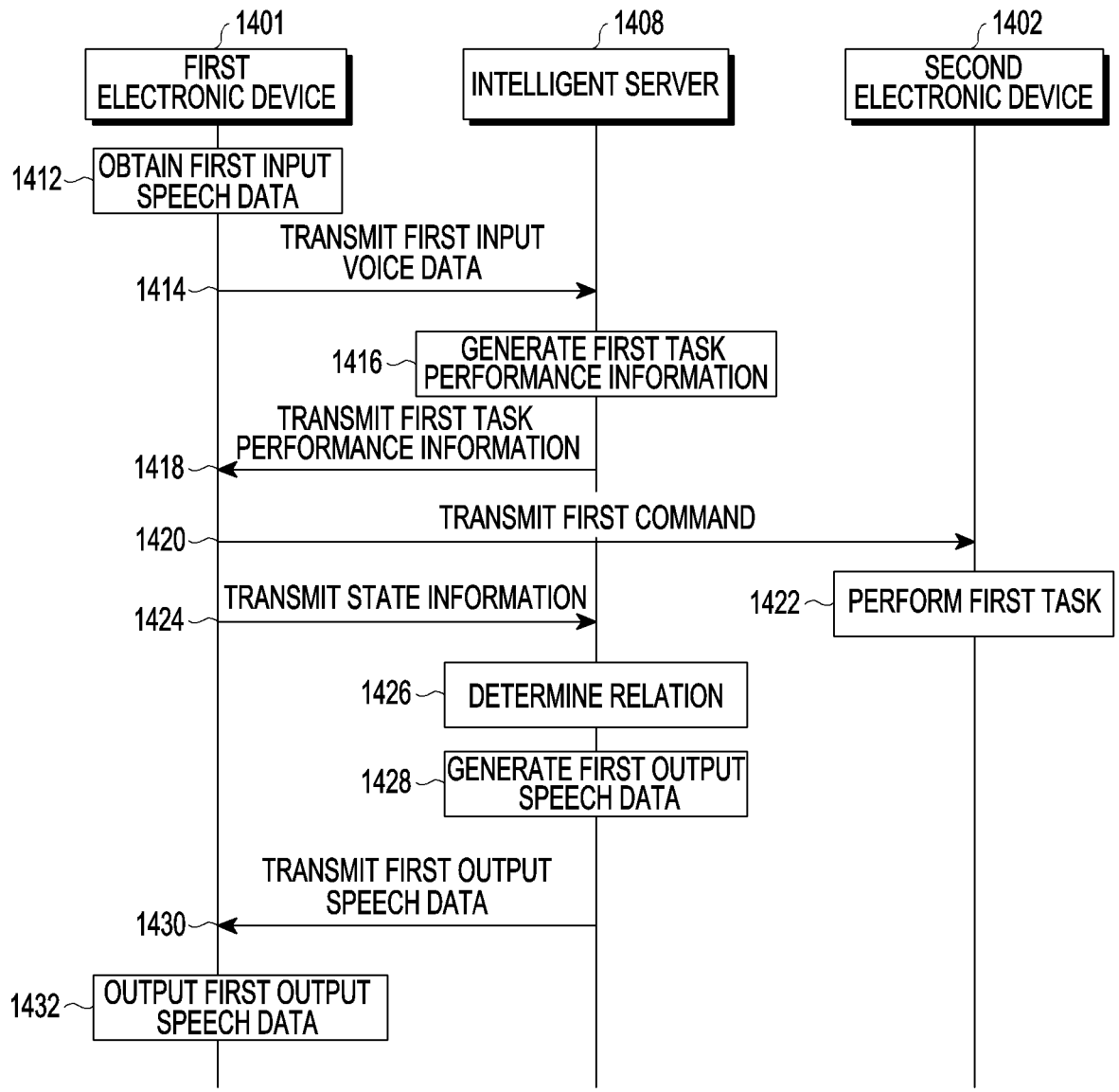
FIG. 14 is a flowchart illustrating a control method by a speech recognition control system according to various embodiments.

FIG. 14 is a flowchart illustrating a control method by a speech recognition control system according to various embodiments. In FIG. 14, a first electronic device 1401 (e.g., a first electronic device 201) and a second electronic device 1402 (e.g., second electronic devices 202 (202*a*~202*d*)) may communicate via a first network (e.g., a first network 298) (e.g., a short-range wireless communication), the first electronic device 1401 and an intelligent server 1408 (e.g., an intelligent server 408) may communicate via a second network (e.g., a second network 299) (e.g., a long-range wireless communication), and the second electronic device 1402 and the intelligent server 1408 may transmit and receive data or information via the first electronic device 1401.

Operations 1412 to 1420 are the same as operations 1312 to 1320 in FIG. 13, descriptions thereof will be omitted.

In operation 1424, for example, the first electronic device 1401 may transmit state information of the first electronic device 1401 to the intelligent server 1408. For example, the first electronic device 1401 may transmit the state information of the first electronic device 1401 to the intelligent server 1408 by using a second communication interface (e.g., a second communication interface 314) (e.g., a long-range wireless communication interface) via the second network 299.

According to an embodiment, the first electronic device 1401 may perform operation 1424 periodically or aperiodically. For example, the first electronic device 1401 may transmit state information of the first electronic device 1401 to the intelligent server 1408 at a designated period, or transmit the state information of the first electronic device 1401 to the intelligent server 1408 in response to a request from the intelligent server 1408. In FIG. 14, operation 1424 is illustrated as being performed after operation 1420, but not limited thereto, and operation 1424 may be performed at any operation. According to an embodiment, if the first electronic device 1401 transmits the state information of the first electronic device 1401 along with first input speech data to the intelligent server 1408 in operation 1414, operation 1424 may be omitted.

In operation 1426, for example, the intelligent server 1408 may determine a relation between a state of the first electronic device 1401 and an operation of performing a first task to be performed according to a first request included in the first input speech data.

According to an embodiment, the intelligent server 1408 may determine the relation according to whether the state of the first electronic device 1401 and the operation of performing the first task interfere with each other. For example, the intelligent server 1408 determines the state of the first electronic device 1401 based at least in part on the state information of the first electronic device 1401, and if the determined state of the first electronic device 1401 and the operation of performing the first task include the same attribute (e.g., an auditory element or a visual element), the intelligent server 1408 may determine that the state of the first electronic device 1401 and the operation of performing the first task interfere with each other. For example, if the first electronic device 1401 performs a first function, such as music playback, the determined state of the first electronic device 1401 may be a performing state for the first function, and the operation of performing the first task may be "an operation of turning on a TV". In this case, the determined state of the first electronic device 1401 is the first function performing operation (e.g., the music playback) state, so the state of the first electronic device 1401 may have an attribute of an auditory element, and the operation of performing the first task is "an operation of turning on a TV", so the operation of performing the first task may have an attribute of an auditory element or a visual element. The first function performing operation and the operation of performing the first task have the same attribute of the auditory element, so the intelligent server 1408 may determine that there is the relation between the state of the first electronic device 1401 and the operation of performing the first task.

According to an embodiment, the intelligent server 1408 may determine the relation according to whether the first electronic device 1401 and a target device (e.g., the second electronic device 1402 (e.g., a smart TV 202a)) which performs the first task are close to each other such that the state of the first electronic device 1401 and the operation of performing the first task interfere with each other. For example, if it is determined that the state of the first electronic device 1401 and the operation of performing the first task interfere with each other, the intelligent server 1408 may determine whether a distance between the first electronic device 1401 and the second electronic device 1402 (e.g., the smart TV 202a) as the target device which performs the first task is shorter than a threshold value. If the distance between the first electronic device 1401 and the second electronic device 1402 (e.g., the smart TV 202a) as the target device which performs the first task is shorter than the threshold value, the intelligent server 1408 may determine that there is the relation between that the state of the first electronic device 1401 and the operation of performing the first task. According to an embodiment, the threshold value may be set to a minimum distance at which the state of the first electronic device 1401 and the operation of performing the first task may interfere with each other. For example, the threshold value may be set to a minimum distance at which a function performing operation related to an audio output or a video output in the state of the first electronic device 1401 and the first task performing operation related to an audio output or a video output in the first task performing operation may interfere with each other.

In operation 1428, for example, the intelligent server 1408 may generate first output speech data for controlling the first electronic device 1401 based at least in part on a result of determining the relation. For example, the intelligent server 1408 may generate the first output speech data related to adjustment of the state of the first electronic device 1401 based at least in part on the result of determining the relation.

According to an embodiment, for example, if it is determined that there is the relation between the state of the first electronic device 1401 and the first task performing operation based on the result of determining the relation, the intelligent server 1408 may generate the first output speech data related to the adjustment of the determined state of the electronic device 1401 via a natural language generation module (e.g., an NLG module 425). For example, if the state of the first electronic device 1401 is a first function performing (e.g., music playback) state based on a result of determining the state of the first electronic device 1401, the intelligent server 1408 may generate the first output speech data related to the adjustment of the first function (e.g., the music playback) performing operation by using the natural language generation module 425.

According to an embodiment, the first output speech data may include a follow-up question (e.g., "Do you want to reduce the sound of music?", "Do you want to increase the sound of music?", or "Do you want to stop playing music?") related to the adjustment of the state (e.g., the first function (e.g., the music playback) performing operation) of the first electronic device 1401.

Operations 1430 and 1432 are the same as operations 1330 and 1332 in FIG. 13, detailed descriptions thereof will be omitted.

After operation 1432, the first electronic device 1401, the intelligent server 1408, or the second electronic device 1402 may further perform at least one follow-up operation, and the at least one follow-up operation will be described in more detail with reference to FIGS. 17 and 18.

Figure 15:
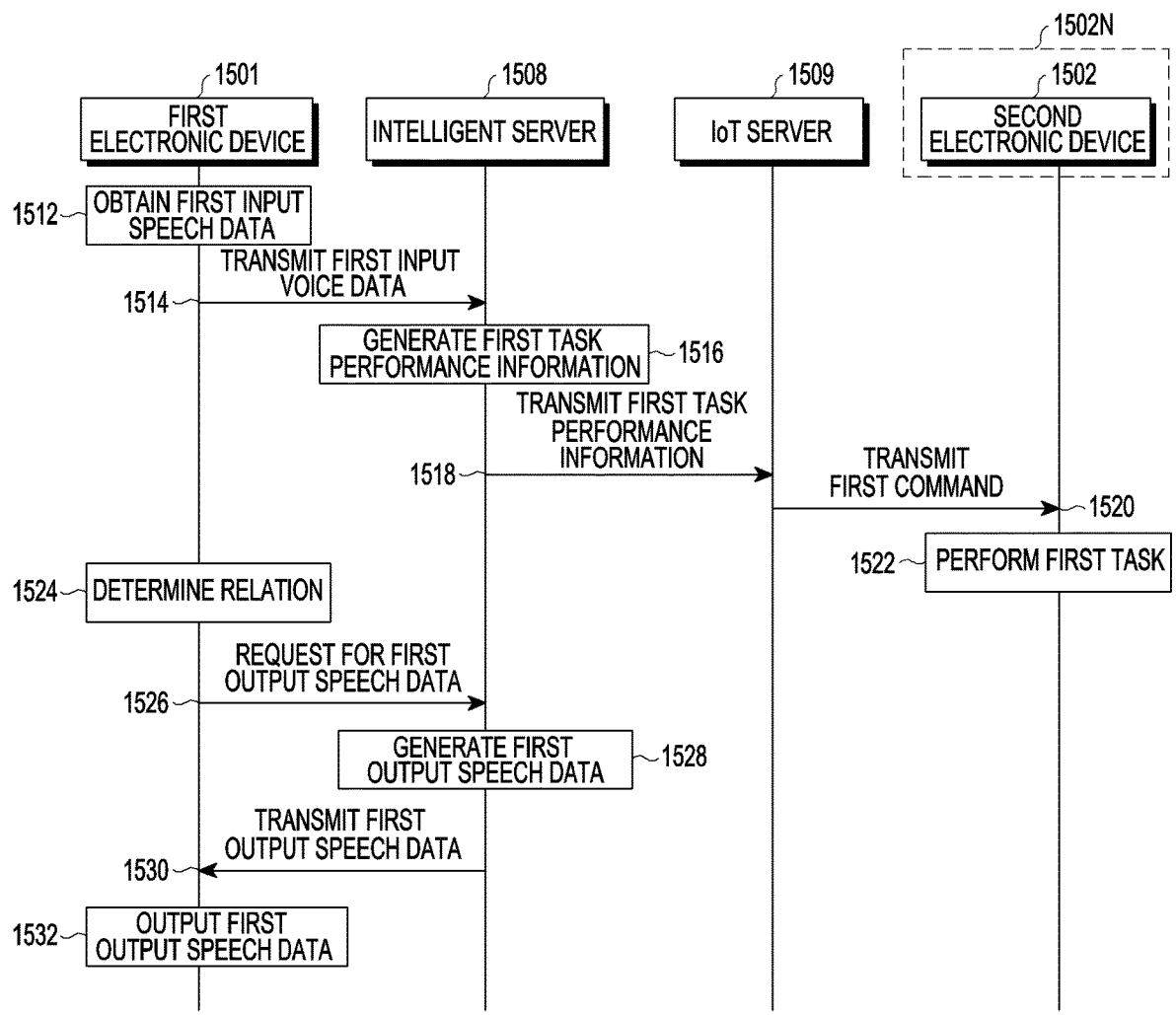
FIG. 15 is a flowchart illustrating a control method by a speech recognition control system according to various embodiments.

FIG. 15 is a flowchart illustrating a control method by a speech recognition control system according to various embodiments. In FIG. 15, a first electronic device 1501 (e.g., a first electronic device 201) and a second electronic device 1502 (e.g., second electronic devices 202 (202a~202d)) may communicate via a first network (e.g., a first network 298) (e.g., a short-range wireless communication). The second electronic device 1502 may be registered at a server (e.g., a home network server 202S) (e.g., an AP or a router) for providing a smart home service and then may form a home network 1502N (e.g., a home network 202N), and the first electronic device 1501 may control the second electronic device 1502 by interworking with an IoT server 1509 (e.g., an IoT server 209 in FIG. 2). The first electronic device 1501, an intelligent server 1508 (e.g., an intelligent server 408) (e.g., Bixby™), and the IoT server 1509 may communicate via a second network (e.g., a second network 299) (e.g., a long-range wireless communication), and the second electronic device 1502 may transmit and receive data or information to and from the intelligent server 1508 via the first electronic device 1501 or the IoT server 1509. FIG. 15 is the same as FIG. 13 except for some operations, so different operations will be mainly described.

Referring to FIG. 15, operations 1512 to 1516 are the same as operations 1312 to 1314 in FIG. 13, detailed descriptions thereof will be omitted.

In operation 1518, for example, the intelligent server 1508 may transmit first task performing information to the IoT server 1509 via the second network 299 (e.g., the long-range wireless communication). For example, the intelligent server 1508 may transmit the first task performing information to the IoT server 1509 by using a communication interface (e.g., a communication interface 410) of the intelligent server 1508.

In operation 1520, the IoT server 1509 may transmit a first command including at least part of the first task performing information received from the intelligent server 1508 to the second electronic device 1502 (e.g., a smart TV 202a).

According to an embodiment, the IoT server 1509 may identify a domain as a target device which will perform the first task from first operation information included in the first task performing information based at least in part on the first task performing information, and search for the target device which corresponds to the identified domain. For example, the IoT server 1509 may search for a device which corresponds to the identified domain among at least one second electronic device (e.g., at least one second electronic device 202 (202a~202d)) registered at the IoT server 1509. For example, if the identified domain is a "TV", the IoT server

1509 may search for the at least one second electronic device 202 (202a~202d) and detect the smart TV 202a which corresponds to the "TV" as a device which corresponds to the identified domain. For example, if there are a plurality of second electronic devices which correspond to the "TV", the second electronic device having a higher priority may be selected according to a designated priority. The IoT server 1509 may generate a first command which causes the detected second electronic device 1502 (e.g., the smart TV 202a) to perform a first operation sequence included in the first task performing information, and transfer the first command to the detected second electronic device 1502 (e.g., the smart TV 202a) which corresponds to the identified domain.

In operation 1522, for example, the second electronic device 1502 (e.g., the smart TV 202a) may execute a first task performing operation (e.g., an operation of "turning on" the second electronic device 1502 (e.g., the smart TV 202a)") which corresponds to the first request based on the first command received from the IoT server 1509. For example, the second electronic device 1502 (e.g., the smart TV 202a) may perform the first task which corresponds to the first request based on the first operation sequence included in the first operation information of the first task performing information according to the first command. According to various embodiments, the first electronic device 1501 may output information (e.g., "I turned on the TV.") related to a result of performing the first task via a display (e.g., a display 313).

Operations 1524 to 1532 are the same as operations 1324 to 1332 in FIG. 13, detailed descriptions thereof will be omitted.

After operation 1532, the first electronic device 1501, the intelligent server 1508, the IoT server 1509, or the second electronic device 1502 may further perform at least one follow-up operation, and the at least one follow-up operation will be described in more detail with reference to FIGS. 17 and 18.

Figure 16:
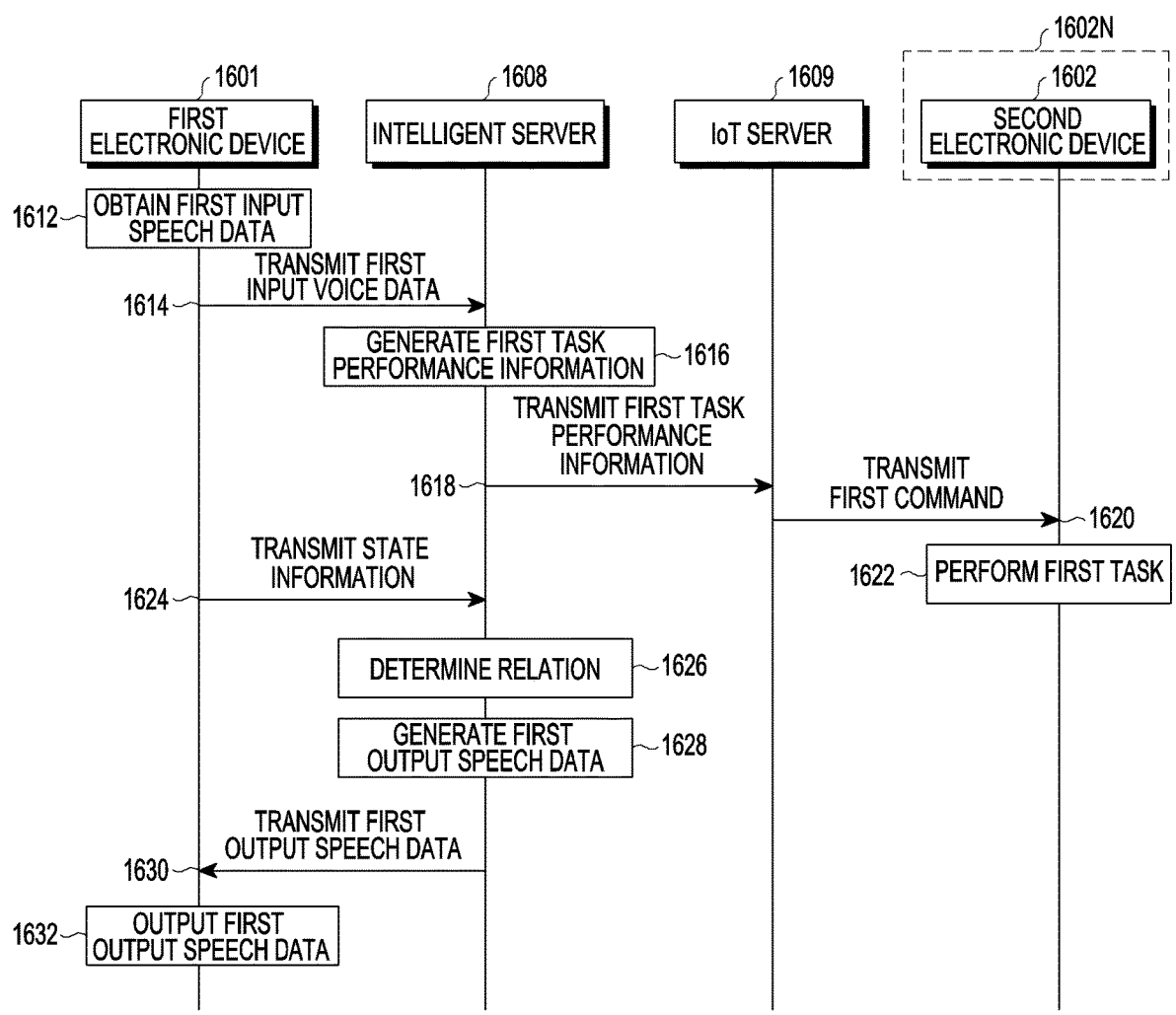
FIG. 16 is a flowchart illustrating a control method by a speech recognition control system according to various embodiments.

FIG. 16 is a flowchart illustrating a control method by a speech recognition control system according to various embodiments. In FIG. 16, a first electronic device 1601 (e.g., a first electronic device 201) and a second electronic device 1602 (e.g., second electronic devices 202 (202a~202d)) may communicate via a first network (e.g., a first network 298) (e.g., a short-range wireless communication). The second electronic device 1602 may be registered at a server (e.g., a home network server 202S) (e.g., an AP or a router) for providing a smart home service and then may form a home network 1602N (e.g., a home network 202N), and the first electronic device 1601 may control the second electronic device 1602 by interworking with an IoT server 1609 (e.g., an IoT server 209 in FIG. 2). The first electronic device 1601, an intelligent server 1608 (e.g., an intelligent server 408) (e.g., a Bixby™ server), and the IoT server 1609 may communicate via a second network (e.g., a second network 299) (e.g., a long-range wireless communication), and the second electronic device 1602 may transmit and receive data or information to and from the intelligent server 1608 via the first electronic device 1601 or the IoT server 1609. FIG. 16 is the same as FIG. 15 except for a fact that a subject which determines a relation is the intelligent server 1608, so different operations will be mainly described.

Operations 1612 to 1622 are the same as operations 1512 to 1522 in FIG. 15, detailed descriptions thereof will be omitted.

In operation 1624, for example, the first electronic device 1601 may transmit state information of the first electronic device 1601 to the intelligent server 1608. For example, the first electronic device 1601 may transmit the state information of first electronic device 1601 to the intelligent server 1608 via the second network 299 by using a second communication interface (e.g., a long-range wireless communication interface). According to various embodiments, the intelligent server 1608 may receive the state information of the first electronic device 1601 from the IoT server 1609 instead of receiving the state information from the first electronic device 1601. According to various embodiments, if the first electronic device 1601 is registered at the IoT server 1609, the state information of the first electronic device 1601 may be updated to the IoT server 1609 periodically or according to a request. For example, the first electronic device 1601 may transmit the state information of the first electronic device 1601 to the IoT server 1609, and the intelligent server 1608 request the state information of the first electronic device 1601 from the IoT server 1609.

According to an embodiment, the first electronic device 1601 may perform operation 1624 periodically or aperiodically. For example, the first electronic device 1601 may transmit state information of the first electronic device 1601 to the intelligent server 1608 at a designated period, or transmit the state information of the first electronic device 1601 to the intelligent server 1608 in response to a request from the intelligent server 1608. In FIG. 16, operation 1624 is illustrated as being performed after operation 1620, but not limited thereto, and operation 1624 may be performed at any operation. According to an embodiment, if the first electronic device 1601 transmits the state information of the first electronic device 201 along with first input speech data to the intelligent server 1608 in operation 1614, operation 1624 may be omitted.

In operation 1626, for example, the intelligent server 1608 may determine a relation between the state of the first electronic device 1601 and an operation of performing the first task to be performed according to a first request included in the first input speech data.

According to an embodiment, the intelligent server 1608 may determine the relation according to whether the determined state of the first electronic device 1601 and the operation of performing the first task interfere with each other. For example, the intelligent server 1608 may determine the state of the first electronic device 1601 based at least in part on the state information of the first electronic device 1601, and if the determined state of the first electronic device 1601 and the operation of performing the first task include the same attribute (e.g., an auditory element or a visual element), the intelligent server 1608 may determine that the state of the first electronic device 1601 and the operation of performing the first task interfere with each other.

Operations 1628 to 1632 are the same as operations 1528 to 1532 in FIG. 15, detailed descriptions thereof will be omitted.

Figure 17:
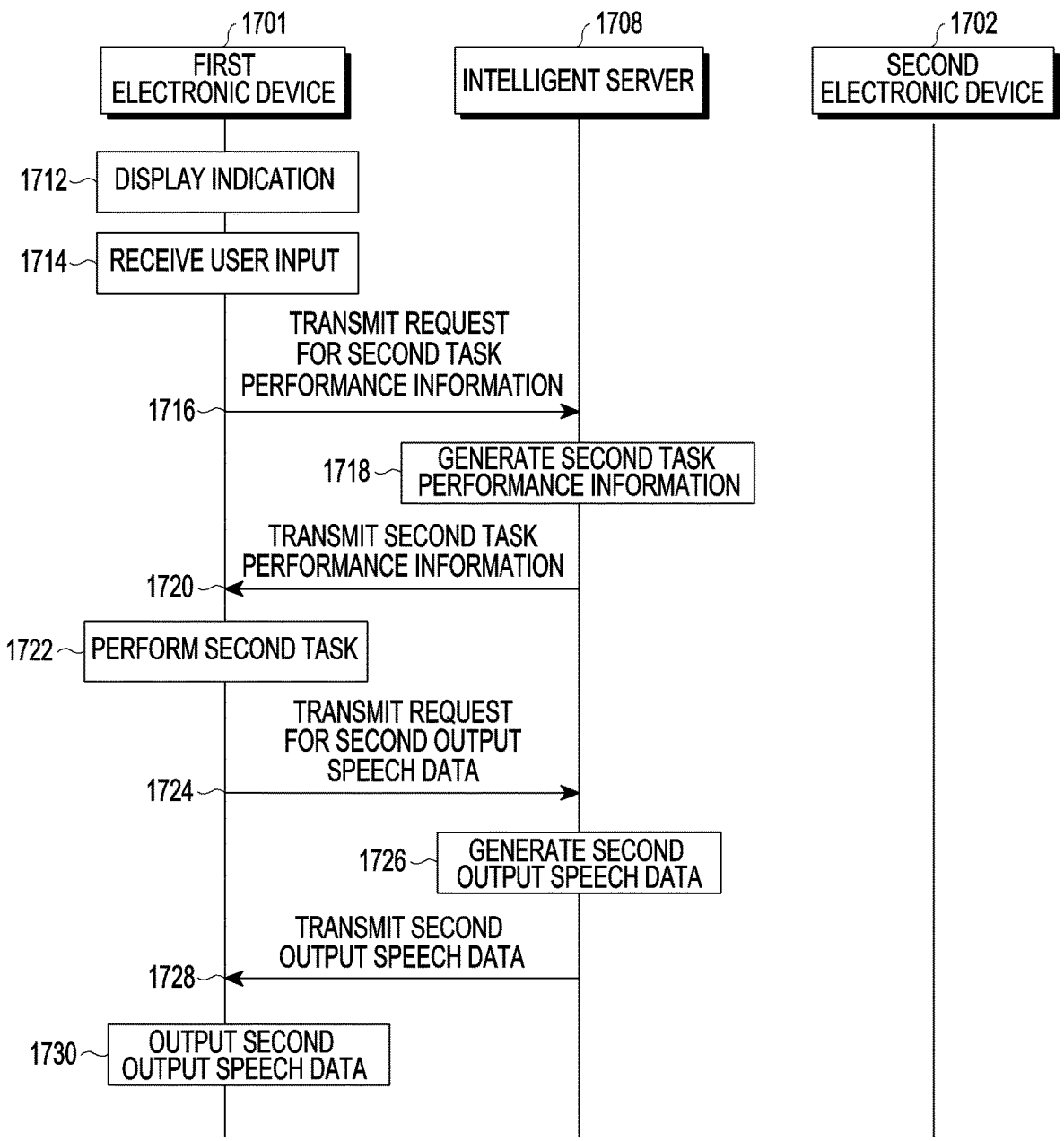
FIG. 17 is a flowchart illustrating a control method by a speech recognition control system according to various embodiments.

FIG. 17 is a flowchart illustrating a control method by a speech recognition control system according to various embodiments. In FIG. 17, a first electronic device 1701 (e.g., a first electronic device 201) and a second electronic device 1702 (e.g., second electronic devices 202 (202a~202d)) may communicate via a first network (e.g., a first network 298) (e.g., a short-range wireless communication), the first electronic device 1701 and an intelligent server 1708 (e.g., an intelligent server 408) may communicate via a second network (e.g., a second network 299) (e.g., a long-range wireless communication), and the second electronic device 1702 and the intelligent server 1708 may transmit and receive data or information via the first electronic device 1701.

Referring to FIG. 17, in operation 1712, the first electronic device 1701 may output an indication related to adjustment of a state of the first electronic device 1701 or the second electronic device 1702. For example, the first electronic device 1701 may output an indication for adjusting the state of the first electronic device 1701 or the second electronic device 1702, based at least in part on a result of determining relation between the state of the first electronic device 1701 or the second electronic device 1702 (e.g., a smart TV 202a) and an operation of performing a first task to be performed according to speech recognition control which corresponds to a first request in first input speech data obtained by the first electronic device 1701.

According to an embodiment, if a subject for determining the relation is the intelligent server 1708, the first electronic device 1701 may receive, from the intelligent server 1708, the indication related to the adjustment of the state of the first electronic device 1701 or the second electronic device 1702 (e.g., the smart TV 202a) which is generated based at least in part on the result of determining the relation, and output the indication.

According to an embodiment, if the subject for determining the relation is the first electronic device 1701, the first electronic device 1701 may generate the indication related to the adjustment of the state of the first electronic device 1701 or the second electronic device 1702 (e.g., the smart TV 202a) based at least in part on the result of determining the relation.

According to an embodiment, if the there is the relation between the state of the first electronic device 1701 or the second electronic device 1702 (e.g., the smart TV 202a) and the operation of performing the first task based on the result of determining the relation, the indication may include at least part of visual information or auditory information related to the adjustment of the state of the first electronic device 1701 or the second electronic device 1702 (e.g., the smart TV 202a).

For example, if it is determined that there is the relation between the state of the first electronic device 1701 or the operation of performing the first task to be performed at the second electronic device 1702 (e.g., the smart TV 202a) based on the result of determining the relation, the first electronic device 1701 may receive indication (e.g., first indication) including at least part of visual information or auditory information related to the adjustment of the state of the first electronic device 1701, or may receive the first indication from the intelligent server 408.

For example, if it is determined that there is the relation between the state of the first electronic device 1701 or the operation of performing the first task to be performed at the second electronic device 1702 (e.g., the smart TV 202a) based on the result of determining the relation, the first electronic device 1701 may receive indication (e.g., second indication) including at least part of visual information or auditory information related to the adjustment of the state of the second electronic device 1702 (e.g., the smart TV 202a), or may receive the second indication from the intelligent server 408.

For example, if it is determined that there is the relation between the state of the second electronic device 1702 (e.g., the smart TV 202a) and the operation of performing the first task to be performed at the first electronic device 1701 based on the result of determining the relation, the first electronic device 1701 may receive indication (e.g., third indication) including at least part of visual information or auditory information related to the adjustment of the state of the second electronic device 1702 (e.g., the smart TV 202a), or may receive the third indication from the intelligent server 408.

For example, if it is determined that there is the relation between the state of the second electronic device 1702 (e.g., the smart TV 202a) and the operation of performing the first task to be performed at first electronic device 1701 based on the result of determining the relation, the first electronic device 1701 may receive indication (e.g., fourth indication) including at least part of visual information or auditory information related to the adjustment of the state of the first electronic device 1701, or may receive the fourth indication from the intelligent server 408.

According to an embodiment, the auditory information may include a notification sound notifying the adjustment of the state of the first electronic device 1701 or the second electronic device 1702 (e.g., the smart TV 202a), or first output speech data including a follow-up question related to the adjustment of the state of the first electronic device 1701 or the second electronic device 1702 (e.g., the smart TV 202a). For example, if the first electronic device 1701 outputs the first or fourth indication, the first output speech data may include a follow-up question (e.g., "Do you want to reduce the sound of music?", "Do you want to increase the sound of music?", or "Do you want to stop playing music?") related to the adjustment of the state of the first electronic device 1701. For another example, if the first electronic device 1701 outputs the second or third indication, the first output speech data may include a follow-up question (e.g., "Do you want to reduce a volume of a TV?" or "Do you want to increase a volume of a TV?") related to the adjustment of the state of the second electronic device 1702 (e.g., the smart TV 202a). The first electronic device 1701 may output the auditory information via an acoustic output device (e.g., a speaker 314).

According to an embodiment, the visual information may include a text, a character, a picture, a photo or an emoticon related to the adjustment of the state of the first electronic device 1701 or the second electronic device 1702 (e.g., the smart TV 202a). The visual information may include a user interface (UI) such as a conversational application. The visual information may be a user interface (UI) including at least one input button (icon) for receiving the follow-up question included in the first output speech data related to the adjustment of the state of the first electronic device 1701 or the second electronic device 1702 (e.g., the smart TV 202a) and a user input for the follow-up question. The visual information is not limited to this, and may include all various visual representations. The first electronic device 1701 may output the visual information via the display device (e.g., the display 313). The first electronic device 1701 may simultaneously output the auditory information and the visual information via the acoustic output device (e.g., the speaker 314) and the display device.

In operation 1714, for example, the first electronic device 1701 may receive a user input for performing a second task related to the adjustment of the state of the first electronic device 1701 or the second electronic device 1702 (e.g., the smart TV 202a) outputted via the indication. For example, the first electronic device 1701 may receive a user input for the follow-up question related to the adjustment of the state of the first electronic device 1701 or the second electronic device 1702 (e.g., the smart TV 202a).

According to an embodiment, the first electronic device 1701 may receive the user input via a speech input device (e.g., a microphone 311a), a key input device in an input module (e.g., an input module 311), or a touch screen in the display 313. For example, the first electronic device 1701 may receive speech data (e.g., second input speech data) obtained via the speech input device (e.g., the microphone 311a) by the user's utterance as the user input, may receive a signal of a key selected via a key input device as the user input, or may receive the user's touch obtained via the touch screen as the user input.

In operation 1716, for example, the first electronic device 1701 may transmit, to the intelligent server 1708, a request for second task performing information required to perform the second task related to the adjustment of the state of the first electronic device 1701 or the second electronic device 1702 (e.g., the smart TV 202a). For example, the first electronic device 1701 may transmit the request for the second task performing information to the intelligent server 1708 upon receiving a user input for requesting to perform the second task for adjusting the state of the first electronic device 1701 or the second electronic device 1702 (e.g., the smart TV 202a) for the follow-up question related to the adjustment of the state of the first electronic device 1701 or the second electronic device 1702 (e.g., the smart TV 202a).

According to an embodiment, the request for the second task performing information may include second input speech data related to the performing the second task. For example, the second input speech data may include a response (e.g., "Yes") to the follow-up question or a second request (or command) related to the adjustment of the state of the first electronic device 1701 or the second electronic device 1702 (e.g., the smart TV 202a).

For example, if the first electronic device 1701 receives the second input speech data as a user input for the first or fourth indication, the second input speech data may include the second request (or command) (e.g., "Reduce the sound of music.", "Increase the sound of music.", or "Stop playing music.") related to the adjustment of the state of the first electronic device 1701. As another example, if the first electronic device 1701 receives the second input speech data as a user input for the second or third indication, the second input speech data may include the second request (or command) (e.g., "Reduce a volume of a TV." or "Increase a volume of a TV.") related to the adjustment of the state of the second electronic device 1702 (e.g., smart TV 202a). In operation 1718, for example, the intelligent server 1708 may generate the second task performing information for performing the second task based at least in part on a result of analyzing the request for the second task performing information (e.g., the second request in the second input speech data) received from the first electronic device 1701.

According to an embodiment, the intelligent server 1708 may analyze the request for the second task performing information. For example, the intelligent server 1708 may analyze the second request included in the second input speech data if the second input speech data is included in the request for the second task performing information. For example, the intelligent server 1708 may recognize the second request in the second input speech data via an automatic speech recognition module (e.g., an ASR module 421) to convert the second request into text, and detect the user's intent (an operation to be performed (e.g., the second task performing operation)) or a domain (e.g., an execution target (e.g., a device which performs the second task) for the operation to be performed) which corresponds to the second request included in the second input speech data based on the converted text via a natural language understanding module (e.g., an NLU module 422). The intelligent server 1708 may generate the second task performing information for performing the second task which corresponds to the second request based at least in part on the detected user's intent or domain.

According to an embodiment, the second task performing information may include second operation information (e.g., a second pass rule) for performing the second task which corresponds to the second request. For example, the intelligent server 1708 may select or generate, based on the detected user's intent or domain according to a result of analyzing the second input speech data, a second operation sequence which corresponds to a parameter or an operation sequence required for the domain to perform the user's intent from a pass rule database (e.g., a pass rule DB 436) via a pass planner module (e.g., a pass planner module 423).

According to an embodiment, the second operation information (e.g., the second pass rule) may include a target device or app to be executed in response to the second request, an operation (e.g., the second task or at least one state related to the second task) to be executed on the target device or app, and a second operation sequence including information on a parameter required to execute the operation.

For example, if the second request included in the second input speech data is "Reduce the sound of music", the intelligent server 1708 may generate the second task performing information including a music playback application of the first electronic device 1701 as the target device to be executed in response to the second request, including an "Reduce the sound of music" operation as the operation (e.g., the second task) to be executed on an app of the target device, and including information about a parameter or an operation order required for the music playback application of the first electronic device 1701 to reduce the sound of music as the second operation sequence.

For example, if the second request included in the second input speech data is "Reduce the volume of the TV", the intelligent server 1708 may generate the second operation information including the second electronic device 1702 (e.g., the smart TV 202a) (or a function such as output of broadcast content being performed by the second electronic device 1702) as the target device or a target app (function) to be executed in response to the second request, including an "Reduce the volume of the TV" operation as the operation (e.g., the second task) to be executed on the target device or the app (function), and including information about a parameter or an operation order required for the second electronic device 1702 (e.g., the smart TV 202a) to reduce the volume of the broadcast content output as the second operation sequence.

According to an embodiment, the second task performing information may further include user interface (UI) information related to the second task or the second operation information.

In operation 1720, for example, the intelligent server 1708 may transmit the second task performing information to the first electronic device 1701 via the second network 299 (e.g., the long-range wireless communication). For example, the intelligent server 1708 may transmit the second task performing information to the first electronic device 1701 by using a communication interface (e.g., a communication interface 410) of the intelligent server 1708.

In operation 1722, for example, the first electronic device 1701 may perform the second task based on the second task performing information received from the intelligent server 1708. For example, upon receiving an input which corresponds to the adjustment of the state of the first electronic device 1701 as a user input for the first or fourth indication, the first electronic device 1701 may identify an operation or a performing target which will perform the second task from the second operation information included in the second task performing information, and then perform the second task according to the second operation sequence.

According to an embodiment, the first electronic device 1701 may receive the second task performing information for performing the second task related to the adjustment of the state of the first electronic device 1701 from the intelligent server 1708.

For example, the second task performing information may include the second operation information related to performing the second task (e.g., an operation of reducing a sound of music of a music playback application of the first electronic device 1701) which corresponds to the second request included in the second input speech data obtained by the first electronic device 1701. The first electronic device 1701 may perform the second task which corresponds to the second request based on the second operation information included in the second task performing information. The first electronic device 1701 may further display a user interface (UI) related to the performing the second task based on UI information related to the second operation information included in the second task performing information on a display device (e.g., a display 360).

In operation 1724, for example, the first electronic device 1701 may transmit a request for second output speech data related to a result of performing the second task to the intelligent server 1708.

In operation 1726, for example, the intelligent server 1708 may generate the second output speech data related to the result of performing the second task. For example, when the request for the second output speech data is received, the intelligent server 1708, based at least in part on the result of performing the second task, may generate the second output speech data which corresponds to the result of performing the second task which is related to the adjustment of the state of the first electronic device 1701 via a natural language generation module (e.g., an NLG module 425). For example, if the adjustment of the state of the first electronic device 1701 is adjustment of first function performing (e.g., music playback) state, the intelligent server 1708 may generate the second output speech data which corresponds to a result of adjusting the first function (e.g., the music playback) performing operation by using the natural language generation module 425.

According to an embodiment, the second output speech data may include the result (e.g., "I reduced the sound of music", "I increased the sound of music", or "I stopped playing music") of adjusting the state (e.g., the first function (e.g., the music playback) performing operation) of the first electronic device 1701.

In operation 1728, for example, the intelligent server 1708 may transmit the second output speech data to the first electronic device 1701. For example, the intelligent server 1708 may transmit the second output speech data to the first electronic device 1701 via the second network 299 by using the communication interface 410.

In operation 1730, for example, the first electronic device 1701 may output the received second output speech data via an acoustic output device 340 (e.g., a speaker).

Figure 18:
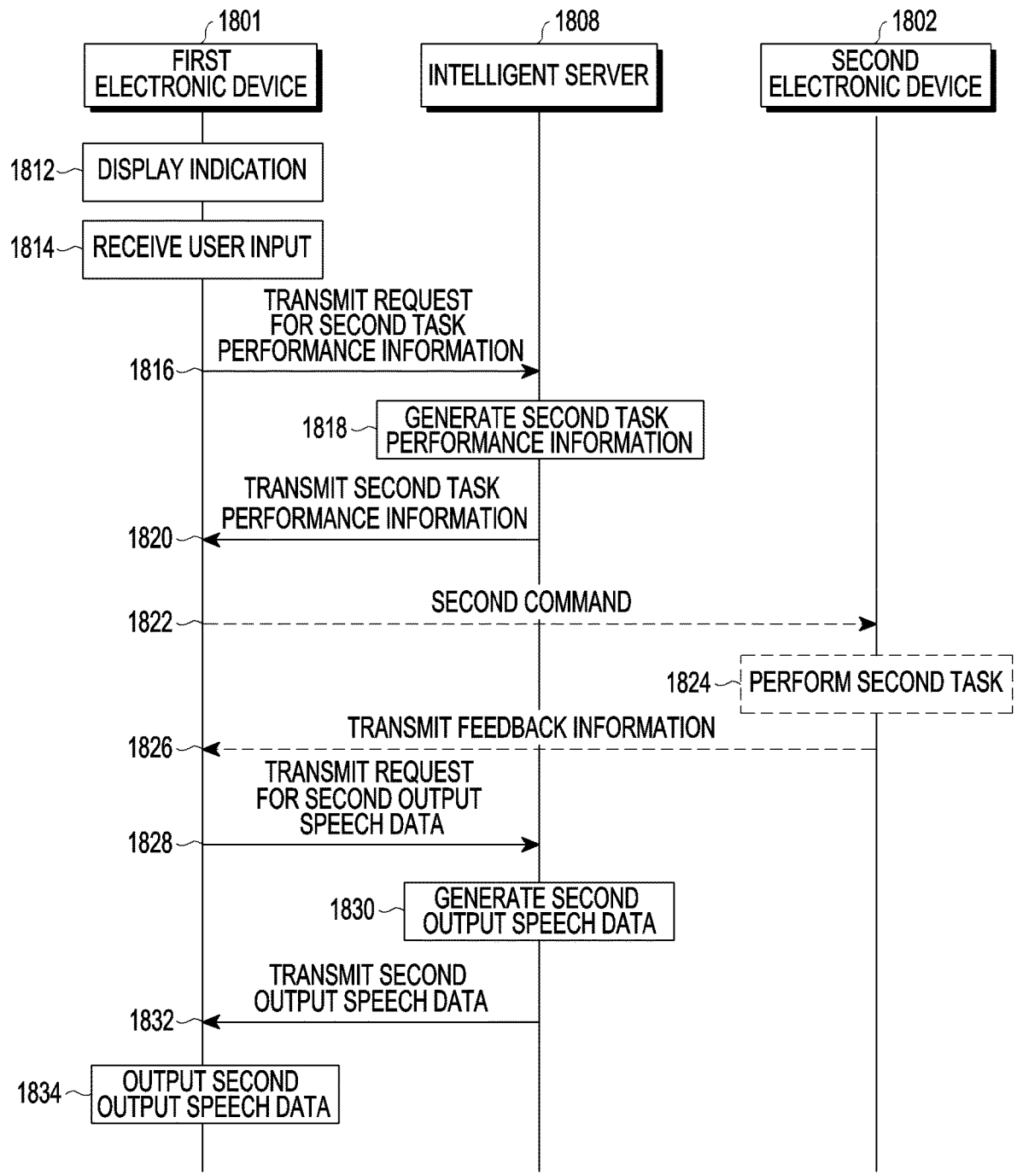
FIG. 18 is a flowchart illustrating a control method by a speech recognition control system according to various embodiments.

FIG. 18 is a flowchart illustrating a control method by a speech recognition control system according to various embodiments. In FIG. 18, a first electronic device 1801 (e.g., a first electronic device 201) and a second electronic device 1802 (e.g., second electronic devices 202 (202a~202d)) may communicate via a first network (e.g., a first network 298) (e.g., a short-range wireless communication), the first electronic device 1801 and an intelligent server 1808 (e.g., an intelligent server 408) may communicate via a second network (e.g., a second network 299) (e.g., a long-range wireless communication), and the second electronic device 1802 and the intelligent server 1808 may transmit and receive data or information via the first electronic device 1801.

Referring to FIG. 18, operations 1812 to 1820 are the same as operations 1712 to 1720 in FIG. 17, detailed descriptions thereof will be omitted.

In operation 1822, for example, the first electronic device 1801 may transmit, to a second electronic device 1802 (a smart TV 202a), a second command which is generated based at least in part on second task performing information received from the intelligent server 1808. For example, upon receiving an input which corresponds to adjustment of a state of the second electronic device 1802 (e.g., the smart TV 202a) as a user input for a second or third indication, the first electronic device 1801 may identify a domain as a target device which will perform the second task from second operation information included in the second task performing information, and search for a target device which corresponds to the identified domain. For example, the first electronic device 1801 may identify a device which corresponds to the domain among at least one second electronic device 1802 (e.g., at least one second electronic device 202a~202d) registered at a communication connection app (e.g., Samsung Connect™) of the first electronic device 1801. For example, if the domain is a "TV", the first electronic device 1801 may identify the second electronic device 1802 (e.g., a smart TV 202A) which corresponds to the "TV" from among the second electronic devices 202 (202a to 202d), as a target device which corresponds to the domain. According to various embodiments, if there are a plurality of second electronic devices which correspond to the "TV", a second electronic device having a higher priority may be selected according to a designated priority. The first electronic device 1801 may generate a second command to cause the detected second electronic device 1802 (e.g., the smart TV 202a) to perform the second task based on the second operation information, and transmit the second command to the detected second electronic device 1802 (e.g., the smart TV 202a) which corresponds to the identified domain.

According to an embodiment, the first electronic device 1801 may transmit the second command to the second electronic device 1802 (e.g., the smart TV 202a) as the target device via a first network 298 by using a communication interface (e.g., a communication module 190) (e.g., a short-range wireless communication interface) of the first electronic device 1801.

According to an embodiment, in operations 1820 and 1822, it has been described that the first electronic device 1801 receives the second task performing information from the intelligent server 1808 and transmits the second command to the second electronic device 1802, however, not limited thereto, and if the second electronic device 1802 is registered at an IoT server (e.g., an IoT server 209), the intelligent server 1808 may transmit the second task performing information to the IoT server 209, and the IoT server 209 may generate the second command based at least in part on the second task performing information to transmit the second command to the second electronic device 1802.

In operation 1824, for example, the second electronic device 1802 (e.g., the smart TV 202a) may perform the second task based on the second task performing information included in the second command received from the first electronic device 1801. The second command may include second task performing information related to performing the second task (e.g., an operation of reducing a volume of the second electronic device 1802 (e.g., the smart TV 202*a*)) which corresponds to the second request included in the second input speech data obtained by the first electronic device 1801. The second electronic device 1802 (e.g., the smart TV 202*a*) may perform the second task which corresponds to the second request based on the second operation information in the second task performing information included in the second command. The second electronic device 1802 (e.g., the smart TV 202*a*) may further display a user interface (UI) related to the performing the second task based on UI information related to the second operation information included in the second task performing information on a display device (not shown) of the second electronic device 1802 (e.g., the smart TV 202*a*).

In operation 1826, for example, the second electronic device 1802 may transmit, to the first electronic device 1801, feedback information which is generated based at least in part on a result of performing the second task related to the adjustment of the state of the second electronic device 1802. For example, the second electronic device 1802 may transmit, to the first electronic device 1801, the feedback information via the first communication network 298 by using the communication interface (e.g., the communication module 190) (e.g., a short-range communication interface).

According to an embodiment, in operation 1826, it has been described that the second electronic device 1802 directly transmits the feedback information to the first electronic device 1801, but not limited thereto, and if the second electronic device 1802 is registered at the IoT server 209, the IoT server 209 may transmit the feedback information to the first electronic device 1801 after the second electronic device 1802 transmits the feedback information to the IoT server 209, or the intelligent server 1808 may transmit the feedback information to the first electronic device 1801 after the IoT server 209 transmits the feedback information to the intelligent server 1808.

In operation 1828, for example, the first electronic device 1801 may transmit a request for second output speech data related to a result of performing the second task to the intelligent server 1808.

In operation 1830, for example, the intelligent server 1808 may generate the second output speech data related to the result of performing the second task. For example, when the request for the second output speech data is received, the intelligent server 1808, based at least in part on the result of performing the second task, may generate the second output speech data which corresponds to the result of performing the second task which is related to the adjustment of the state of the second electronic device 1802 via a natural language generation module (e.g., an NLG module 425). For example, if the adjustment of the state of the second electronic device 1802 is adjustment of a volume, the intelligent server 1808 may generate the second output speech data which corresponds to a result of adjusting the volume by using the natural language generation module 425.

According to an embodiment, the second output speech data may include the result (e.g., "I reduced the volume of the TV", or "I increased the volume of the TV") of adjusting the state of the second electronic device 1802.

In operation 1832, for example, the intelligent server 1808 may transmit the second output speech data to the first electronic device 1801. For example, the intelligent server 1808 may transmit the second output speech data to the first electronic device 1801 via the second network 299 by using the communication interface 410.

In operation 1834, for example, the first electronic device 1801 may output the received second output speech data via an acoustic output device (e.g., a speaker 314).

Figure 19:
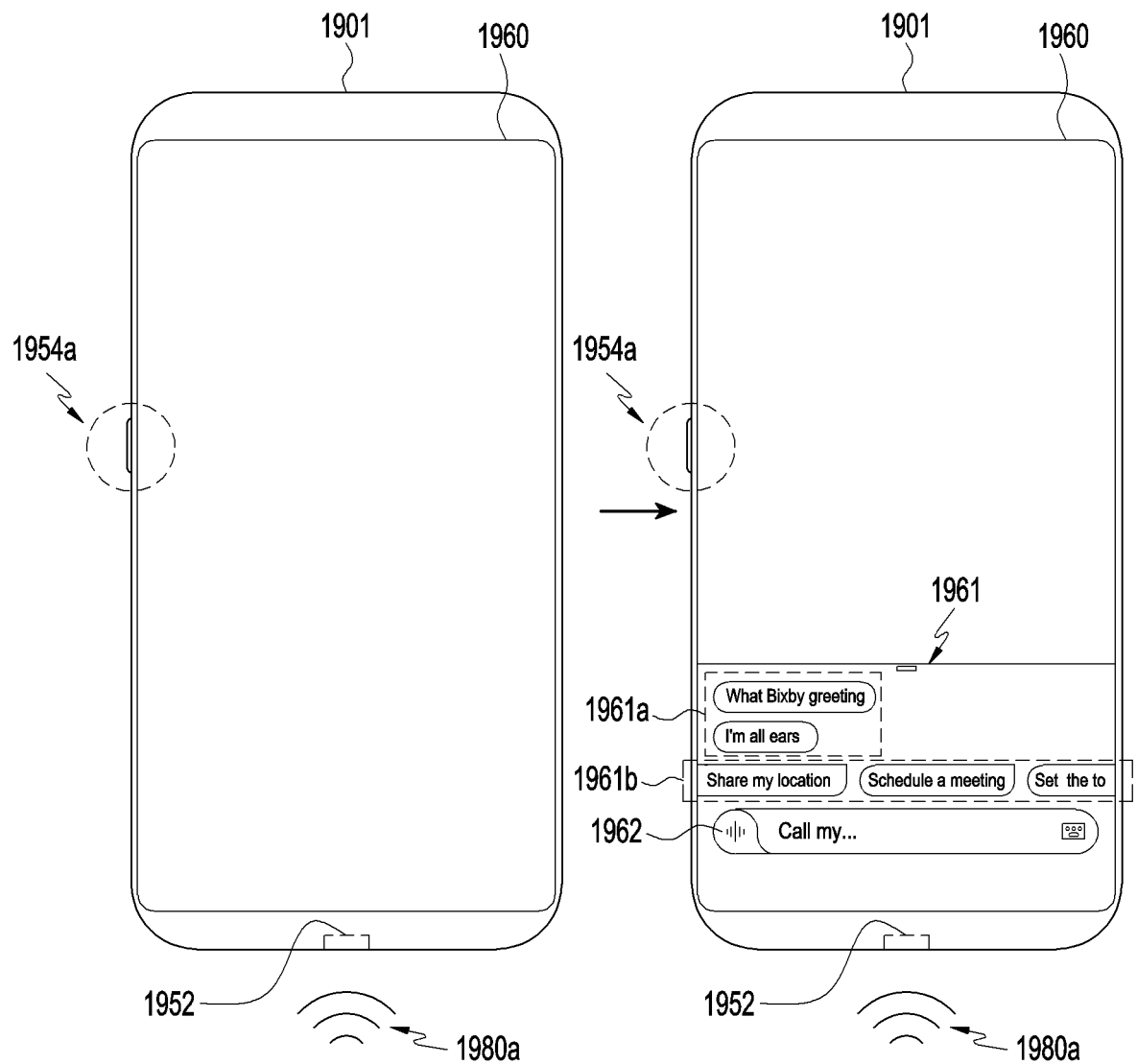
FIG. 19 is a diagram illustrating an example of a user interface screen of a first electronic device according to various embodiments.

FIG. 19 is a diagram illustrating an example of a user interface screen of a first electronic device according to various embodiments.

Referring to FIG. 19, it is shown that a first electronic device 1901 (e.g., a first electronic device 201) receives a speech signal by a user's utterance 1980*a* as a user input, and then executes an intelligent app (e.g., a speech recognition app) which is interworked with an intelligent agent (e.g., an intelligent agent 315*a*).

According to an embodiment, the first electronic device 1901 may execute an intelligent agent (e.g., Bixby™) for recognizing the user's speech via a specific hardware key 1954*a* (e.g., a button for providing a speech recognition control service) of a key input device (e.g., an input module 311). For example, upon receiving a key input signal as a user input via the specific hardware key 1954*a*, the first electronic device 1901 may display a chat window 1961 as a user interface (UI) of an intelligent app on a display device 1960 (e.g., a display device 160 or a display 313). For example, if the user presses the hardware key 1954*a*, and then inputs a speech 1980*a* by the user's utterance via a speech input device 1952 (e.g., a microphone 311*a*), the chat window 1961 of the intelligent app may be displayed on a display device 1960. For example, the user may touch a speech recognition button 1962 included in the chat window 1961 of the intelligent app to input the speech 1980*b* while the chat window 1961 of the intelligent app is displayed. For another example, the user may continuously press the hardware key 1954*a* to input the speech 1980*b*, and then input the speech 1980*b*.

According to an embodiment, the first electronic device 1901 may execute an intelligent app for recognizing speeches 1980*a* and 1980*b* via a speech input device 1952 (e.g., a microphone). For example, if a designated speech 1980*a* (e.g., wake up!) is inputted via the speech input device 1952 (e.g., the microphone), the first electronic device 1901 may display the chat window 1961 of the intelligent app on the display device 1960.

According to an embodiment, the UI of the intelligent app may be a dialog screen such as a chat application (e.g., the chat window 1961), and a welcome message (e.g., "What Bixby greeting" or "I'm all ear's") 1961*a* or content which corresponds to the user's utterance 1980*b* (e.g., "Call my . . . ") via automatic speech recognition (ASR) may be displayed on the dialog screen. In addition, at least one command hint 1961*b* (e.g., "Share my location" or "Schedule a meeting") to help the user's utterance may be displayed on the chat window 1961 of the intelligent app.

Figure 20A:
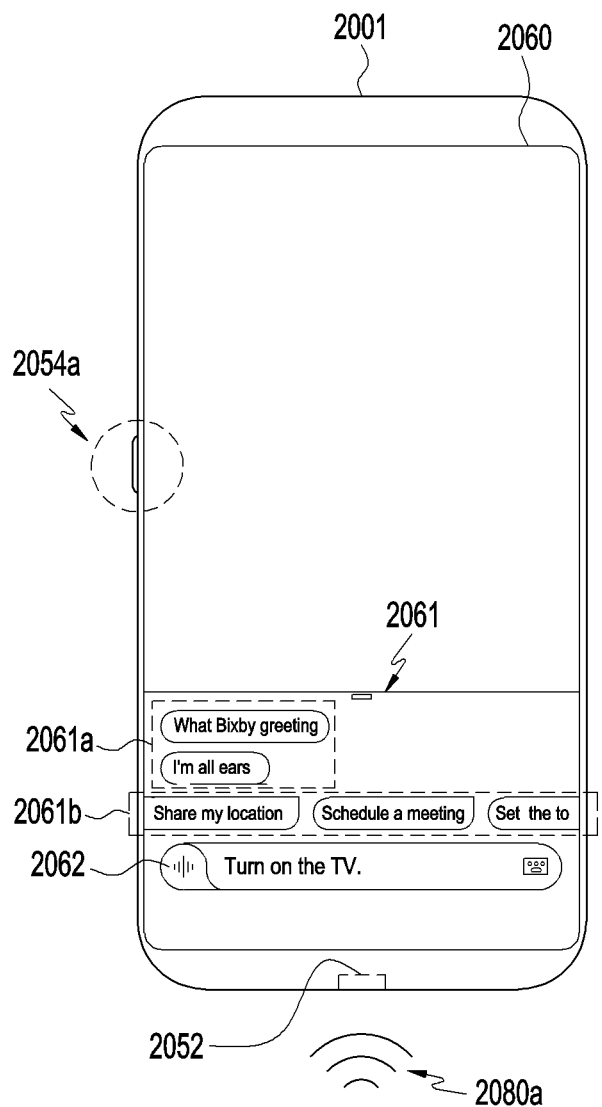
FIG. 20a is a diagram illustrating an example of a user interface screen of a first electronic device according to various embodiments.
Figure 20B:
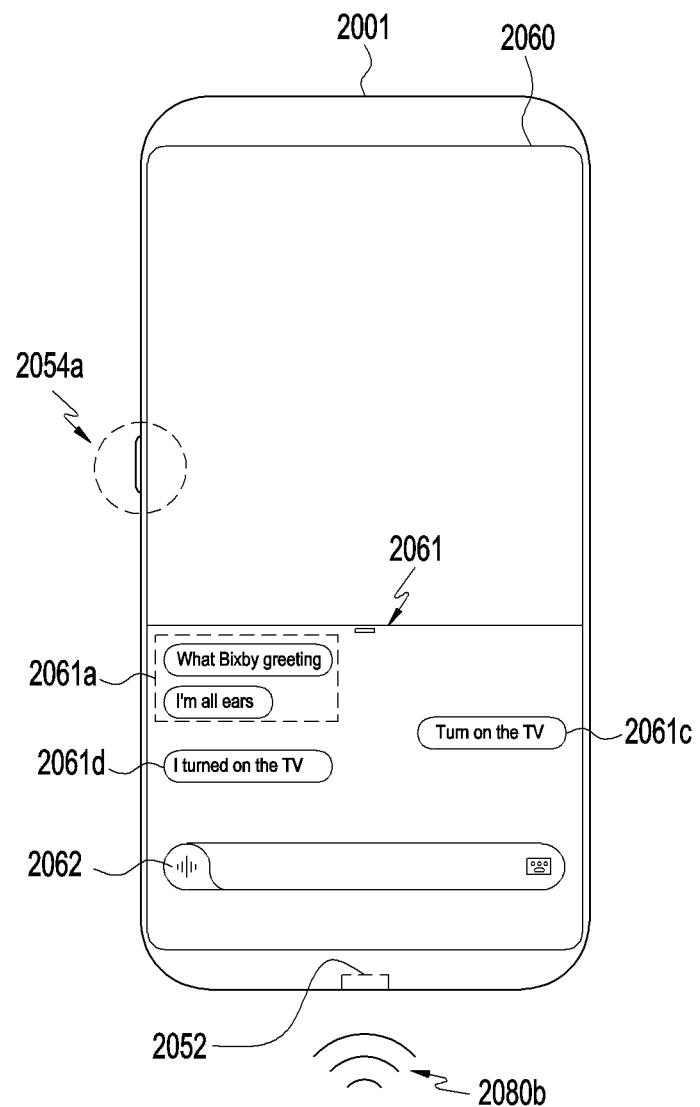
FIG. 20b is a diagram illustrating an example of a user interface screen of a first electronic device according to various embodiments.
Figure 20C:
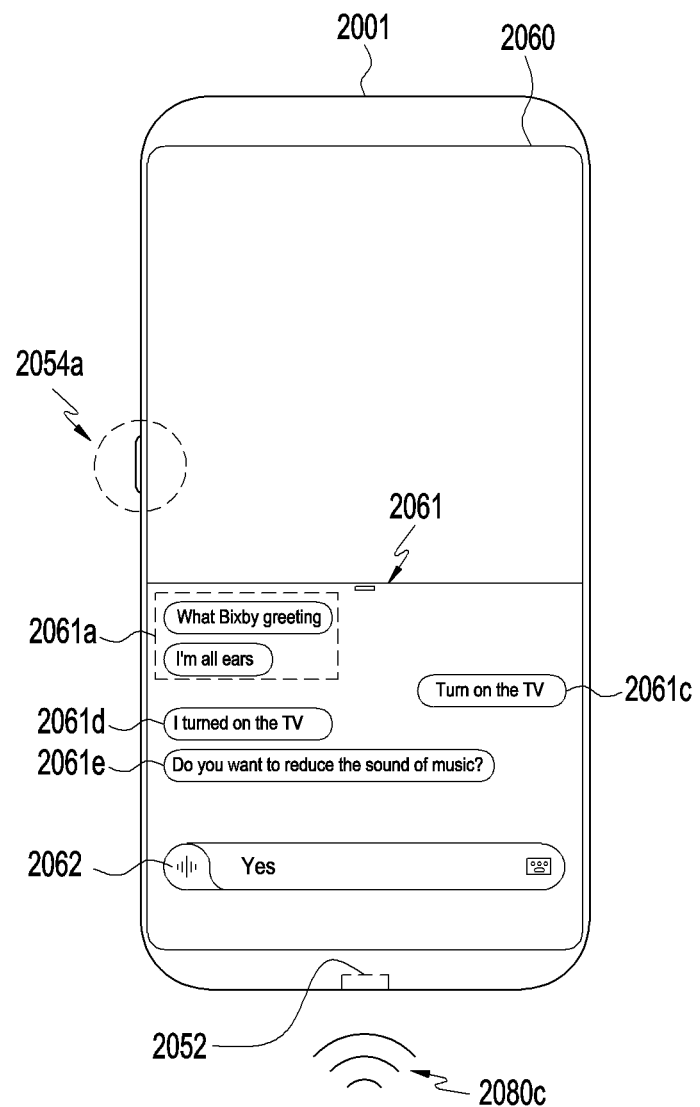
FIG. 20c is a diagram illustrating an example of a user interface screen of a first electronic device according to various embodiments.
Figure 20D:
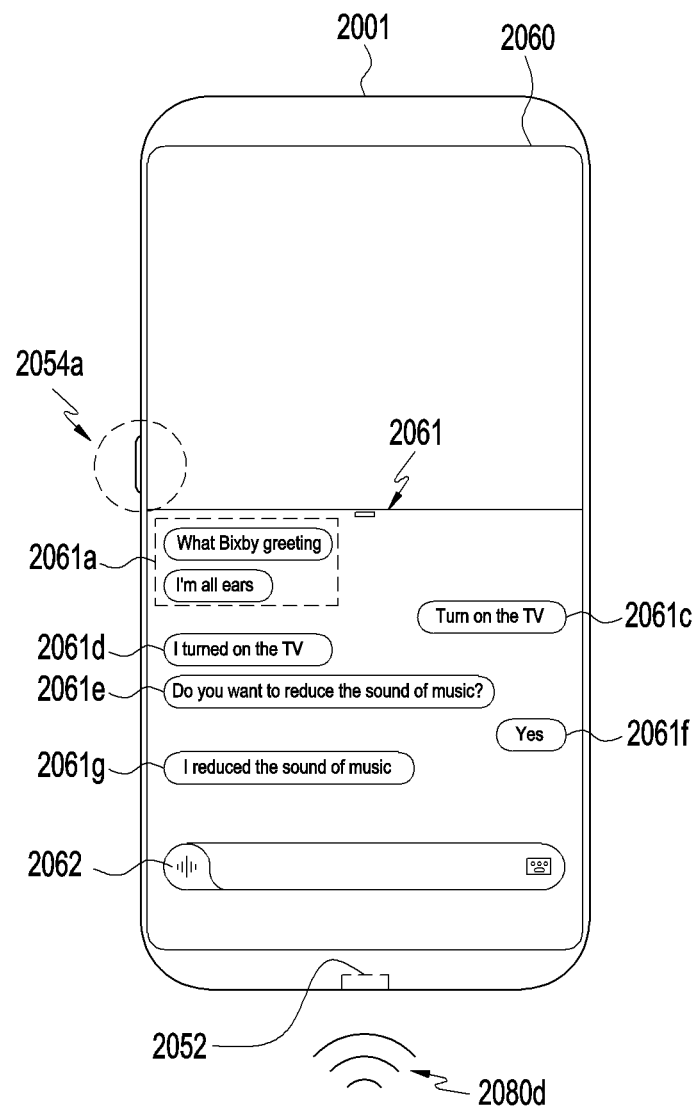
FIG. 20d is a diagram illustrating an example of a user interface screen of a first electronic device according to various embodiments.

FIG. 20*a* is a diagram illustrating an example of a user interface screen of a first electronic device according to various embodiments. FIG. 20*b* is a diagram illustrating an example of a user interface screen of a first electronic device according to various embodiments. FIG. 20*c* is a diagram illustrating an example of a user interface screen of a first electronic device according to various embodiments. FIG. 20*d* is a diagram illustrating an example of a user interface screen of a first electronic device according to various embodiments.

Referring to FIGS. 20*a* to 20*d*, it is shown that a first electronic device 2001 (e.g., a first electronic device 201) receives a speech signal by user's utterance 2080*a* or 2080*b* as a user input, and then executes an intelligent app (e.g., a speech recognition app) which is interworked with an intelligent agent (e.g., an intelligent agent 315a).

Referring to FIG. 20a, the first electronic device 2001 may execute an intelligent agent (e.g., Bixby™) for recognizing the user's speech via a specific hardware key 2054a (e.g., a button for providing a speech recognition control service) of a key input device (e.g., an input module 311). For example, upon receiving a key input signal as a user input via the specific hardware key 2054a, the first electronic device 2001 may display a chat window 2061 as a user interface (UI) of an intelligent app on a display device 2060 (e.g., a display 313). For example, if the user presses the hardware key 2054a, and then inputs a first input speech (e.g., "Turn on the TV") by the user's utterance 2080a via a speech input device 2052 (e.g., the input module 311) (e.g., a microphone 311a), the first input speech may be displayed on the chat window 2061 of the intelligent app. For example, the user may touch a speech recognition button 2062 included in the chat window 2061 of the intelligent app to input the speech 2080a while the chat window 2061 of the intelligent app is displayed. For another example, the user may continuously press the hardware key 2054a to input the speech 2080a, and then input the first input speech 2080a (e.g., "Turn on the TV").

According to an embodiment, the UI of the intelligent app may be the chat window 2061, such as a chat application, and when the first input speech (e.g., "Turn on the TV") by the user's utterance 2080a is inputted, a welcome message (e.g., "What Bixby greeting" or "I'm all ear's") 2061a is displayed on the chat window 2061, and the first input speech (e.g., "Turn on the TV") by the user's utterance 2080a which is currently inputted may be displayed at a field at which the speech recognition button 2062 is located on the chat window 2061 of the intelligent app. According to various embodiments, at least one command hint 2061b to help the user's utterance may be displayed on the chat window 2061 of the intelligent app. For example, "Share my location" or "Schedule a meeting" may be displayed as the command hint 2061b on the chat window 2061 of the intelligent app.

Referring to FIG. 20b, the first electronic device 2001 may display a text 2061c which corresponds to the first input speech (e.g., "Turn on the TV") on the chat window 2061 of the UI of the intelligent app. If performing a task (e.g., a first task) which corresponds to the first input speech (e.g., "Turn on the TV") is completed, the first electronic device 2001 may output an output speech (e.g., "I turned on the TV") which corresponds to a result of executing a corresponding task (e.g., the first task) via an acoustic output device (e.g., an acoustic output device 340) (e.g., an embedded speaker) of the first electronic device 2001 or a functional connection device (e.g., an AI speaker 201b) which is functionally connected to the first electronic device 2001. Also, the first electronic device 2001 may display a text 2061d which corresponds to the output speech (e.g., "I turned on the TV") on the chat window 2061.

Referring to FIG. 20c, after the task (e.g., the first task) which corresponds to the first input speech (e.g., "Turn on the TV") is performed, if it is determined that there is a need for additional control (performing a second task) according to the execution for the first task, the first electronic device 2001 may output an output speech (e.g., "Do you want to reduce the sound of music?") related to the performing the second task. The first electronic device 2001 may display a text 2061e which corresponds to the output speech (e.g., "Do you want to reduce the sound of music?") on the chat window 2061. The output speech (e.g., "Do you want to reduce the sound of music?") may include a follow-up question about the performing the second task. The first electronic device 2001 may receive a second input speech (e.g., "Yes") by the user's utterance 2080c as a user input which corresponds to the output speech.

Referring to FIG. 20d, the first electronic device 2001 may display a text 2061f which corresponds to the second input speech (e.g., "Yes") on the chat window 2061. If the performing the task (e.g., the second task) which corresponds to the second input speech (e.g., "Yes") is completed, the first electronic device 2001 may output an output speech (e.g., "I reduced the sound of music") which corresponds to a result of executing a corresponding task (e.g., the second task) via the acoustic output device (e.g., the acoustic output device 340) (e.g., the embedded speaker) of the first electronic device 2001 or the functional connection device (e.g., the AI speaker 201b) which is functionally connected to the first electronic device 2001. Also, the first electronic device 2001 may display a text 2061g which corresponds to the output speech (e.g., "I reduced the sound of music") on the chat window 2061.

Embodiments disclosed in this document have been presented for purposes of explanation and understanding of the disclosed technical content, however not intended to limit a scope of a technology described in this document. Accordingly, the scope of this document should be construed to include all changes or various other embodiments based on the technical spirit of this document.

The invention claimed is:

1. A server, comprising:
at least one communication interface;
at least one processor operatively connected to the communication interface; and
at least one memory operatively connected to the processor,
wherein the memory stores instructions configured to, when executed, cause the processor to:
receive, from a first electronic device, first input voice data including a first request for performing a first task by using a second electronic device by user utterance;
identify a state of the first electronic device;
analyze the first request included in the first input voice data;
based at least in part on a result of the analysis, determine whether there is a relation between the state of the first electronic device and an operation of performing the first task to be performed based on the first request;
if it is determined that there is the relation between the state of the first electronic device and the operation of performing the first task, generate first output voice data related to adjustment of a state of the first electronic device; and
transmit a first response including the first output voice data to the first electronic device,
wherein upon determining that there is the relation, determine whether at least one of an audio output or a visual output of the first electronic device interferes with at least one of an audio output or a visual output of the second electronic device, and determine whether a distance between the first electronic device and the second electronic device at which the first task will be performed is shorter than a threshold value, and
wherein the threshold value is set to a minimum distance at which the at least one of the audio output or the visual output of the first electronic device can interfere with the at least one of the audio output or the visual output of the second electronic device.

2. The server of claim 1, wherein the first output voice data includes a follow-up question about performing a second task related to the adjustment of the state of the first electronic device.

3. The server of claim 1, wherein the instructions are configured to cause the processor to:
based at least in part on the result of the analysis, generate first task performing information for performing the first task which corresponds to the first request; and
transmit the first task performing information to the second electronic device,
wherein the first task performing information includes first operation information related to an operation of performing the first task, and the first operation information includes information about the operation of performing the first task and a target to perform the first task, parameter information for the operation of performing the first task, or a first operation sequence for the operation of performing the first task.

4. The server of claim 1, wherein the instructions are configured to cause the processor to:
if it is determined that there is the relation between the state of the first electronic device and the operation of performing the first task, generate second task performing information for performing a second task related to the adjustment of the state of the first electronic device; and
transmit the second task performing information to the first electronic device.

5. An electronic device, comprising:
at least one communication interface;
at least one processor operatively connected to the communication interface; and
at least one memory operatively connected to the processor,
wherein the memory stores instructions configured to, when executed, cause the processor to:
obtain, via the electronic device, first input voice data including a first request for performing a first task by using a first external electronic device by user utterance;
transmit the first input voice data to a second external electronic device;
receive, from the second external electronic device, first task performing information for performing the first task which corresponds to the first request included in the first input voice data;
identify an operation of performing the first task to be performed based on the first request from the first task performing information;
determine whether there is a relation between a state of the electronic device and the operation of performing the first task;
if it is determined that there is the relation between the state of the electronic device and the operation of performing the first task, transmit, to the second external electronic device, a request for first output voice data related to adjustment of a state of the electronic device; and
receive, from the second external electronic device, a first response including the first output voice data,
wherein upon determining that there is the relation, determine whether at least one of an audio output or a visual output of the electronic device interferes with at least one of an audio output or a visual output of the first external electronic device, and determine whether a distance between the electronic device and the first external electronic device at which the first task will be performed is shorter than a threshold value, and
wherein the threshold value is set to a minimum distance at which the at least one of the audio output or the visual output of the electronic device can interfere with the at least one of the audio output or the visual output of the first external electronic device.

6. The electronic device of claim 5, wherein the memory stores instructions configured to, when executed, cause the processor to:
based on the first task performing information, generate a first command which is configured to cause the first external electronic device to perform the first task; and
transmit the first command to the first external electronic device.

7. The electronic device of claim 5, wherein the memory stores instructions configured to, when executed, cause the processor to:
transmit state information of the electronic device to the second external electronic device; and
receive, from the second external electronic device, the first response including first output voice data related to the adjustment of the state of the electronic device,
wherein the first output voice data includes a follow-up question for performing a second task related to the adjustment of the state of the electronic device,
wherein the memory stores instructions configured to, when executed, cause the processor to:
output the first output voice data via an acoustic output device of the electronic device or a device which is functionally connected to the electronic device;
receive a user input for the follow-up question;
in response to reception of the user input, transmit, to the second external electronic device, a request for second task performing information for performing the second task related to the adjustment of the electronic device;
receive the second task performing information from the second external electronic device; and
based on the second task performing information, perform the second task to adjust the state of the electronic device.

8. An electronic device, comprising:
at least one communication interface;
at least one processor operatively connected to the communication interface; and
at least one memory operatively connected to the processor,
wherein the memory stores instructions configured to, when executed, cause the processor to:
receive, from a first external electronic device, first input voice data including a first request for performing a first task by using the first external electronic device by user utterance;
identify a state of a second external electronic device;
analyze the first request included in the first input voice data;
based at least in part on a result of the analysis, determine whether there is a relation between the state of the second external electronic device and an operation of performing the first task to be performed based on the first request;
if it is determined that there is the relation between the state of the second external electronic device and the operation of performing the first task, generate first output voice data related to adjustment of a state of the second external electronic device; and transmit an indication including the first output voice data to the second external electronic device, wherein upon determining that there is the relation, determine whether at least one of an audio output or a visual output of the first external electronic device interferes with at least one of an audio output or a visual output of the second external electronic device, and determine whether a distance between the first external electronic device and the second external electronic device at which the first task will be performed is shorter than a threshold value, and wherein the threshold value is set to a minimum distance at which the at least one of the audio output or the visual output of the first external electronic device can interfere with the at least one of the audio output or the visual output of the second external electronic device.

\* \* \* \* \*